US010943293B2

(12) United States Patent
Englehart et al.

(10) Patent No.: US 10,943,293 B2
(45) Date of Patent: Mar. 9, 2021

(54) SYSTEMS AND METHODS FOR MANAGING HOME MORTGAGE LOANS

(71) Applicant: The PNC Financial Services Group, Inc., Pittsburgh, PA (US)

(72) Inventors: Matthew Englehart, Holland, MI (US); Michael T. Nordbusch, Strongsville, OH (US); Sona Kulpati, Pittsburgh, PA (US); Buffy E. DeWitt, Lakewood, OH (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 1215 days.

(21) Appl. No.: 14/958,102

(22) Filed: Dec. 3, 2015

(65) Prior Publication Data

US 2016/0162988 A1   Jun. 9, 2016

Related U.S. Application Data

(60) Provisional application No. 62/118,502, filed on Feb. 20, 2015, provisional application No. 62/118,492, (Continued)

(51) Int. Cl.
*G06Q 40/00*   (2012.01)
*G06Q 40/02*   (2012.01)

(52) U.S. Cl.
CPC .................... *G06Q 40/025* (2013.01)

(58) Field of Classification Search
CPC .............. G06Q 40/02; G06Q 40/06
See application file for complete search history.

(56) References Cited

U.S. PATENT DOCUMENTS 6,985,886 B1 *   1/2006   Broadbent ............. G06Q 10/10
                                                    340/5.41
7,653,592 B1 *   1/2010   Flaxman ................ G06Q 40/00
                                                    705/38

(Continued)

FOREIGN PATENT DOCUMENTS

WO   WO-2007025245 A2 *   3/2007   ............. G06Q 40/02
WO   WO-2011044066 A1 *   4/2011   ............ G06Q 50/167
WO   WO-2016160734 A1 *  10/2016   ........... G06F 16/2365

OTHER PUBLICATIONS

"Cisco Data Center Infrastructure 2.5 Design Guide," Updated Oct. 31, 2013, published on the internet at www.cisco.com/c/en/us/td/docs/solutions/Enterprise Data_Center (Year: 2013).*

(Continued)

*Primary Examiner* — Alexander G Kalinowski
*Assistant Examiner* — William B. Bunker
(74) *Attorney, Agent, or Firm* — Buchanan Ingersoll & Rooney PC; Robert J. Pugh

(57) ABSTRACT

Systems and methods are provided to facilitate a coordinated and concerted process between parties and activities related to procuring an asset, obtaining financing, and managing loans and debentures thereof. User interfaces generated via panels and screen displays are used to communicate between parties and coordinate activities related to processes involved with purchasing and obtaining an asset such as a home. Graphical displays provide users with a comprehensive overview of the process and illustrate the buyer's progress through the process. User inputs and system outputs effectuated through the user interfaces, along with methods of interaction between users and/or the system, provide a communication network to streamline information flow and orchestrate interaction.

17 Claims, 101 Drawing Sheets

Related U.S. Application Data filed on Feb. 20, 2015, provisional application No. 62/087,869, filed on Dec. 5, 2014, provisional application No. 62/087,976, filed on Dec. 5, 2014.

(56) References Cited

U.S. PATENT DOCUMENTS

| | | | | |
|---|---|---|---|---|
| 7,822,681 | B2* | 10/2010 | Farias | G06Q 20/102 705/38 |
| 7,885,887 | B2* | 2/2011 | Camelio | G06Q 10/10 705/37 |
| 7,925,579 | B1* | 4/2011 | Flaxman | G06Q 40/00 705/35 |
| 8,065,225 | B1* | 11/2011 | Lewis, Jr. | G06Q 40/025 705/38 |
| 8,162,226 | B2* | 4/2012 | Winters | G06Q 20/10 235/375 |
| 8,417,625 | B2* | 4/2013 | Bannerjee | G06Q 40/00 705/38 |
| 9,152,995 | B2* | 10/2015 | Sullivan | G06Q 10/06 |
| 9,313,209 | B2* | 4/2016 | Corr | G06Q 40/02 |
| 10,037,558 | B1* | 7/2018 | Thomas | G06Q 40/02 |
| 10,839,455 | B2* | 11/2020 | Ruebush | G06Q 40/025 |
| 2003/0033241 | A1* | 2/2003 | Harari | G06Q 40/025 705/38 |
| 2007/0050285 | A1* | 3/2007 | Freeman | G06Q 40/02 705/38 |
| 2011/0191137 | A1* | 8/2011 | Strange | G06Q 10/06313 705/7.23 |
| 2011/0270740 | A1* | 11/2011 | Pickett | G06Q 40/025 705/38 |
| 2012/0303515 | A1* | 11/2012 | Guida | G06Q 40/025 705/38 |
| 2013/0339219 | A1* | 12/2013 | Bernheimer | G06Q 40/02 705/38 |
| 2016/0140654 | A1* | 5/2016 | Bhat | G06Q 10/06316 705/7.26 |

OTHER PUBLICATIONS

Serguievskaia et al. "Framework Architecture of e-Loan Negotiation System," 3rd International Conference on Information and Communication Technologies: From Theory to Applications (pp. 1-6) (Year: 2008).*

Zhang, "Business modeling of the Banking Loans System based on UML," Proceedings of 2011 International Conference on Computer Science and Network Technology (vol. 2, pp. 678-681) (Year: 2011).*

* cited by examiner

300
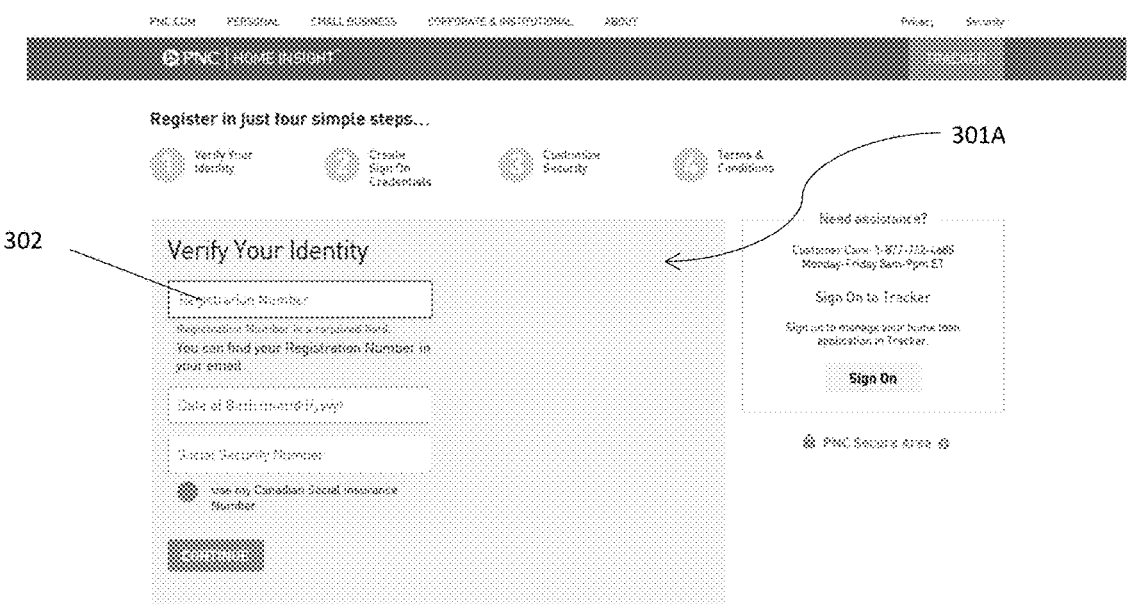
302
301A
FIG. 4A

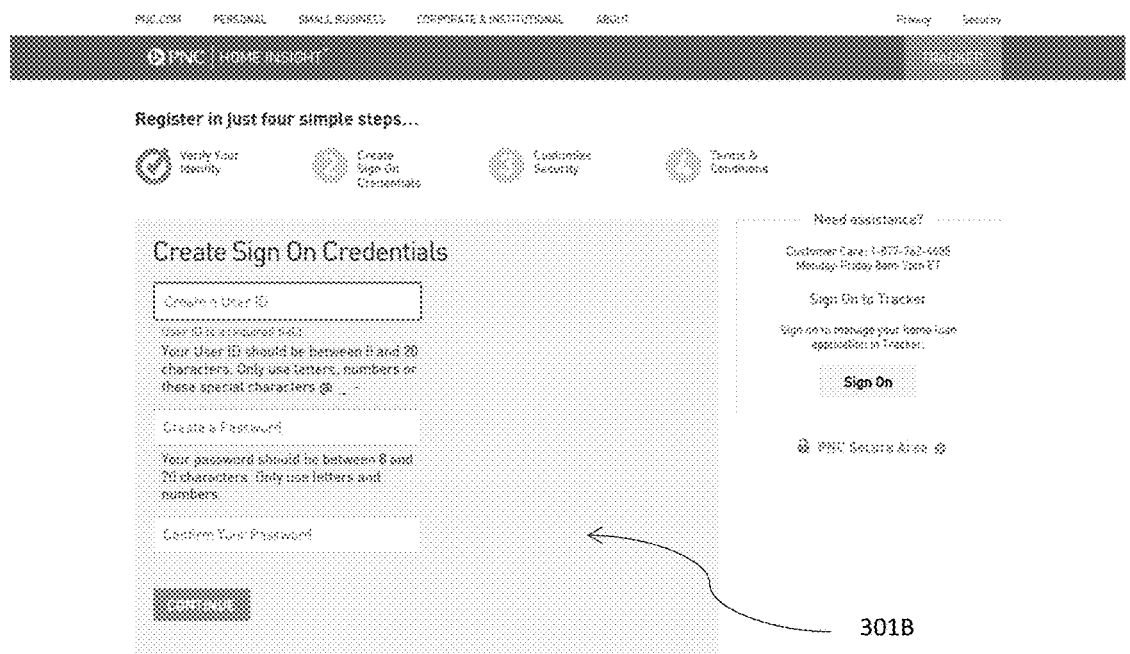
FIG. 4B

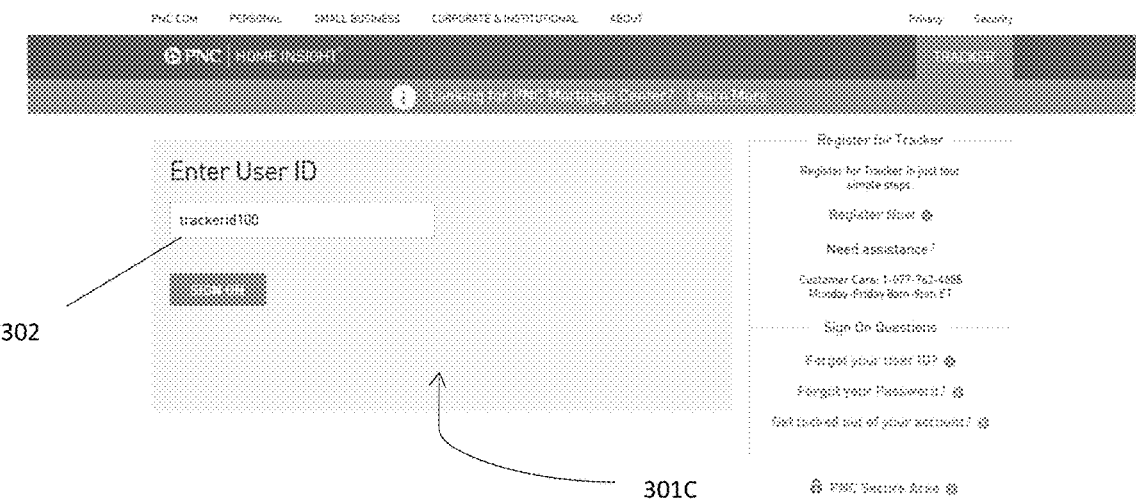
FIG. 4C

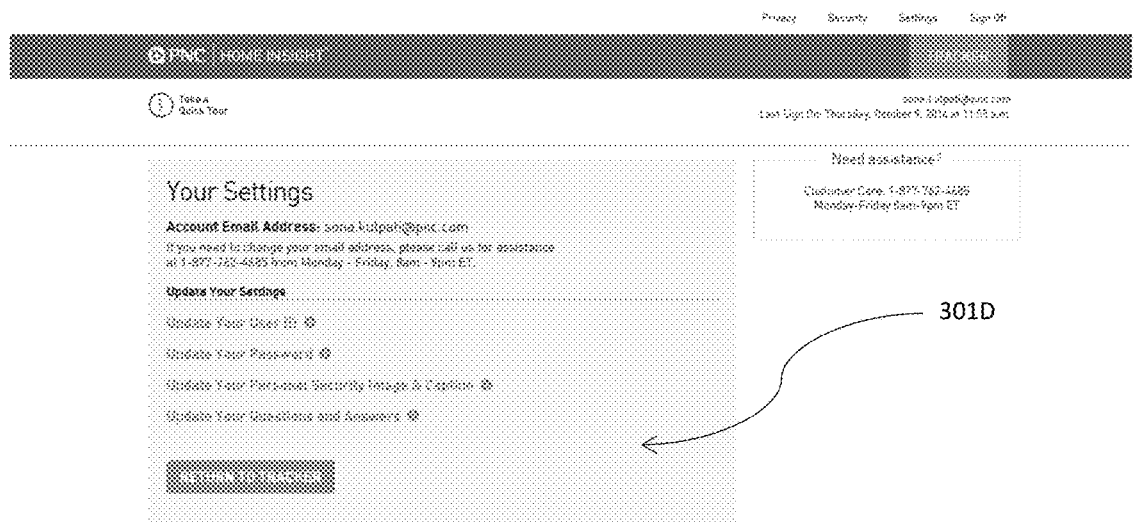
FIG. 4D

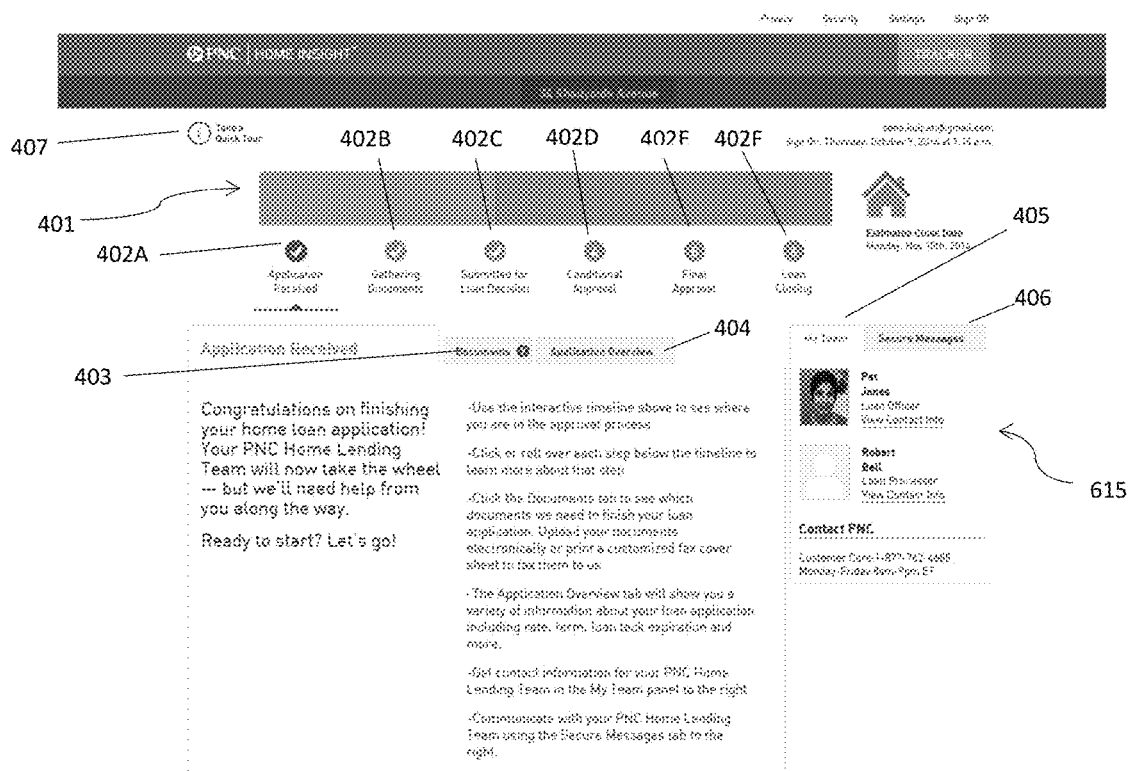
FIG. 5

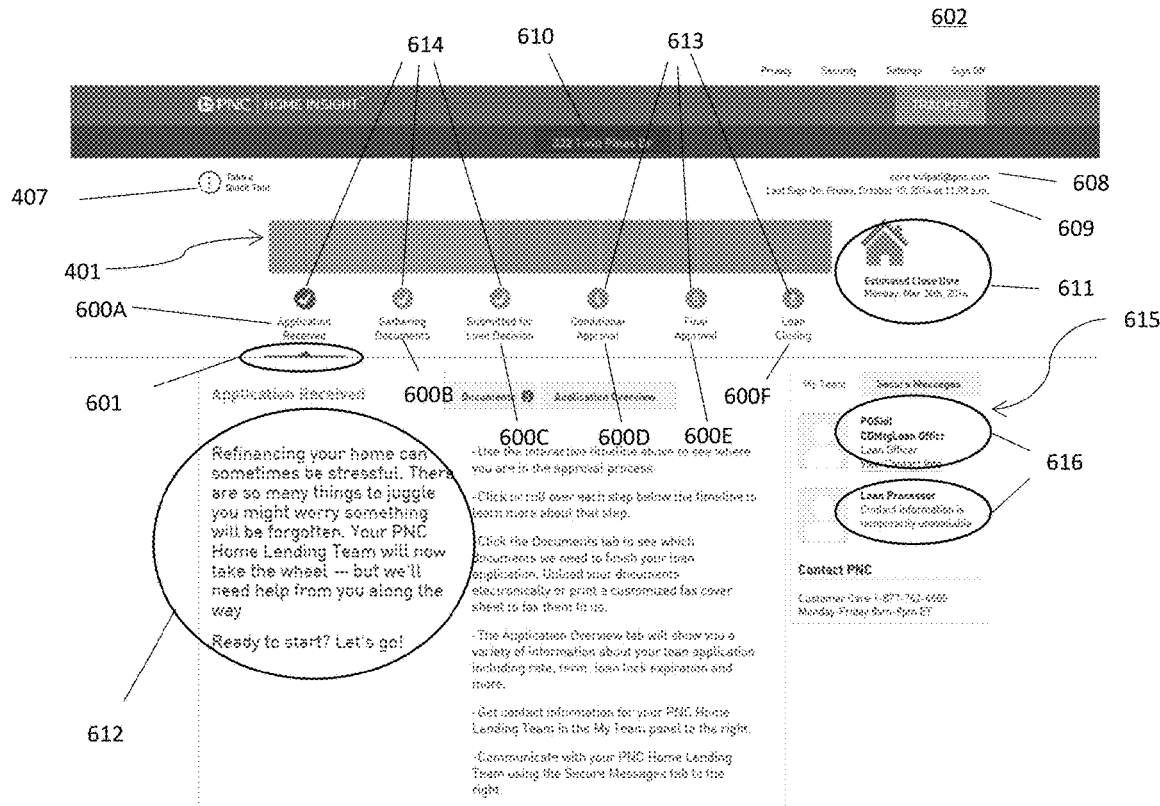
FIG. 7A

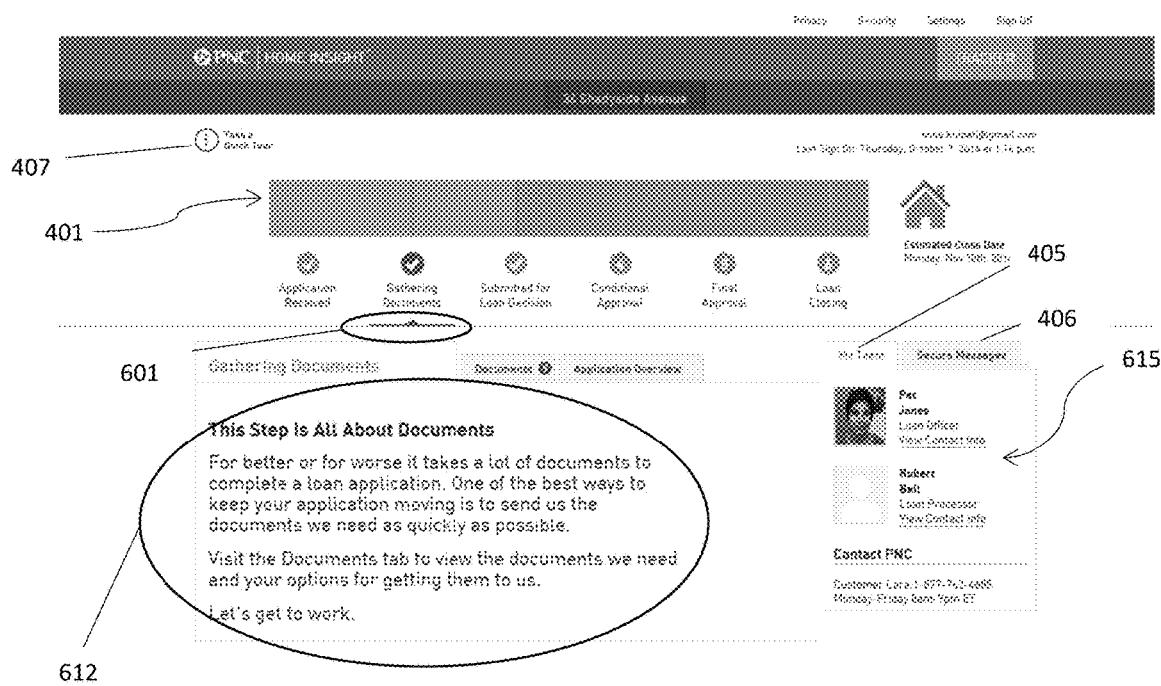
FIG. 7B

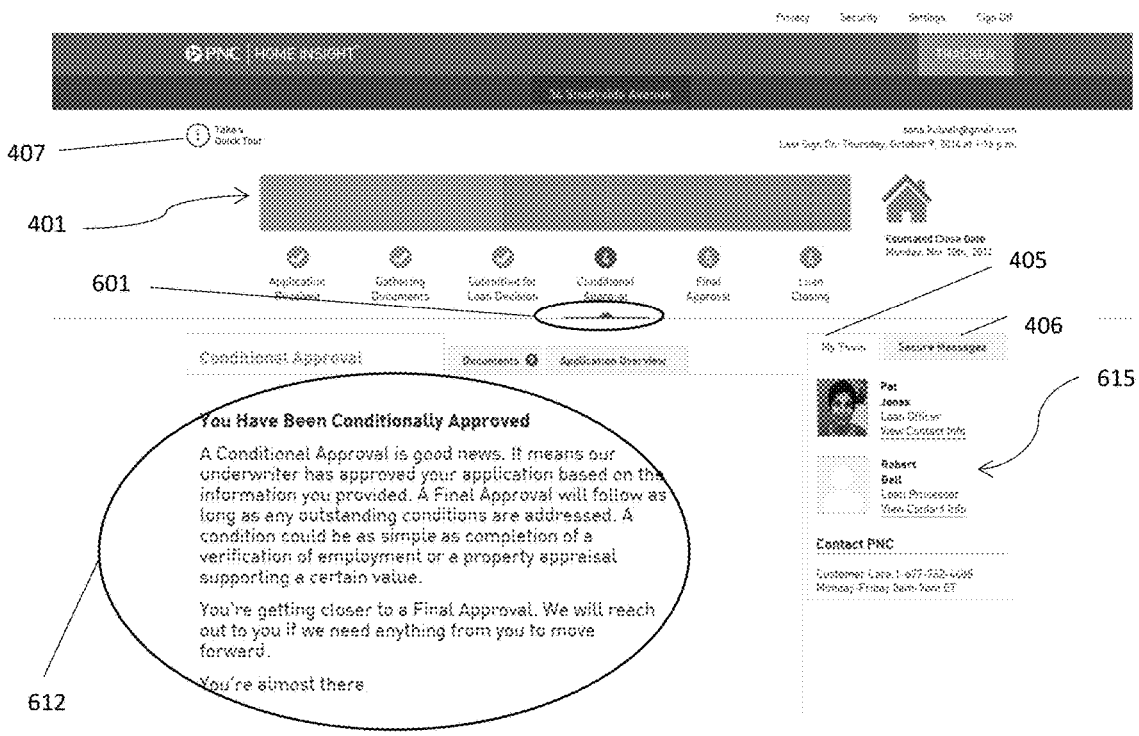
FIG. 7D

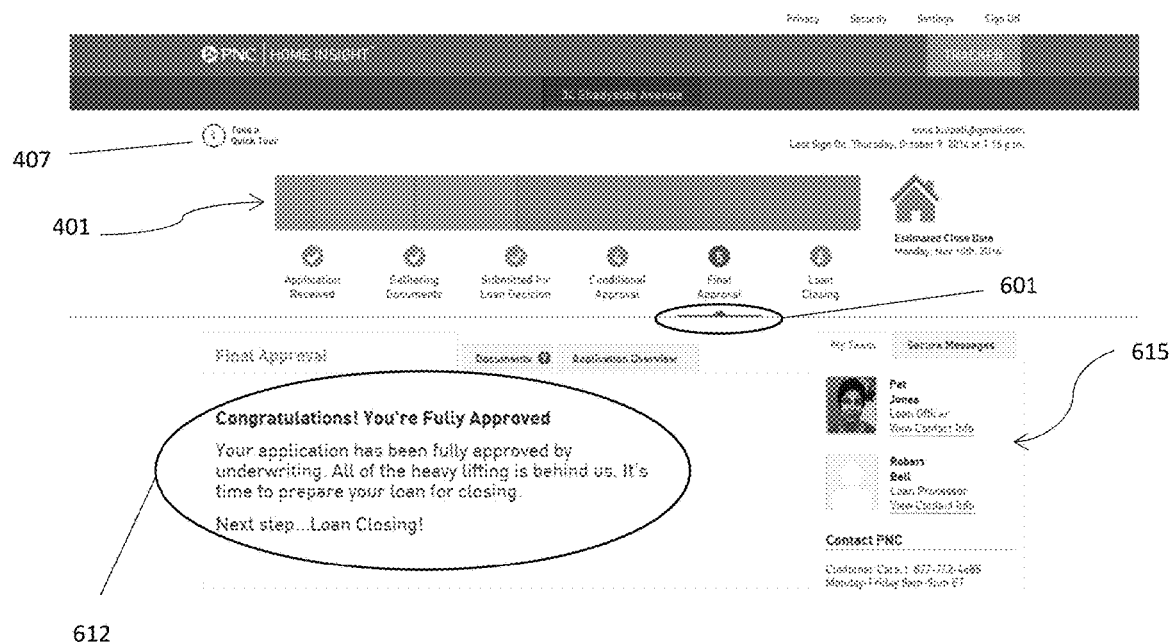
FIG. 7E

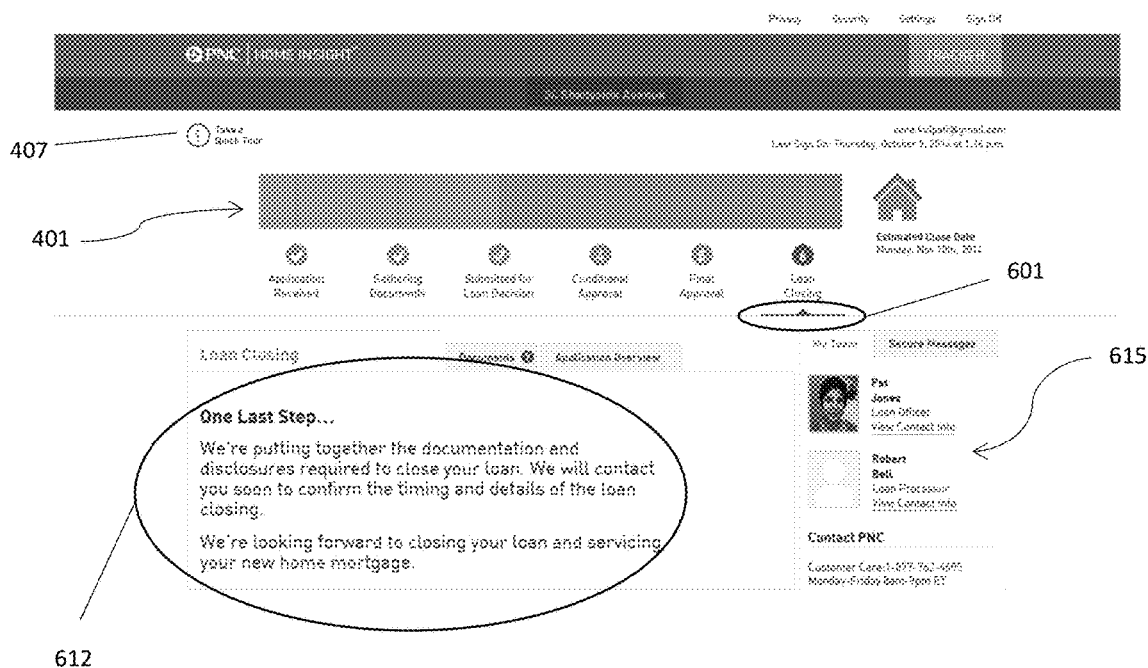
FIG. 7F

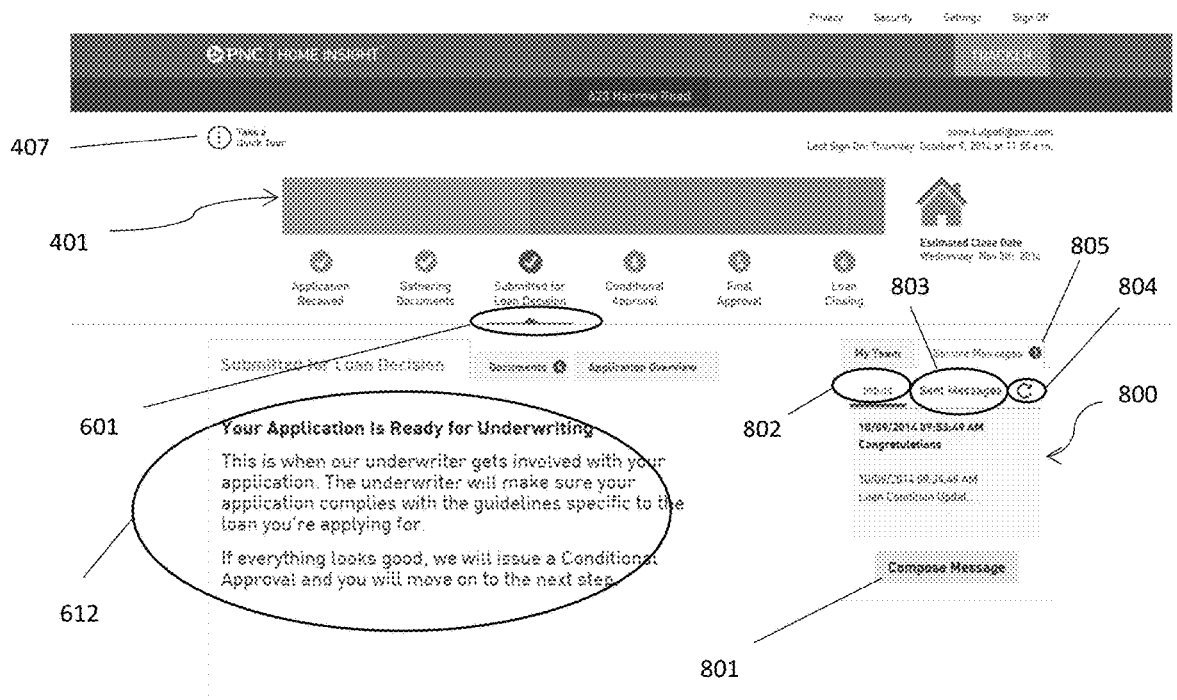
FIG. 9A

Hi Peter:

We are happy to inform you that another client, Mark Hagan, would like to send you mortgage application updates with PNC AgentView™. With AgentView you will receive real-time email updates when your client's application reaches key milestones. You will also receive a summary email every Monday showing which steps have been completed and which steps remain. Simply register for AgentView and start receiving updates for the following clients' applications:

Mark Hagan
    Timothy Johnston ———— 1201

Registering is easy! You can register in just 5 minutes from your laptop or mobile phone.

1. Visit pnc.com/agentview and click "Register Now"
2. Enter your unique registration number when prompted: ———— 1200
   Registration Number: 4739834499
3. We will send you a text message with a confirmation code to the business cell phone number provided to us by your client. You will need to enter the confirmation code in order to complete registration.
4. Provide a few more details for security purposes.

And that's it. You only have to register once. You will automatically receive updates for clients that invite you in the future. You can learn more about the AgentView service by visiting pnc.com/agentview.

If you have questions about AgentView you can also contact the PNC Customer Care team.
PNC Customer Care: 1-877-762-4685
Monday - Friday, 8 a.m. to 9 p.m. Eastern Time This mailbox is not monitored. Please do not reply.
PNC AgentView is a service mark of The PNC Financial Services Group, Inc.
PNC has a pending patent application directed at various features and functions of PNC AgentView.
PNC Mortgage is a division of PNC Bank, National Association, a subsidiary of PNC. All loans are provided by PNC Bank, National Association and are subject to credit approval and property appraisal.

This message was sent as a service e-mail to facilitate your participation in PNC AgentView and to advise you of an important message related to your clients' mortgage application.

FIG. 13B

1300
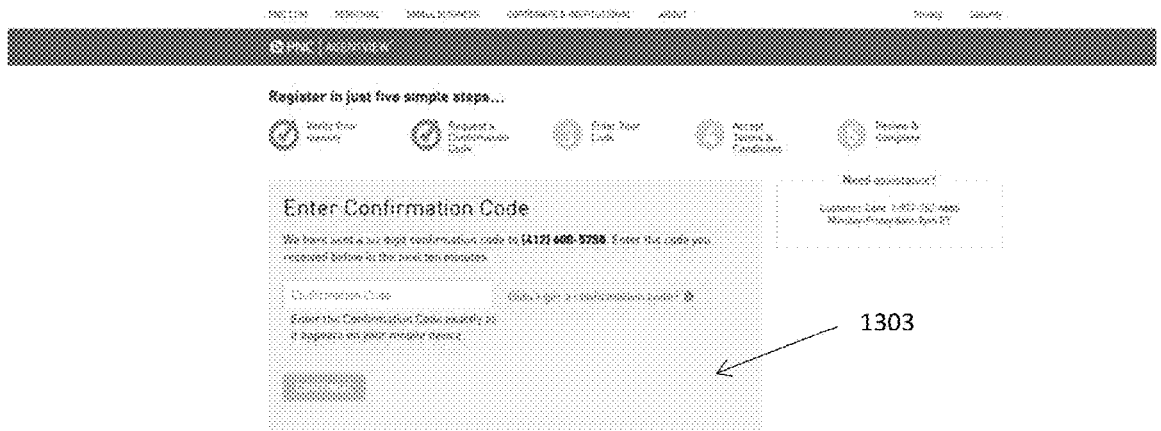
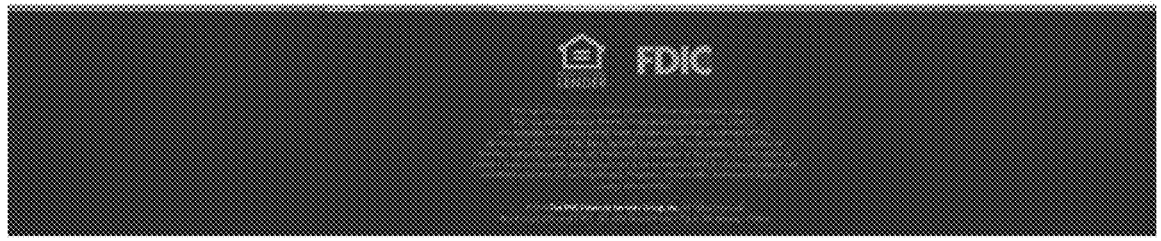
1303
FIG. 14C

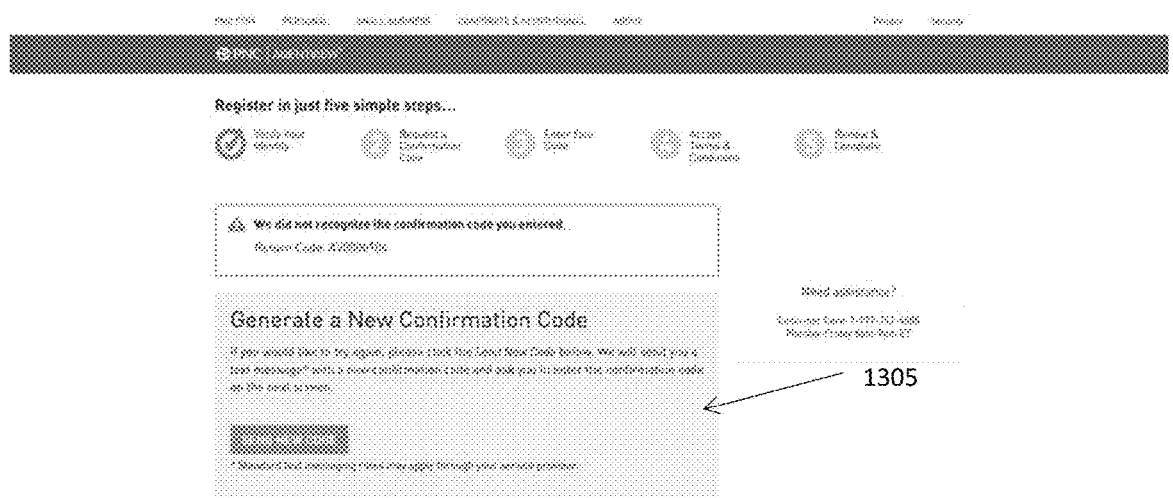
FIG. 14E

FIG. 14G

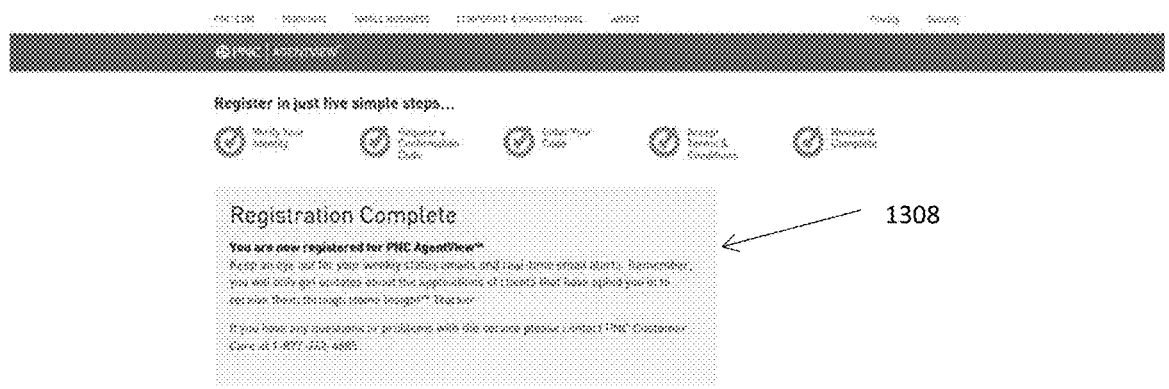
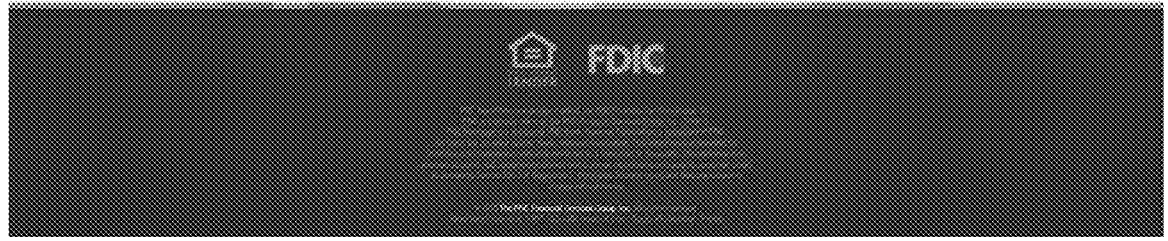
FIG. 14H

1400

1410

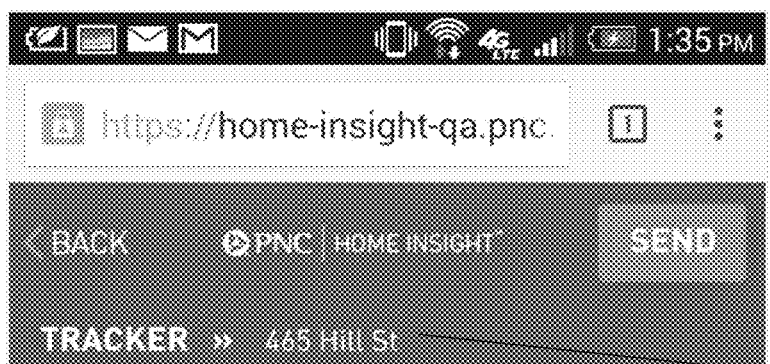
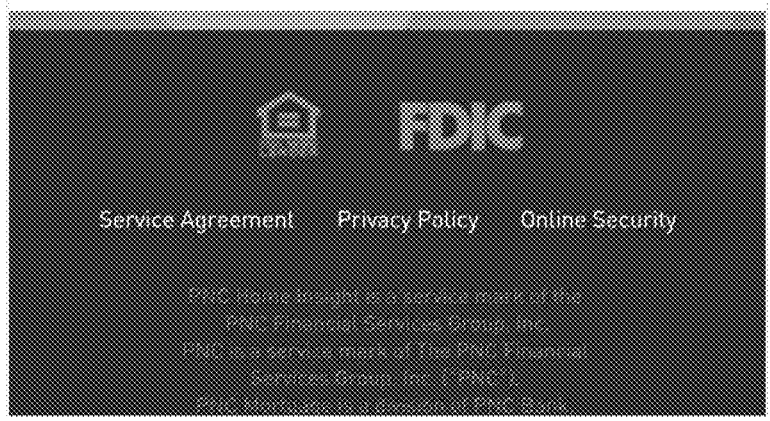
FIG. 20E

1210'

1211'

1210'

PNC AgentView℠ delivers a higher level of transparency between you, your client, and their PNC lending team by keeping everyone involved and informed throughout the mortgage application process.

Register for PNC AgentView in just a few simple steps.

KEY FEATURES

Weekly Status Updates

Get a single weekly status email for all of your clients with active mortgage applications at PNC who opt you in. Your weekly status update includes:

- Current Status – Find out where your client is in the application process.
- Anticipated Close Date – Get the estimated close date for your client's application.
- Loan Officer and Processor Information – Get contact information for the loan officer responsible for your client's mortgage application.

Real-time Email Alerts

Receive real-time email alerts when your client's application reaches key milestones. Updates include:

- Conditionally Approved – Find out when your client's application is conditionally approved.
- Appraisal Approved – Find out when your client's appraisal is approved.
- Cleared to Close – Find out when your client's application reaches final approval and we are ready to schedule closing.

HOW PNC AGENTVIEW WORKS

1 Your client opts you in to receive application status updates...
Clients who apply for a home loan with PNC can opt-in their real estate agent to receive application status updates through PNC Home Insight℠ Tracker. Your clients need your name, mobile phone number and email address to complete the opt-in process.

2 You get an email inviting you to register for PNC AgentView...
You will receive an email inviting you to register for PNC AgentView. Once registered you will begin receiving updates about your client's application. After your initial registration, you will automatically get updates from other clients who opt you in. You don't have to register again.

3 You start receiving PNC AgentView updates...
You will start receiving a weekly summary and real-time email updates about all of your clients who have opted you in. You can turn off the PNC AgentView updates at anytime by calling 1-877-762-4685.

🔒 Your Clients' Information is Secure
PNC AgentView is built to PNC's rigorous security standards to ensure your clients' information is safe and secure.

PNC AgentView is a service mark of the PNC Financial Services Group, Inc.
PNC has a pending patent application directed at various features and functions of PNC AgentView.

Have a question about AgentView?
Give us a call.

1-877-762-4685

Monday - Friday | 8am - 9pm ET

FIG. 24

1300'
1308' 
FIG. 25D

SYSTEMS AND METHODS FOR MANAGING HOME MORTGAGE LOANS

CROSS-REFERENCE TO RELATED APPLICATIONS

The present application claims the benefit of U.S. Provisional Application No. 62/118,502, filed Feb. 20, 2015, entitled "Methods for Managing Home Mortgage Loans"; U.S. Provisional Application No. 62/118,492, filed Feb. 20, 2015, entitled "Systems for Managing Home Mortgage Loans"; U.S. Provisional Application No. 62/087,869, filed Dec. 5, 2014, entitled "Systems for Managing Home Mortgage Loans"; and U.S. Provisional Application No. 62/087,976, filed Dec. 5, 2014, entitled "Methods for Managing Home Mortgage Loans", all of which are incorporated herein by reference in their entireties.

TECHNICAL FIELD

The present disclosure generally relates to systems and methods for procuring assets, facilitating financing, and managing loans and debentures thereof, specifically for assets related to real property and debt related to mortgage loans

BACKGROUND OF INVENTION

Procuring assets of relatively significant value, such as a home for example, often times involves financing. Even if financing is not required, it may be beneficial to leverage to avail relatively lower interest rates of debt while using retained earnings to capitalize on higher rate of returns of other investments. However, the process of procuring such an asset, obtaining financing, and managing debt associated with it may be complicated. Adding to the complexity may be a myriad of laws, regulations, and policy procedures. As a result, several parties may become involved, each performing various activities, which may further convolute the process. This may be particularly evident to buyers, realtors, loan processors, and loan officers involved with a buyer's purchase of a home. These factors tend to increase the cost, monetary and real, of procuring, financing, and managing assets and debt associated with them.

Financial institutions are often at the forefront of facilitating such a process, typically providing tools, expertise, advice, and of course financing. A system for managing home mortgage loans and a method of employing that system configured to enabling concerted coordination of various activities and involved parties would be beneficial to all parties involved. Such a system and method would generate efficiencies while increasing robustness of the system managing the process. Such a system and method would reduce activities performed, which would result in less resources and system infrastructure employed. Such a system and method would increase communications of distilled information between parties, which would reduce error, redundancy, and even system repugnancy. Such a system and method would disseminate filtered information, which would result in increased transparency, preparedness of parties, and compliance with laws, regulations, and policy procedures. Improvement in efficiencies and robustness would result in improved business process flows for a financial institution and/or other entity employing such a system and method, while producing a product/service that is salutary to all parties involved.

Thus, there is a need for a technical solution to provide a system and a method to facilitate a coordinated and concerted process between parties and activities related to procuring an asset, obtaining financing, and managing loans and debentures thereof.

Prior art systems and methods exist to procure assets. Other prior art exists to obtain financing. Other prior art exists to manage debt. Yet, these all suffer from distinct disadvantages and problems that the presently disclosed system and method do not have, overcome, and/or solve. Prior art technology involves too many communications and requires too large a commitment of computer resources, particularly if used when attempting to implement the full-service managing processes described herein. Not only do the presently disclosed system and method streamline these full-service managing processes, they improve system architecture by obviating complicated, redundant, and inefficient communications that would otherwise be required by prior art. The disclosed system carrying out the disclosed method enables such improvements through a cost effective, computationally minimal system having more efficient communications, less data storage, and less infrastructure than comparable prior art systems suitable for carrying out such processes.

SUMMARY OF THE INVENTION

The present disclosure provides a description of a system and a method for managing home mortgage loans. While exemplary embodiments may provide systems and methods for managing secured debt, the disclosed systems and methods may be applicable to procuring assets with or without financing, facilitating financing with or without procuring an asset, and/or managing debt in a form of secured debt and/or debentures. Assets managed by the disclosed systems and methods may be tangible, may be intangible, or may even be equity of an asset. The methods described herein combine aspects of the disclosed systems to improve upon processes for purchasing an asset, obtaining financing, and managing debt associated therewith.

The system may comprise a processor that may be operatively associated with at least one module, wherein the processor may be programmed to execute computer-readable instructions included within a module. Each module may be configured to generate a graphical user interface (GUI) and/or other user interface enabling at least one user to issue commands and/or to access data stored on a data storage media operatively associated with the processor. A module may be programmed to display at least one panel, wherein a panel may be programmed to display information and grant access to data related to certain aspects and functionalities of the system. The system may be configured to provide a communication network to streamline information flow and orchestrate interaction between at least one user and the system and/or between a first user and a second user. Users may comprise a buyer, a loan officer, a loan processor, a broker, a financial institution, and/or any other third party and/or intermediary involved with a process of which the presently disclosed systems and methods manage.

The system is preferably configured to provide at least one module to facilitate a coordinated and concerted process between parties and activities. First and second modules are programmed to display information related to purchasing and financing an asset via at least one panel. A first panel, associated with the first module, is programmed to display information related to establishing a profile, setting up a secure login, and/or obtaining an account for a buyer. A second panel, associated with the first module, is programmed to display information related to managing processes related to financing, applying for pre-approval, and/or coordinating activities between various users and/or the system. A third panel, associated with the second module, is programmed to enable registration of a broker associated with the buyer. A fourth panel, associated with the second module, is programmed to communicate updates and coordinate activities between the broker, the buyer, and/or the system. Other panels may be provided to display other relevant information. Any panel may be configured to facilitate interaction between a user and the system and/or a first user and a second user. This may be achieved through a GUI and/or other user interface programmed to be operatively associated with a panel and/or a module.

Preferably, the first panel is configured to enable establishment of an account between a buyer and the system.

Preferably, the second panel is configured to provide indicators enabling a buyer to apply for pre-approval, track the progress of purchasing, and/or financing an asset (e.g., a home) and manage processes associated therewith. Activation of indicators enables a buyer to propagate through screen displays in an orchestrated manner, which may prompt a buyer to take certain action, inform a buyer of actions of others, and/or provide a buyer with a comprehensive overview of processes involved with purchasing and/or financing an asset. Graphical and/or textual displays inform a buyer at which stage in the process he/she is in. Graphical and/or textual displays also enable users (e.g., a buyer) to monitor activities of other users (e.g., a loan officer).

Activation of other indicators in the second panel enables users to communicate and coordinate activities with other users and/or the system regarding the process. The system may be configured to provide automatic communications between users and/or the system to facilitate any of the processes associated with applying for pre-approval, tracking the progress of purchasing, and/or financing an asset (e.g., a home) and management thereof. In addition, the second panel may be programmed to allow a buyer to opt in a broker so that a registered broker may be associated with the buyer in the system. This enables the broker to be included within the tracking process.

Preferably, the third panel is configured to enable establishment of an account between a broker and the system upon registering with the system. Brokers may register via the third panel.

Once registered, the broker preferably receives updates via the fourth panel regarding any one of a plurality of buyers that the broker is associated with.

Upon establishing an account via the first panel, a buyer may instantly establish communications with various entities (e.g., users) associated with the tracking process. The buyer may navigate through the second panel to coordinate activities and perform actions associated with the processes of facilitating the purchasing of and/or financing of an asset. The buyer may also use the second panel to opt in his/her broker (i.e., realtor) to keep the broker in the loop and assist with coordinating activities with the broker. The system facilitates the process of tracking the progress of users as well as communications between the users, while the method enables coordinated activities via the system in an automated and efficient manner.

Each module and/or panel may display information and/or grant access to data related to certain aspects and functionalities of the system. User inputs and system outputs effectuated through a plurality of indicators and screen displays, along with methods of interaction between users and/or the system, provide a communication network to streamline information flow and orchestrate interaction between at least one user and the system and/or between a first user and a second user via a computationally minimal system having efficient communications, minimal data storage, and less infrastructure. Such communication network creates a team of users.

Creating a team of users in a manner described herein not only facilitates coordination and enables concerted action by each user, it may foster ownership by each user into the processes described herein that prior art systems and methods fail to provide. This augments the reduction in processing times, manpower, and infrastructure that the system and method provides through many of its features. Automatic and discriminatorily transmitting communications by the system may provide distilled information to users and filtered data to devices, which may minimize process times and computational operations of the system.

Coordinated and concerted action via the disclosed system and method by each party may generate synergies and improve business processes employed by each user by exploiting operational aspects of the system and/or integrating outputs and/or saved data thereof into their own business processes. This may enable users to employ traffic tracking and analytics to configure the system to utilize user inputs and system outputs to automatically optimize operational functionality. The coordinated and concerted action may also enable a user (e.g., a financial institution) to quickly and accurately profile customers (e.g., buyers) and channel them into products/services that are within a particular line of business, thereby maximize efficiency of business processes. This further augments the reduction of requisite infrastructure and computational power that the system and method provides through many of its features, which may generate improved operational capacity and response times.

Configurations of screen displays, indicators, and graphical and textual elements provide users with copious data, but convey pertinent information to a user via effective sensory stimulation so as to direct a user to distilled information, enabling a user to make an informed decision quickly and effectively. A user is not only presented with a hierarchal tree display of information, but also presented with a vantage exhibition thereof that is conducive to quick observation and investigation.

While these potential advantages are made possible by technical solutions offered herein, they are not required to be achieved. The presently disclosed systems and methods can be implemented to achieve technical advantages, whether or not these potential advantages, individually or in combinations, are sought or achieved.

BRIEF DESCRIPTION OF THE DRAWINGS

Exemplary embodiments are best understood from the following detailed description when read in conjunction with the accompanying drawings. Included in the drawings are the following figures:

FIGS. 4A-D are exemplary embodiments of various login screen displays of a first panel;

FIG. 5 is an exemplary embodiment of a screen display of a second panel showing an exemplary progress indicator;

FIGS. 7A-F are exemplary embodiments of various screen displays of process steps that may be accessed via process step indicators of a progress indicator;

FIGS. 9A-D are exemplary embodiments of a secure message panel display showing exemplary embodiments of a compose message screen display, a confirmation sent screen display, and a message detail screen display;

FIGS. 13A-C are exemplary communications and screen displays that may be transmitted to a broker soliciting an opt in by a buyer;

Figure 14G:
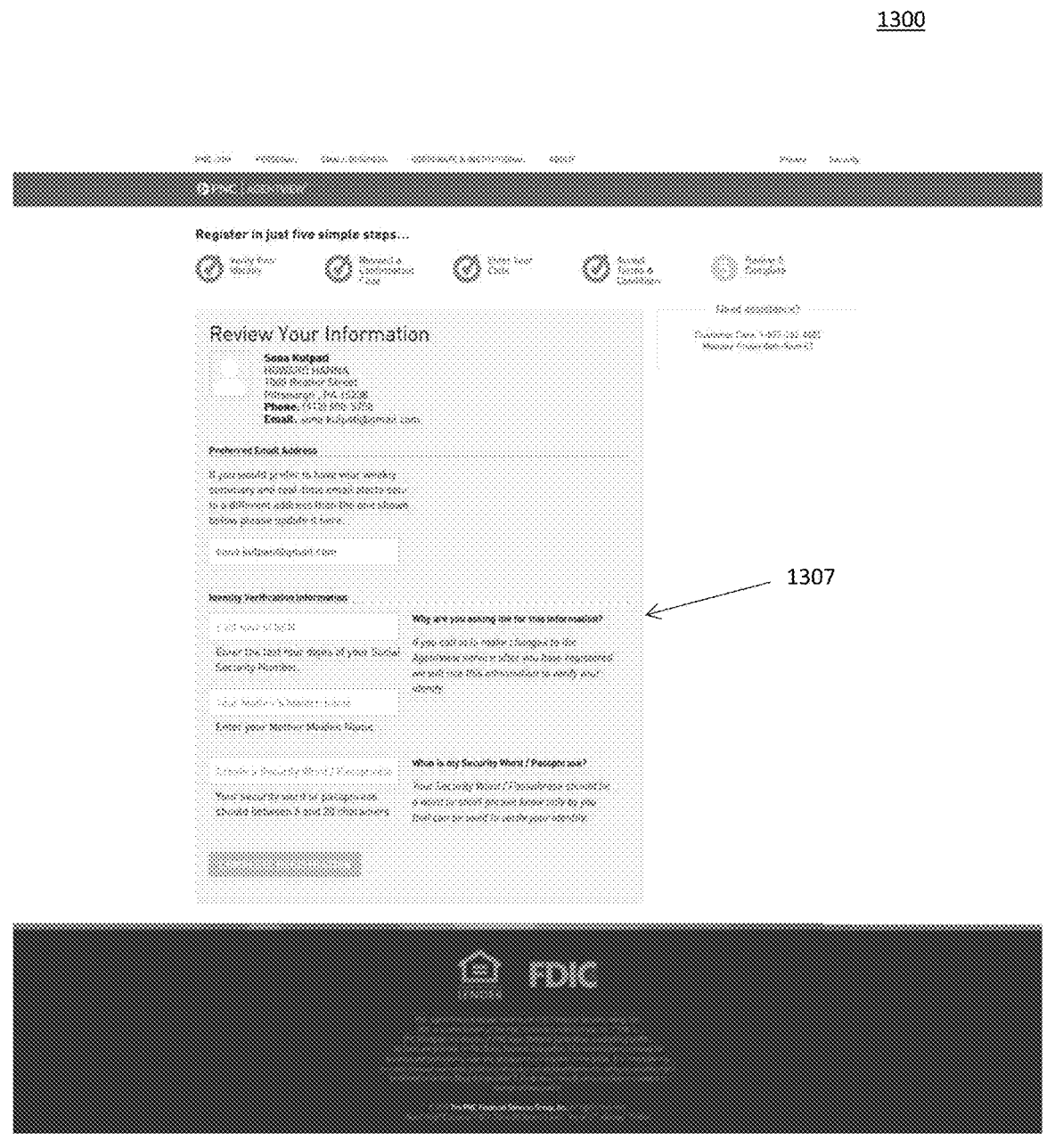

FIGS. 14A-H are exemplary registration screens a broker may use to register with the system;

FIGS. 20A-F are exemplary embodiments of a secure message panel display configured as a mobile version showing exemplary mobile versions of a compose message screen display and a confirmation sent screen display;

FIG. 24 is an exemplary mobile version embodiment of the AgentView landing webpage; and, FIGS. 25A-D are exemplary mobile version embodiments of the registration screens for the broker.

DETAILED DESCRIPTION OF THE INVENTION

Figure 1:
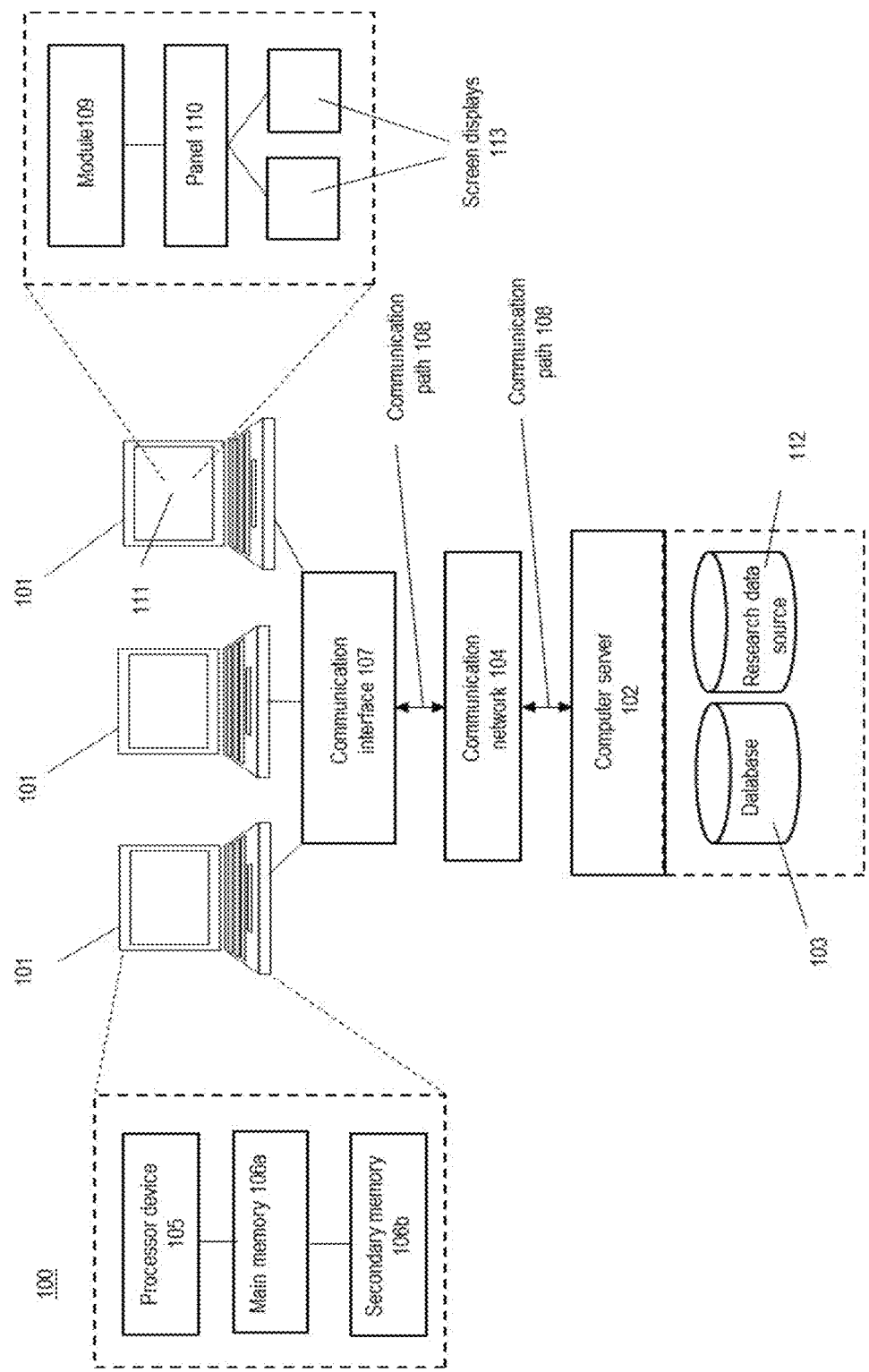
FIG. 1 is an exemplary embodiment of a disclosed system.
Figure 2A:
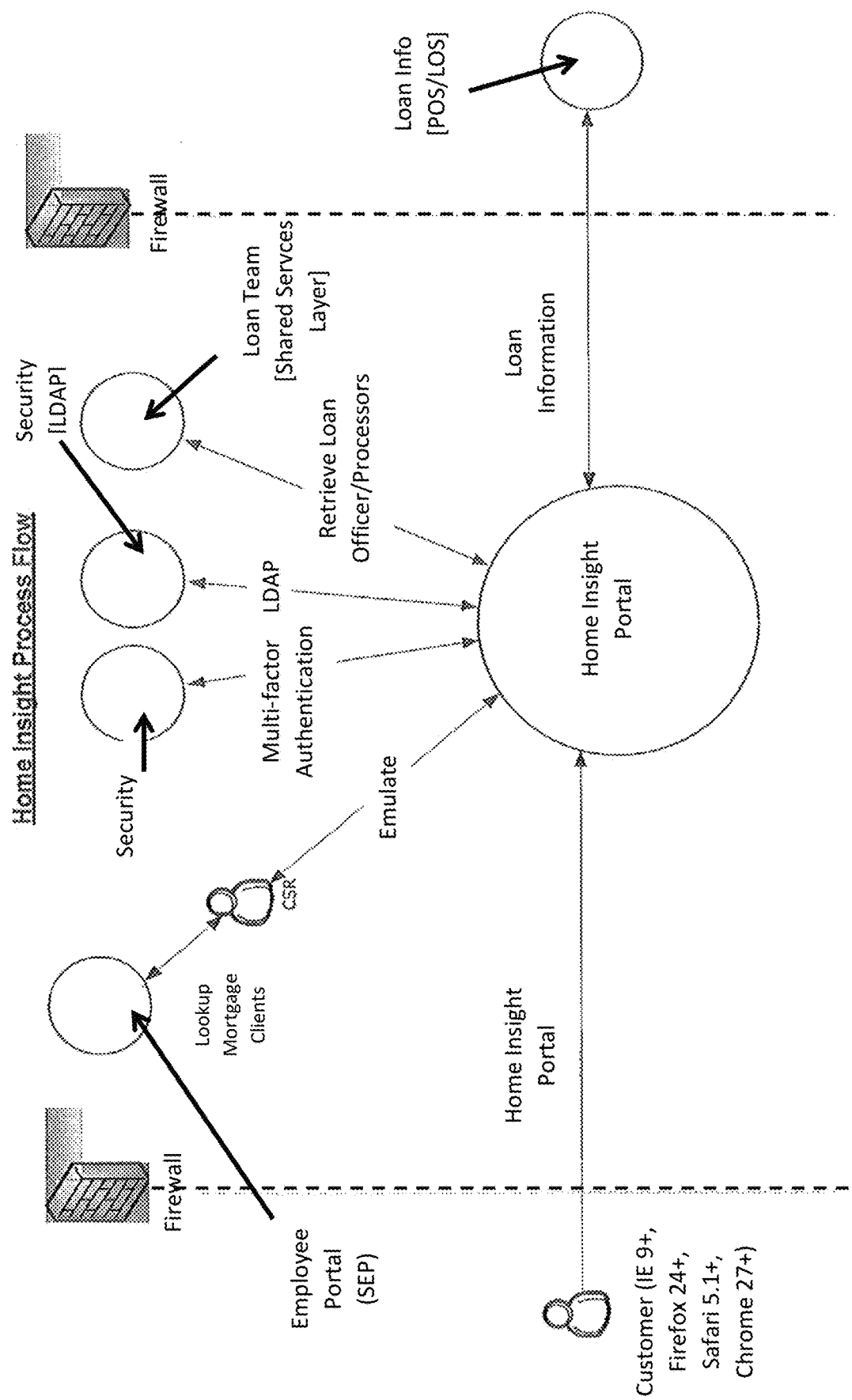
FIGS. 2A-2F are exemplary system architecture diagrams and process flows through the architecture.
Figure 2B:
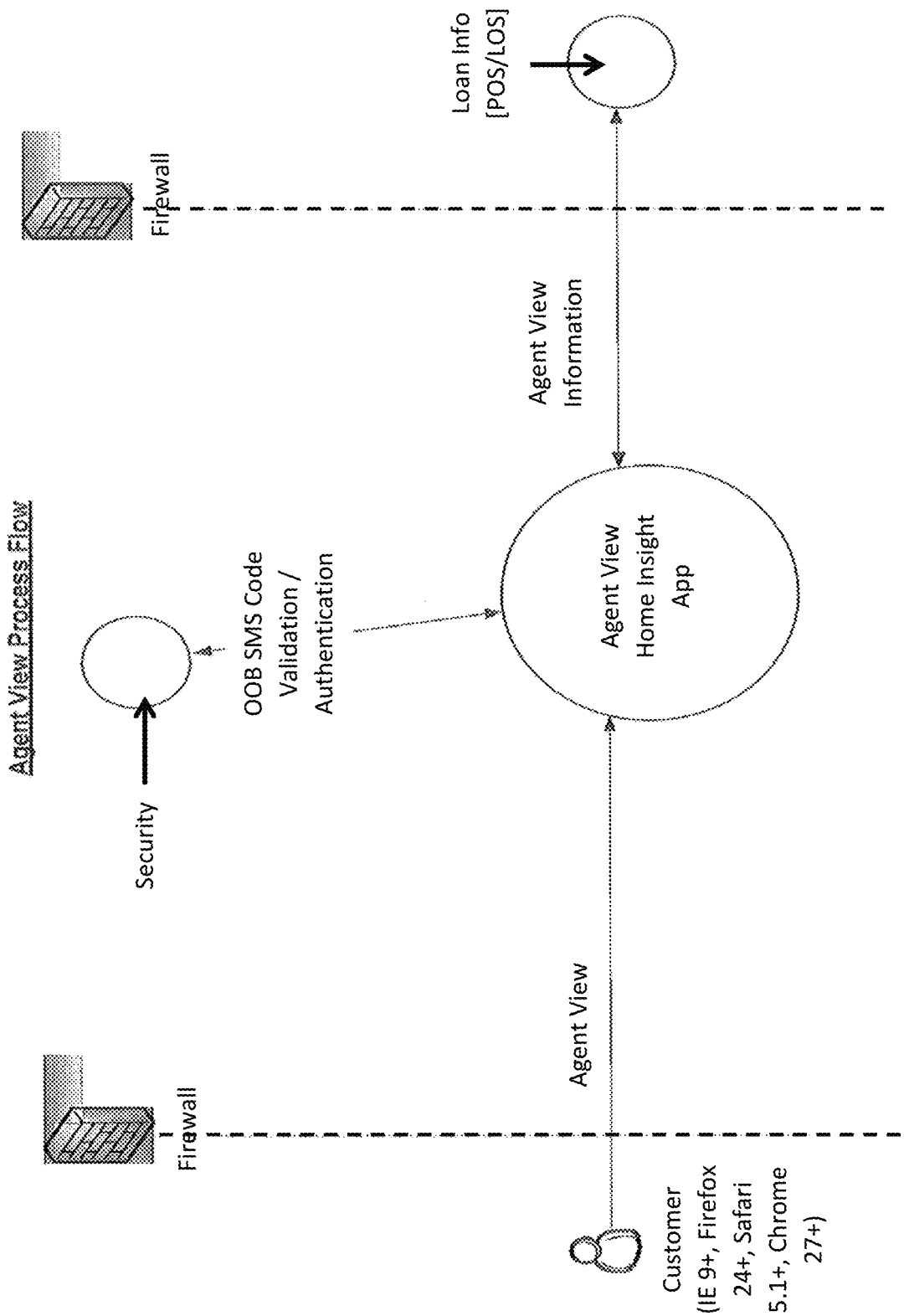
Figure 2C:
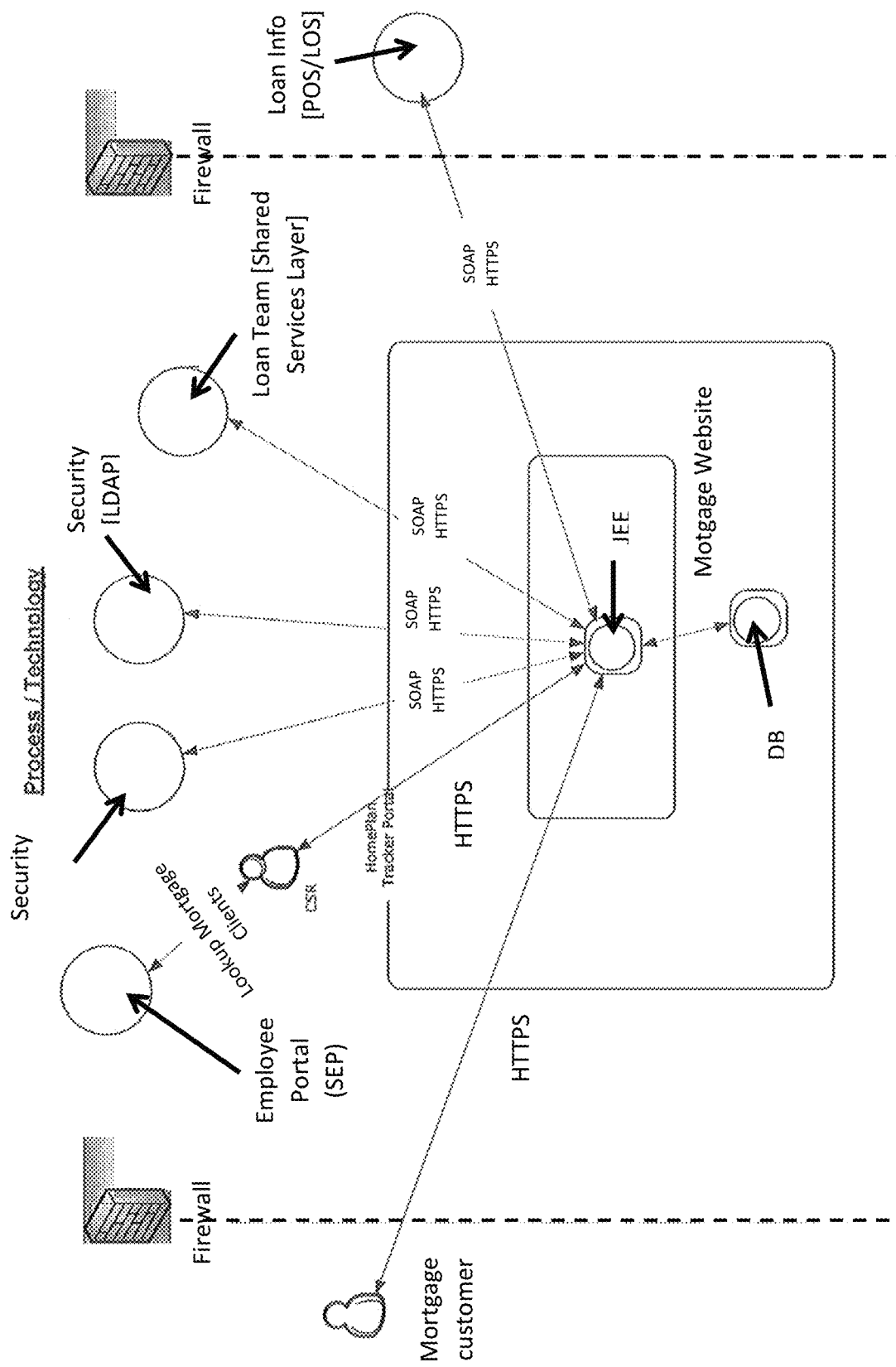
Figure 2D:
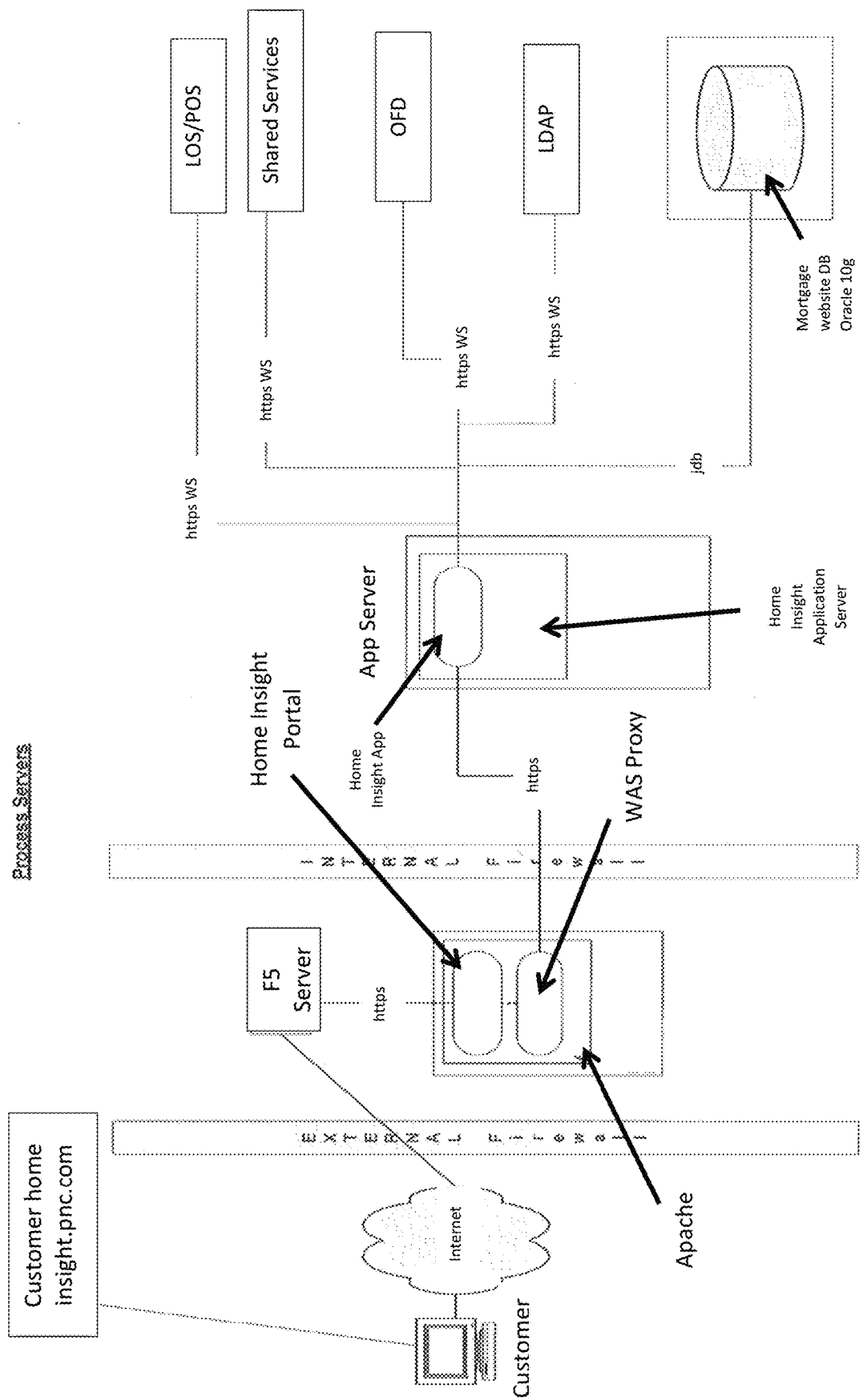
Figure 2E:
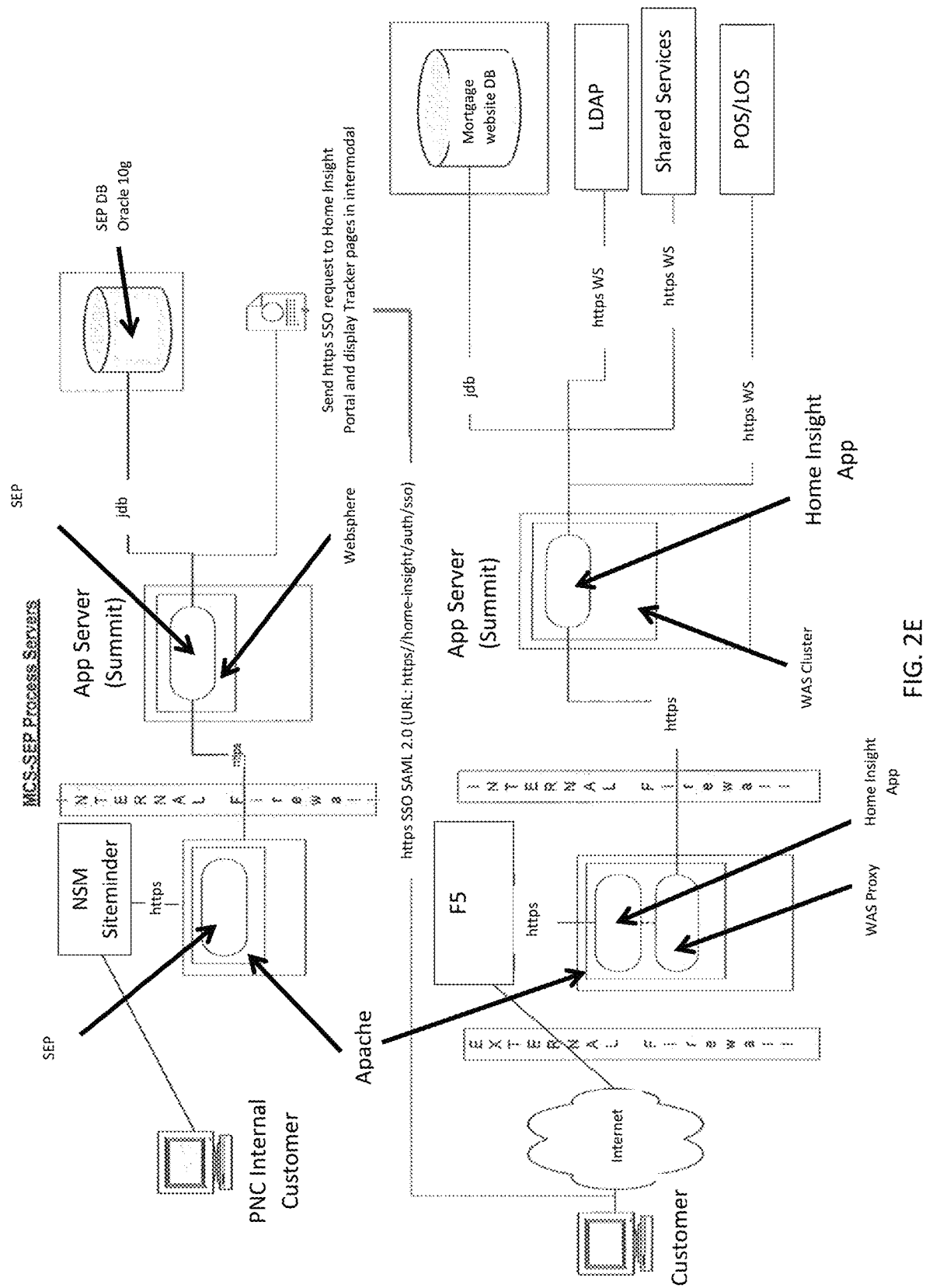
Figure 2F:
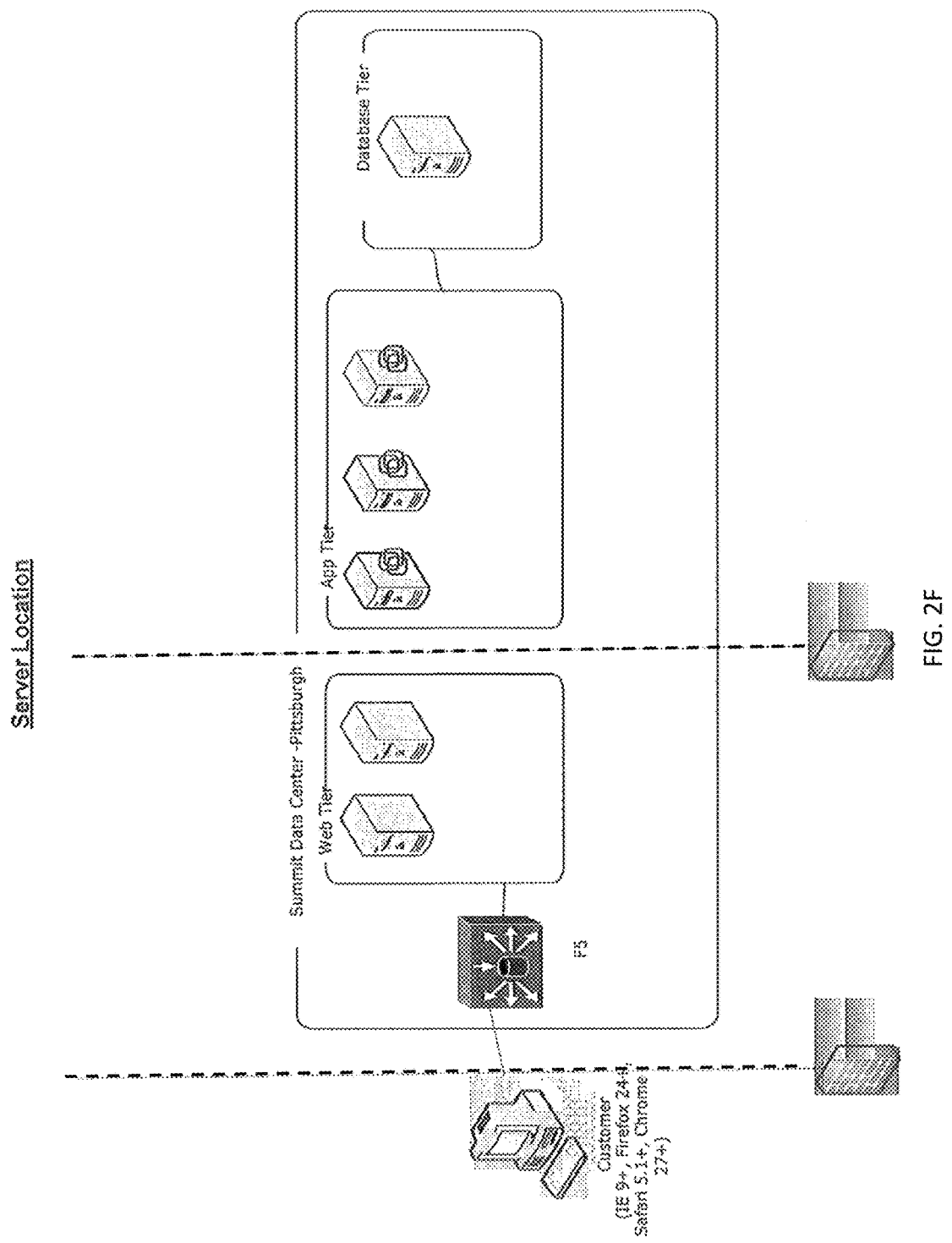
Figure 3:
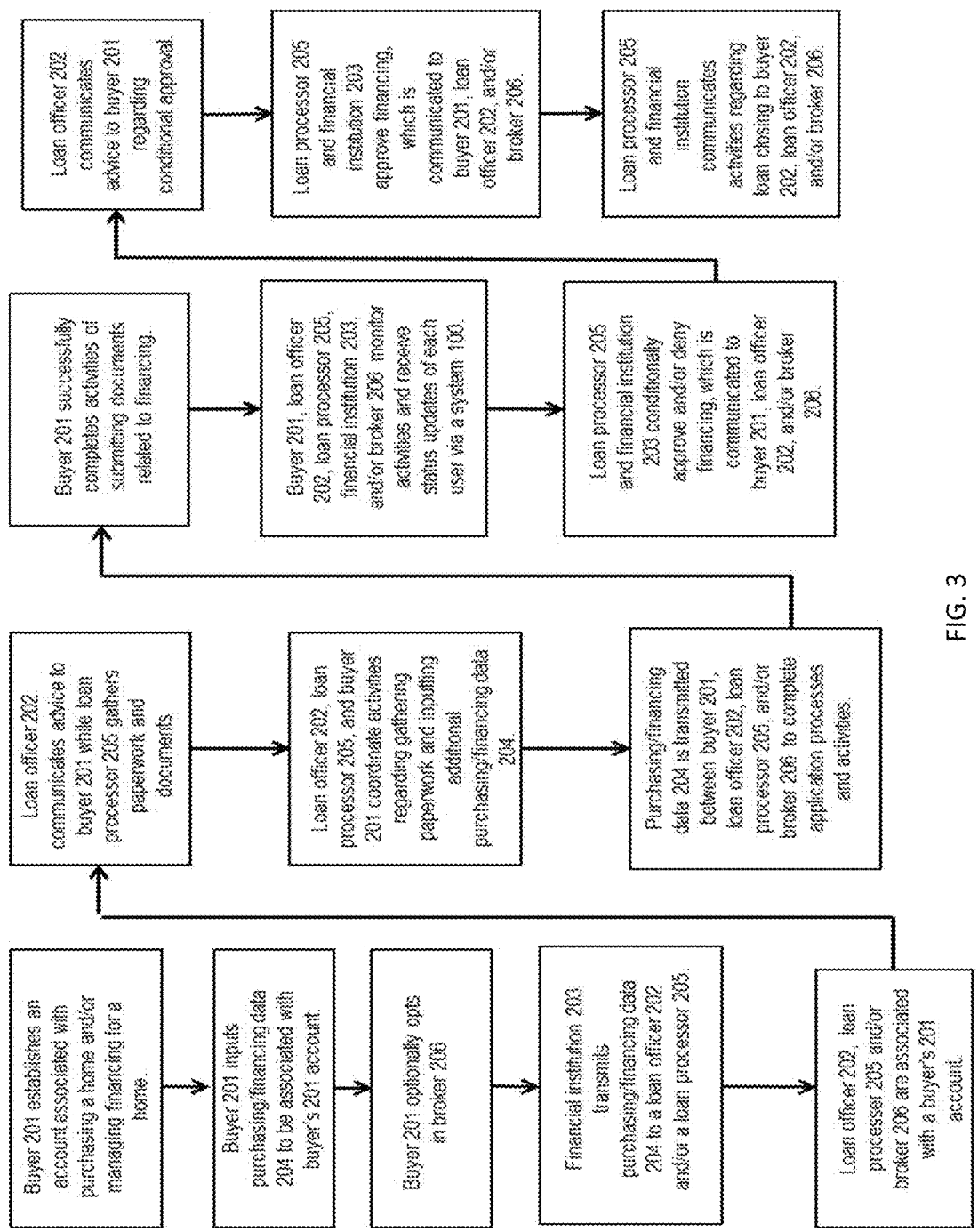
FIG. 3 is an exemplary embodiment of a disclosed method that may be implemented by a disclosed system.

Referring now to FIGS. 1-3, exemplary embodiments of the system 100, processes flows through the system 100, and embodiments of the method 200 that may be implemented by the system 100, are disclosed. The method 200 combines aspects of the system 100 for procuring a home, financing a home, and managing a home mortgage loan. While exemplary embodiments may provide a system 100 and method 200 for managing secured debt, the disclosed system 100 and method 200 may be applicable to procuring assets with or without financing, facilitating financing with or without procuring an asset, and/or managing debt in a form of secured debt and/or debentures. Assets managed by the disclosed system 100 and method 200 may be tangible, may be intangible, and may even be equity of an asset. Therefore, the method 200 combines aspects of the system 100 to improve upon processes for purchasing an asset, obtaining financing, and managing debt associated therewith.

The system 100 is configured to provide a communication network to streamline information flow and orchestrate interaction between at least one user and the system 100 and/or between a first user and a second user. Users may comprise a buyer 201, a loan officer 202, a financial institution 203, a broker 206 and any other third party and/or intermediary, such as a loan processor 205, involved with a process of which the presently disclosed systems 100 and methods 200 manage.

An intermediary may also be an underwriter. A third party and/or intermediary may be an agent of a user or separate entity. A buyer 201 is an entity, or an agent of an entity, seeking to purchase an asset, obtain financing, and/or manage debt. A loan officer 202 is an entity providing advice, expertise, and/or recommendations regarding applications for debt. A loan officer may be an agent of a financial institution 203 or be an intermediary between a financial institution 203 and a borrower (e.g., buyer 201). A financial institution 203 is an entity providing financial services and dealing with financial transactions, such as investments, loans, deposits, and withdrawals. A broker 206 is an entity arranging a transaction between a buyer 201 and a seller of an asset. A broker 206 may be a realtor, for example. A broker 206 may be an agent for a buyer 201, a seller, or both.

While users may include a buyer 201, a loan officer 202, loan processor 205, a financial institution 203, and/or broker 206, the system 100 and method 200 may also be applicable with or without any one of those entities.

Computer System Architecture

A system 100 comprising a plurality of computer devices 101, computer servers 102, databases 103, communication networks 104, and communication path/connections 108 is preferably used to implement a disclosed method 200. Each buyer 201, loan officer 202, loan processor 205, financial institution 203, and broker 206 may use at least one processor device 105, memory storage 106a, 106b, and communications interface 107 to store and communicate purchasing/financing data 204. Purchasing/financing data 204 may comprise buyer data, broker data, loan officer data, financial institution data, other user data, asset data, financing data, debt data, and processing paperwork data. Each computer server 102 may be connected to at least one database 103, where application software executed by each computer device 101 may carry out functions of storing, coalescing, configuring, and transmitting data. Application software may be stored on any type of suitable computer-readable medium or media. This may be a non-transitory computer-readable medium or media. This may be, for example, a magnetic storage medium, optical storage medium, or the like.

Wherever a buyer 201, loan officer 202, financial institution 203, loan processor 205, broker 206, or other user and/or entity are referenced in this disclosure, it is understood that this reference includes the associated computer device(s) 101, computer server(s) 102, database(s) 103, and/or uses thereof. Distributed communication networks 104 used to enable connection and communication between each computer device 101 are common in the art. Each computer device 101 may communicate in whole, or in part, via web-sites through a communication network 104, which may include a web-server.

FIG. 1 illustrates an embodiment of the system 100 in which embodiments of the method 200, or portions thereof, may be implemented as computer-readable code. For example, an interaction between a buyer 201, a loan officer 202, broker 206, and a financial institution 203 of FIGS. 1-3 may be implemented in the system 100 using hardware, software, firmware, non-transitory computer readable media having instructions stored thereon, or a combination thereof, and may be implemented in a single or multiple of systems 100 or other processing systems. Hardware, software, or any combination thereof may embody modules and components used to implement methods 200 depicted in FIG. 3.

If programmable logic is used, such logic may execute on a commercially available processing platform or a special purpose device. A person having ordinary skill in the art will appreciate, with the benefit of the present disclosure, that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device 105 and a memory 106a, 106b may be used to implement the herein described embodiments.

A processor device 105, as discussed herein, may be a single processor, a plurality of processors, or combinations thereof. Processor devices 105 may have one or more processor cores. The terms computer program medium, non-transitory computer readable medium, and computer usable medium, as discussed herein, are used to generally refer to tangible media, such as, for example, a removable storage unit and a hard disk installed in a hard disk drive.

A processor device 105 may be a special purpose or a general purpose processor device. A processor device 105 may be connected to a communication infrastructure. A communication infrastructure may include, but is not limited to, a bus, message queue, network, multi-core message-passing scheme, etc. The system 100 may include a main memory 106a. A main memory 106a may include, but is not limited to, a random access memory, a read-only memory, etc. The system 100 may include a secondary memory 106b. A secondary memory 106b may include, but is not limited to, a hard disk drive, a removable storage drive, a floppy disk drive, a magnetic tape drive, an optical disk drive, a flash memory, etc. A memory 106a, 106b may be a non-volatile memory.

A removable storage drive may read from and/or write to a removable storage unit in a well-known manner. A removable storage unit may include a removable storage media that may be read by, and written to, a removable storage drive. For example, if a removable storage drive is a floppy disk drive, a removable storage unit may be a floppy disk. A removable storage unit may be non-transitory computer readable recording media.

In some embodiments, a secondary memory 106b may include alternative means for allowing computer programs or other instructions to be loaded into the system 100. This may be, for example, a removable storage unit and/or an interface. Examples of such means may include, but are not limited to, a program cartridge and cartridge interface (e.g., as found in video game systems), a removable memory chip (e.g., EEPROM, PROM, etc.) and associated socket, and/or other removable storage units and interfaces, as will be apparent, with the benefit of the present disclosure, to persons having skill in the relevant art.

The system 100 may include a communications interface 107. A communications interface 107 may be configured to allow software and data to be transferred between the system 100 and external devices. Communications interfaces 107 may include, but are not limited to, a modem, a network interface (e.g., an Ethernet card), a communications port, a PCMCIA slot and card, etc. Software and data transferred via a communications interface may be in a form of signals, which may be electronic, electromagnetic, optical, or other signals as will be apparent, with the benefit of the present disclosure, to persons having skill in the relevant art. Signals may travel via a communications path 108, which may be configured to carry signals and may be implemented using wire, cable, fiber optics, a phone line, a cellular phone link, a radio frequency link, etc.

Computer program medium and computer usable medium may refer to memories, such as a main memory 106a and a secondary memory 106b, which may be memory semiconductors (e.g. DRAMs, etc.). These computer program products may be means for providing software to the system 100. Computer programs (e.g., computer control logic) may be stored in a main memory 106a and/or a secondary memory 106b. Computer programs may also be received via a communications interface 107. Such computer programs, when executed by a processor device 105, may enable the system 100 to the implement method 200 discussed herein and illustrated by FIG. 3. Accordingly, such computer programs may represent controllers of a disclosed system 100. Where the present disclosure is implemented using software, the software may be stored in a computer program product and loaded into the system 100 using a removable storage drive, an interface, a hard disk drive, and/or a communications interface 107.

A computer device 101 may be a processor, a microprocessor, minicomputer, server, mainframe, laptop, personal data assistant, wireless email device, cellular phone, smartphone, pager, fax machine, scanner, or any other programmable device configured to enable transmission and/or reception of data, which may be over a network. A computer device 101 may include a peripheral device, such as an input/output device. A peripheral device may include, but is not limited to, a keyboard, a mouse, a screen display, a touch screen, a pen, a monitor, a printer, a hard disk drive, a floppy disk drive, a joystick, an image scanner, etc.

One or more electronic computer networks may be utilized by the system 100 to promote communication among different components, transfer data, and/or share resource information. Such computer networks may be embodied as, but not limited to, at least one of Ethernet, wireless LAN, MAN, WAN, VPN, SAN, GAN, HomePNA, etc.

Referring to FIGS. 2A-2F, exemplary system 100 architecture diagrams and process flows through the architecture are disclosed. FIG. 2A illustrates a process flow through an exemplary architecture that may occur via interactions between a buyer 201 and the system 100. The buyer 201 can be depicted as the customer in the diagram, where the buyer 201 transmits data through the firewall to the Home Insight Portal via a GUI of the system 100. Additional purchasing/financing data 204 (e.g., loan information) can be transmitted through the firewall to the Home Insight Portal in a similar manner. As shown in FIG. 2A, a financial institution 203 that may be hosting the system 100 can be located between the firewalls, where a buyer 201 information and loan information may be transferred through the firewalls to be processed by and stored within the system 100. Some embodiments may enable an employee-user of the financial institution to emulate the buyer 201 to assist with use of the system 100 and facilitate desired processing of data by the system 100. The transfer of data through the firewalls can occur through a portal, which may be a module 109 generated by the system 100 to facilitate coordinated data transfer. Various security measures and multi-factor authentication processes can occur with the purchasing/financing data 204 and with any other data transmissions within the firewall, such as Lightweight Directory Access Protocol (LDAP), Symantic Endpoint Protection (SEP), etc. FIG. 2B illustrates a process flow through an exemplary architecture that may occur via interactions between a broker 206 and the system 100, in which broker data can be transmitted through the firewall in a similar fashion as described above. Again, a financial institution 203 that may be hosting the system 100 can be located between the firewalls, where broker 206 (e.g., the customer in FIG. 2B) information and loan information may be transferred through the firewalls to be processed by and stored within the system 100.

As shown in FIG. 2C, the process technology can include use of Java EE and Modular Wiring Systems (MWS) as the interfacing module(s) to a database, where Simple Object Access Protocols (SOAP) can be used to facilitate data transfer between nodes within the firewall. Process servers can be used between external and internal firewalls to facilitate data transfers from computer devices 101 of a user and a database 103 of the system 100, where https Wiring Systems (https WS), Java Database Connectivity Technology (jdbc), and https Single Sign On Security Assertion Markup Language (http SSO SAML) with proxy servers may be used as communication lines between servers and databases.

FIGS. 2D-2F depict exemplary architectures of a system 100 in which a user is situated outside an external firewall and in communication with a Web Tier server via a F5 proxy server. An employee-user of the financial institution 203 is seen as being located between the external firewall and the internal firewall. Communications with the Application Tier and Database Tier are achieved through the internal firewall via https WS, as described above.

Various embodiments of the present disclosure are described in terms of this example system 100. It will become apparent, with the benefit of the present disclosure, to a person skilled in the relevant art how to implement various disclosed methods 200 using other embodiments of disclosed systems 100, along with other embodiments of computer architectures. Although operations may be described as a sequential process, some of the operations may be performed in parallel, concurrently, and/or in a distributed environment, and with program code stored locally or remotely for access by single or multi-processor machines. In some embodiments, the order of operations may be rearranged without departing from the spirit of the disclosed subject matter.

Detailed Description of Exemplary Systems and Methods

The present disclosure may reference a constituent part or user in singular, but it is understood that a plurality thereof may be utilized and that any description of singulars is done for the sake of ease of illustration and brevity. It is understood that the same reference may include the singular or plurality of that constituent part or user without deviating from the teachings of the system 100 and method 200.

While exemplary embodiments may describe a financial institution 203 as providing a host system 100 for implementation of the method 200, one skilled in the art, with the benefit of the present disclosure, will appreciate that other users and entities capable of providing a host system 100 may do so.

The system 100 (e.g., a management system) may comprise a processor 105 (e.g., a management system processor) that may be operatively associated with at least one module 109, which may be displayed on a computer device monitor 111 of a computer device 101 (e.g., communication device). A processor 105 may be programmed to execute computer-readable instructions included within a module 109. Computer-readable instructions may be in a form of application software stored on a non-transitory computer readable medium operatively associated with a processor 105. Each module 109 may be configured to generate a GUI and/or other user interface enabling at least one user to issue commands, access data stored on a data storage media and/or database 103 (e.g., a management system database) operatively associated with a processor 105, and/or transmit data to and from the data storage media. A module 109 may include software, firmware, hardware, or any reasonable combination thereof.

A module 109 may be programmed to display at least one panel 110. A panel 110 may be configured to display information and grant access to data related to certain aspects and functionalities of the system 100. As will be described and illustrated later, at least one module 109 is programmed to display information related to purchasing and financing an asset via at least one panel 110. While each module 109 may be programmed to display information related to purchasing and financing an asset, each module 109 does so in a different manner. Furthermore, the different panels 110 of each module 109 are programmed to enable display and interaction between users and the system 100 in different ways. The differentiated displays and interactions of the various modules 109 and panels 110 are configured to enable concerted interaction, filtered display of information, and secure containment of sensitive information. Through the various modules 109 and panels 110, the system 100 provides a communication network 104 to streamline information flow and orchestrate interaction between at least one user and the system 100 and/or between a first user and a second user related to the processes associated with purchasing and financing an asset.

The system 100 may be configured to communicate with users and report to users about various activities and statuses of those activities. This may be by, but is not limited to, alerts, texts, email, instant messages, textual displays, graphical displays, and/or other electronic, magnetic, optical, or electromagnetic messaging sent via communication paths 108. Communications may comprise notifications reflecting actions that should be taken by a user. A communication may be saved or exported to a digital messaging system. This may be, but is not limited to, email, instant messenger, and/or a Short Messaging System (SMS). A communication may be saved or exported to a Personal Information Manager (PIM) or a Personal Data Manager (PDM). This may be, but is not limited to, Microsoft Outlook. The system 100 may be configured to enable a user to communicate to another user via a digital messaging system. Communications may be transmitted between users and/or between a user and the system 100. Communications may be sent periodically, due to a condition met, in response to an action initiated by a user, in response to an action completed by a user, and/or based upon a user's status. Communications may be sent automatically. Communications may be sent discriminatorily.

The system 100 may be configured to enable communication with at least one research data source 112. A research data source 112 may be, but is not limited to, data representing a research report, a news article, statistical data, a periodical publication, etc. Therefore, a communication may include a research data source 112, a portion of a research data source 112, acquisitioned data from a research data source 112, or a link to a research data source 112.

The system 100 may be configured to enable a user to upload and/or download data, email data, text data, fax data, or otherwise send and receive data between devices 101, servers 102, and/or systems 100 via a communication network 104. A device 101, server 102, and/or system 100 may be a remote device 101, remote server 102, and/or remote system 100. This may be achieved through a GUI and/or other user interface programmed to be operatively associated with a module 109 and/or panel 110.

As will be described and illustrated later, at least one panel 110 is programmed to at least display communications, messages, illustrations, and/or text on screen displays 113 that a user might receive from the system 100 and/or from another user. At least one panel 110 is programmed to display at least one indicator. An indicator may be configured to at least enable interaction between a user and the system 100. An indicator may be, but is not limited to, a user interface, a GUI, a graphical element, a graphical icon, a visual indicator, a text based interface, a graphical display, etc. An indicator may be programmed to at least: 1) enable a user to navigate between modules 109, panels 110, and/or screen displays 113 of the system 100; 2) modify data of the system 100; and/or 3) transmit and/or receive message data via a communication network 104. An indicator may be programmed as, but is not limited to, a toggle feature, a selection tab feature, a next/back feature, an input feature, add/delete feature, modify feature, save feature, upload/download feature, a messaging feature, a view historical data feature, print feature, view frequently asked questions feature, search database feature, affirmative/negative response feature, etc. An input indicator may be programmed to present a drop-down menu limiting a user to certain inputs. An input indicator may be provided with an interactive handle indicator, which may be programmed to enable a user to manipulate value inputs by acting upon an interactive handle. An indicator may be programmed to fade in, fade out, animate, change in size, etc. when activated.

A panel 110 may be programmed to receive inputs and generate outputs as numerical values, percentages, text, graphics, and/or proxy values thereof. This may be achieved via an indicator. An indicator may be programmed to modify data, and the display/manipulation thereof, of a panel 110 and/or screen display 113 from which an indicator is displayed. An indicator may be programmed to modify data, and the display/manipulation thereof, of any number of panels 110 and/or screen displays 113 to which it is associated even if that indicator is not displayed on any of those panels 110 and/or screen displays 113.

An indicator may be programmed to display a graphical and/or textual display of information (e.g., a "pop-up", comment, or definition) when activated. An indicator may be programmed to highlight upon being activated. Highlighting may include, but is not limited to, a modification in size and/or shape, a change in color/font/style, an animation, an activation of a haptic feedback motor/actuator, etc. Activation of an indicator may be performed by, but is not limited to: 1) selection; 2) hovering over with a cursor, peripheral device, or finger; 3) other stimulation, such as haptic stimulation; and/or, 4) any combination/permutation thereof.

As will be described and illustrated later, the system 100 may be configured to transmit communications and/or notifications to users in response to inputs by a user. These communications and/or notifications may direct a user to a module 109, a panel 110, a screen display 113, or an indicator to assist a user with navigation of the system 100. A communication and/or notification may inform a user to contact a financial institution 203, loan officer 202, and/or other user to obtain assistance and obtain additional information before proceeding. For example, a communication and/or notification may inform a user to contact a loan officer 202 of a financial institution 203 to obtain more information about available products and services offered by a financial institution 203 based upon inputs of a user. As another example, the system 100 may communicate a recommended loan officer 202 and/or available products and services based upon user inputs. The recommendations may be generated automatically via computer algorithms and/or by manual inputs of a user (e.g., financial institution 203).

Inputs, default values, and data acquisitioned may be saved and/or cached to be used later by a same user, by a different user, and/or by the system 100 whether such use is for a same application and/or different application. An application may be within a same or different module 109, panel 110, screen display 113, or indicator. Saved information may be cached locally (on a user device 101) and/or on any other system device 101 and/or database 103. Information may be saved locally using cookies, local storage, etc. The system 100 may be configured to enable a user to select whether to save and/or cache information locally. This may be done to accommodate a user with a device 101 that is a public device 101. Information may be saved for a set period of time (e.g., thirty days, during a login session, etc.). The system 100 may be configured to save information automatically, periodically, via activation of a save indicator by user, via an activation of a next/back indicator by a user, etc. The system 100 may be configured to automatically populate and/or display saved information each time a user logs in, navigates forward/backward, etc. The system 100 may be configured to update outputs if a user and/or system 100 subsequently accesses saved data after a predetermined time period elapses from a time the data has been saved.

Reset indicators may be provided within any module 109, panel 110, and/or screen display 113. A reset indicator may be programmed to clear, erase, write-over, purge, and/or de-link saved data so that saved data is not automatically populated and/or displayed. A reset indicator may be programmed to act upon data pertaining to a particular aspect or functionality of the system 100.

The system 100 may be programmed to use traffic tracking and analytics to configure the system 100 to utilize user inputs and system 100 outputs to automatically optimize operational functionality. This may be achieved through Adobe Site Catalyst tags, analytics and Tea Leaf, etc., which may be linked to customer support features of the system 100.

The method 200 of managing home mortgage loans, as carried out by the system 100, may comprise the following steps. A buyer 201 establishes an account associated with purchasing a home and/or managing financing for a home via the system 100. The buyer 201 inputs purchasing/financing data 204 to be associated with the buyer's 201 account via at least one indicator of a module 109 and/or panel 110. A financial institution 203 transmits the purchasing/financing data 204 to a loan officer 202 and/or a loan processor 205 via the system 100. The loan officer 202 and/or loan processor 205 is associated with the buyer's 201 account via the system 100. The loan officer 202 communicates advice to the buyer 201 while the loan processor 205 gathers paperwork and documents pertaining to the buyer's 201 purchasing/financing. The loan officer 202, loan processor 205, and/or buyer 201 coordinate activities regarding gathering paperwork and inputting additional purchasing/financing data 204 via the system 100. During the process, a buyer 201 may opt in a broker 206 so as to coordinate activities with the broker 206 as well.

Purchasing/financing data 204 is transmitted via the system 100 between the buyer 201, loan officer 202, loan processor 205, and/or broker 206 to complete application processes and activities. After the buyer 201 successfully completes the activities of submitting documents related to purchasing/financing, the buyer 201, loan officer 202, loan processor 205, financial institution 203, and/or broker 206 monitor activities and receive status updates, via the system 100, regarding the buyer's 201 progress associated with purchasing/financing.

During the process, the loan processor 205 and/or financial institution 203 may conditionally approve and/or deny the financing, which is communicated to the buyer 201, the loan officer 202, and/or broker 206 via the system 100. The loan officer 202 may communicate advice to the buyer 201 regarding the conditional approval and/or denial.

During the process, the loan processor 205 and/or financial institution 203 may approve financing, which is communicated to the buyer 201, loan officer 202, and/or broker 206. The loan processor 205 and/or financial institution 203 may communicate activities regarding the loan closing process and associated activities to the buyer 202, loan officer 202, and/or broker 206 via the system 100.

Detailed Description of Exemplary Systems Implementing Exemplary Methods

The system 100 preferably comprises a processor 105 operatively associated with at least one module 109, where each module 109 is programmed to display at least one panel 110. Preferably, a first module is programmed to display a first panel 300 and a second panel 400. Preferably, a second module is programmed to display third panel 1300, and communicate with the second panel 400 to generate a fourth panel 1400. The fourth panel 1400 is configured to generate communications, notifications, alerts, and/or reports that are saved, exported, and/or transmitted via a digital messaging system. The generated communications, notifications, alerts, and/or reports are configured to display data of the second panel 400 in a coalesced format.

The first panel 300 is programmed to display information related to establishing a profile, setting up a secure login, and obtaining an account for a user (See FIG. 4A). The second panel 400 is programmed to display information related to managing financing processes and coordinating activities between users regarding processes associated therewith (See FIG. 5). The third panel 1300 is programmed to display information related to registering a broker 206 (See FIGS. 14A-H). The fourth panel 1400 is programmed to coalesce information related to the progress of purchasing/financing an asset by at least one buyer 201 associated with a registered broker 206 to be transmitted to the broker 206 (See FIGS. 15A-D). Other panels 110 may be provided to display other relevant information. Any panel 110 may be configured to facilitate interaction between a user and the system 100 and/or a first user and a second user. As will be illustrated later, this may be achieved through an indicator programmed to be operatively associated with a panel 110 and/or a module 109.

Referring now to FIGS. 4A-D, exemplary embodiments of various login screen displays 301A-D of a first panel 300, are disclosed. The system 100 may be configured to establish at least one account assigned to, or otherwise associated with, a user and/or purchasing/financing data 204. This may be achieved by interaction via the first panel 300. The first panel 300 may be programmed to provide a secure login screen displays 301A-C to enable the system 100 to initiate an account, and link an account to a user via a PIN, registration, and/or login number 302. An account may include at least one sub-account. Each account and/or sub-account may be linked to each other via the system 100. Each account is envisioned to utilize secure and known accounting and information technology methods to enable coupling each account and/or sub-account with a user and/or purchasing/financing data 204, and ensure use of an account and/or sub-account may be accurately tracked and recorded via the system 100, as illustrated in FIGS. 4A and 3B.

Accounts may be established, and a use thereof may be facilitated, through unique identifiers (e.g., account numbers, registration numbers, PIN, simple key, compound key, composite key, etc.) that may be stored and communicated via a computer server 102 and communication network 104 of the system 100, as shown in FIG. 4C. For example, the system 100 may be configured such that a buyer 201 may communicate buyer data to a financial institution 203 to establish an account. Buyer data may be used as a unique identifier to associate/assign an account with/to a buyer 201. Account numbers and/or unique identifiers associated with an account may be a proxy value by which the system 100 uses to perform computational functions thereon. Purchasing/financing data 204, account number data, and/or unique identifier data may be stored, transmitted, received, and acted upon by the system 100 to establish and link accounts of users in accordance with methods 200 herein disclosed. As by way of example, the system 100 may be configured such that once the system 100 establishes an account, the system 100 may communicate purchasing/financing data 204 and/or account number data to a financial institution 230. A financial institution 203 may communicate purchasing/financing data 204 and/or account number data to a loan officer 202 to establish another account that may be linked to a buyer's 201 account.

As shown in FIG. 3D, an account settings screen display 301D may be used by a user to add, delete, and/or modify data associated with an account. The may include, but is not limited to, updating a user I.D., updating a password, updating a personal security image, updating securing questions and answers, etc.

Similarly, a broker 206 may supply broker data to establish an account that is associated/assigned with/to a buyer 201. This may be achieved by using the registration screen displays 1301-1308, as shown in FIGS. 14A-H. As by way of example, upon registering, a broker 206 may be provided with an account that can be linked to one or more buyers 206 of which the broker 206 is associated/assigned with/to. This linkage may be used by the system 100 to transfer data and direct communications between the broker 206 and the system 100 that relate to the at least one buyer 206. For instance, the system 100 may be programmed to transmit alerts 1401 (See FIG. 15A) to the broker 206 each time a buyer 206 with which the broker 206 is associated completes a process step 600A-F (See FIGS. 7A-F).

Establishing an account may grant a user access to data associated with linked accounts, which may be displayed on a panel 110 or coalesced into a report and sent as a communication, such as through email for example. While accounts may be linked, access thereto may be discriminatorily granted by a system 100. Data may be discriminatorily displayed on panels 110 and/or transmitted via email as well. As by way of example, the system 100 may be configured such that a buyer 201 may not have access to data related to other buyers 201. As by way of another example, the system 100 may be configured such that a broker 206 may only receive coalesced information from buyers 201 linked to the account of broker 206. One skilled in the art will appreciate, with the benefit of this disclosure, that other schemes and access-granting structures may be employed to discriminatorily grant access to data, display such data, and transmit such data based upon a type of a user and a status of a user.

Referring now to FIG. 5, an exemplary embodiment of the second panel 400 showing an exemplary progress indicator 401, is disclosed. The second panel 400 may be configured to enable a buyer 201 to manage processes of financing an asset and track the progress thereof. Graphical and/or textual displays inform a buyer 201 at which stage in the process he/she is in. As will be explained and illustrated later, activation of various indicators via the second panel 400 enable a buyer 201 to propagate through screen displays 113 in an orchestrated manner, which may prompt a buyer 201 to take certain action, inform a buyer 201 of actions of others, and/or provide a buyer 201 with a comprehensive overview of the processes associated with managing and obtaining financing for an asset being purchased. Activation of other indicators enables users to communicate and coordinate activities with other users and/or the system 100. In addition, the system 100 may be configured to provide automatic communications between users and/or the system 100 to facilitate such processes.

The second panel 400 may be configured to display at least one indicator 401-407. An indicator 401-407 of a second panel 400 may include, but is not limited to, a progress indicator 401, process steps indicators 402A-F, a documents indicator 403, an application overview indicator 404, a my team indicator 405, a secure message indicator 406, a tutorial indicator 407, etc. The second panel 400 may be configured to enable a user to at least: 1) access other modules 109; 2) manage processes associated with financing; 3) track progress of purchasing a home; 3) track progress of financing a home; 4) manage debt of financing; 5) coordinate activities with users; 6) upload/download data and documents to/from users and/or the system 100; 7) communicate and exchange data with users; and/or, 8) access, print, and save data, forms, and application materials.

A tutorial indicator 407 may be programmed to enable a user to view a tutorial about use of a second panel 400. A tutorial may include information regarding navigation of the second panel 400, features of the second panel 400, purchasing an asset, financing an asset, managing debt, laws and regulations associated with purchasing and financing an asset, policies and procedures of an entity involved with purchasing and financing an asset, etc. Tutorial information may be in a form of text, graphics, pictures, thumbnails, slide shows, video, animation, etc. A tutorial may comprise a step-by-step guide, a virtual tour of aspects and features of a panel, and the like. A tutorial may be automatically initiated when a user navigates to/from a module 109, logs into a module 109, and/or be initiated by activation of a tutorial indicator 407.

A tutorial indicator 407 may be programmed to operate for any module 109 so that different users may access a tutorial. For example, a tutorial indicator 407 displayed on a panel of the first module may provide a tutorial tailored for a buyer 201, whereas tutorial indicator (not shown) displayed on a panel of the second module may provide a tutorial tailored for a broker 206.

Figure 6A:
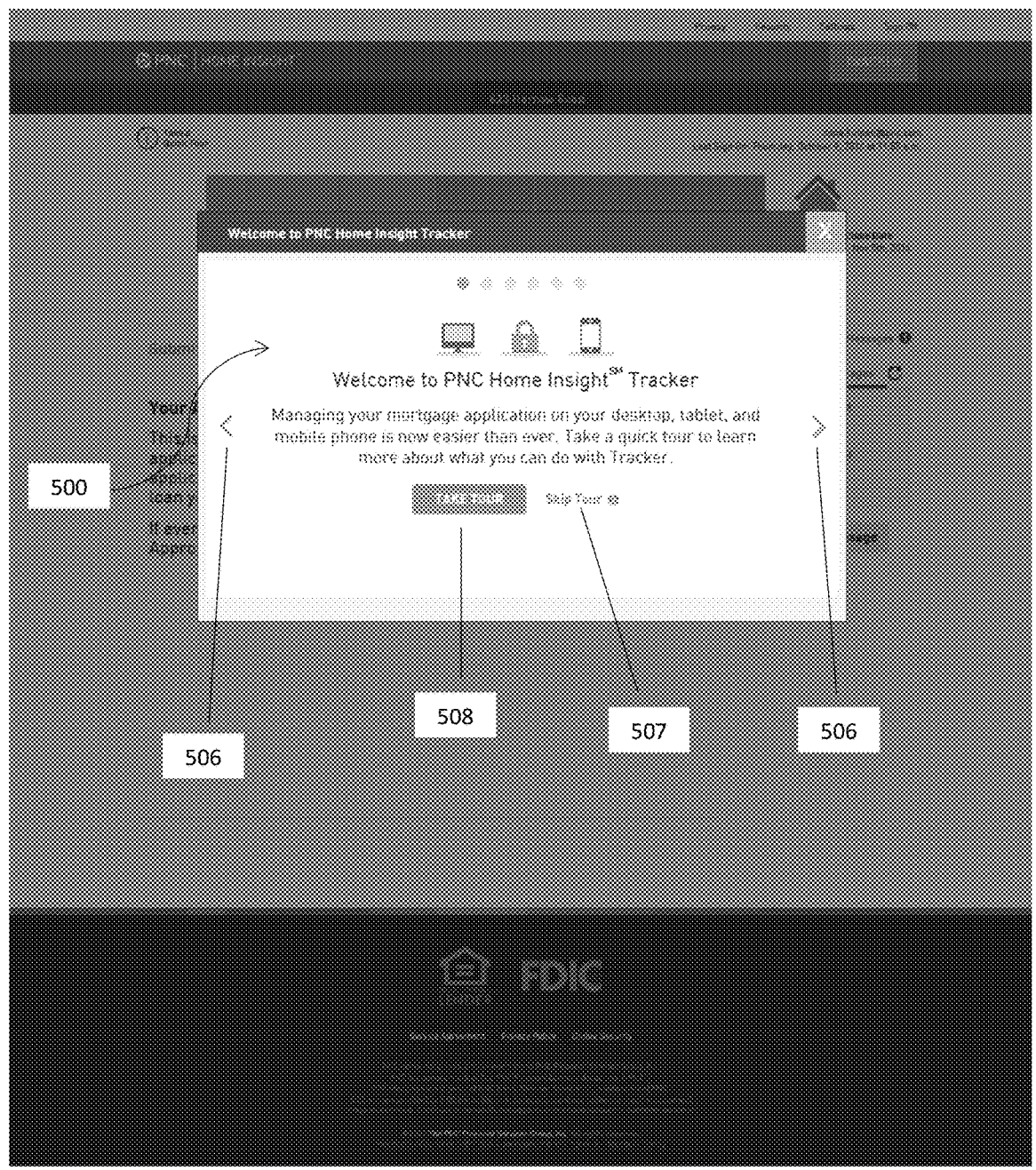
FIGS. 6A-F are exemplary embodiments of various screen displays of an exemplary tutorial.
Figure 6B:
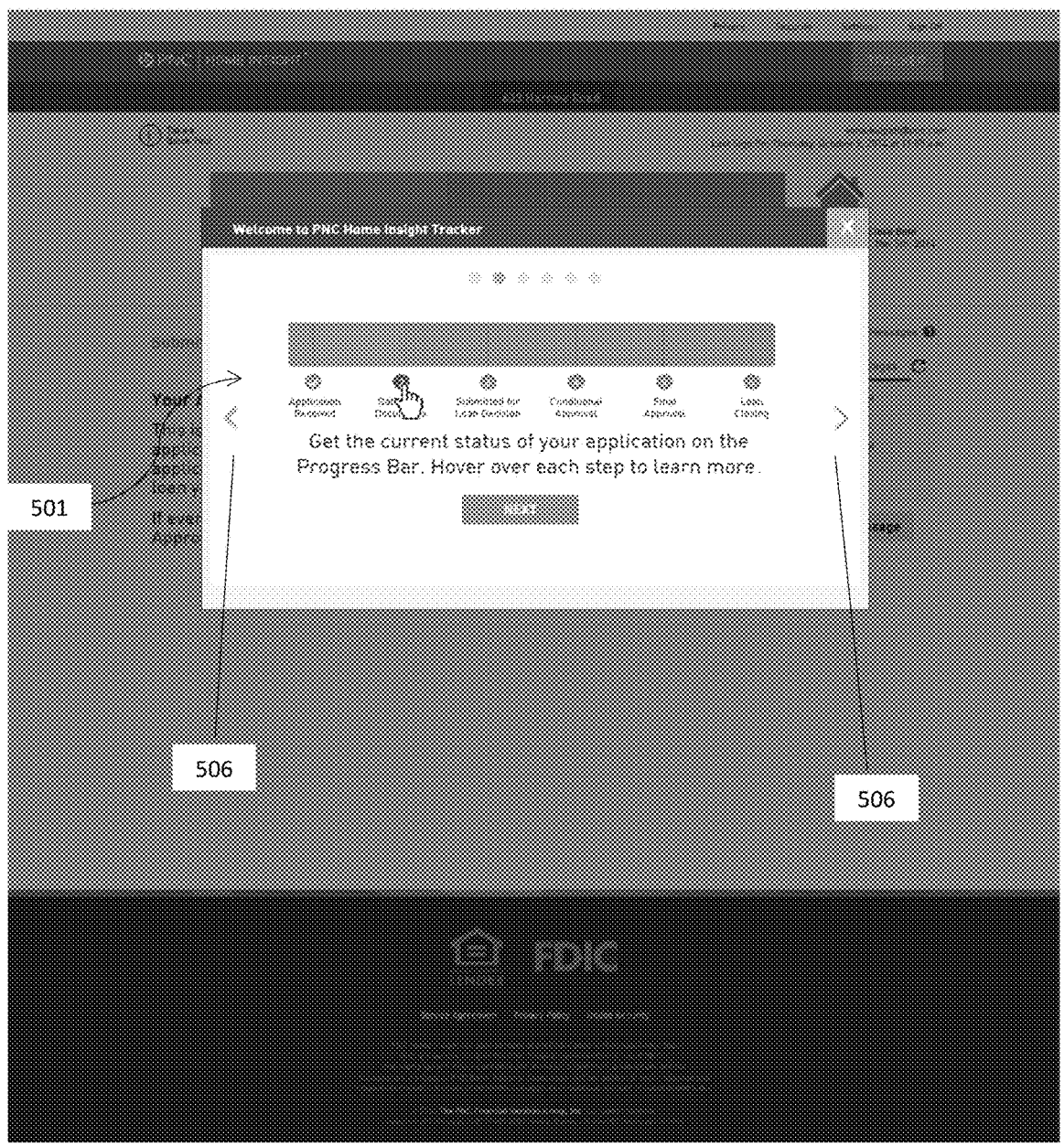
Figure 6C:
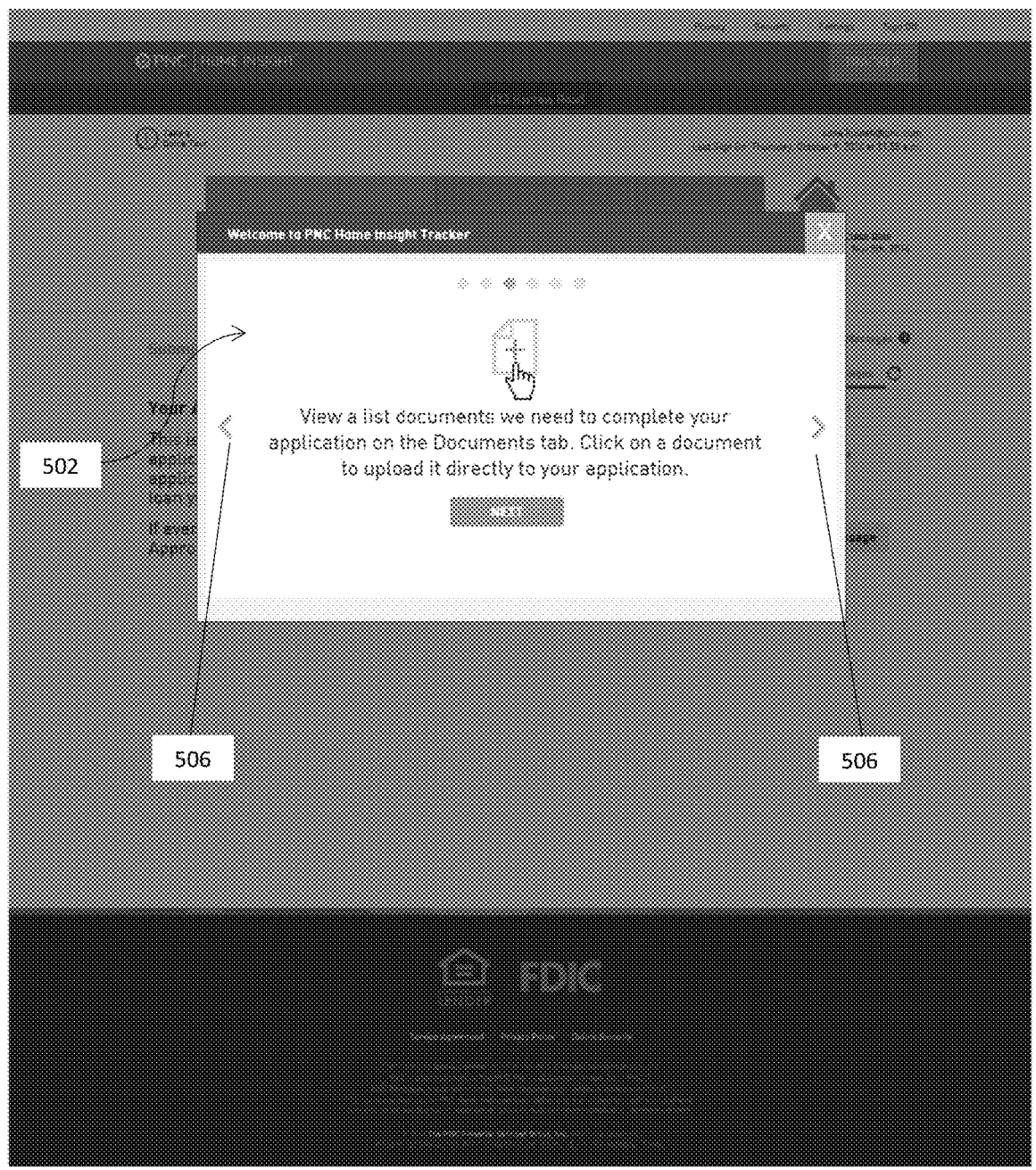
Figure 6D:
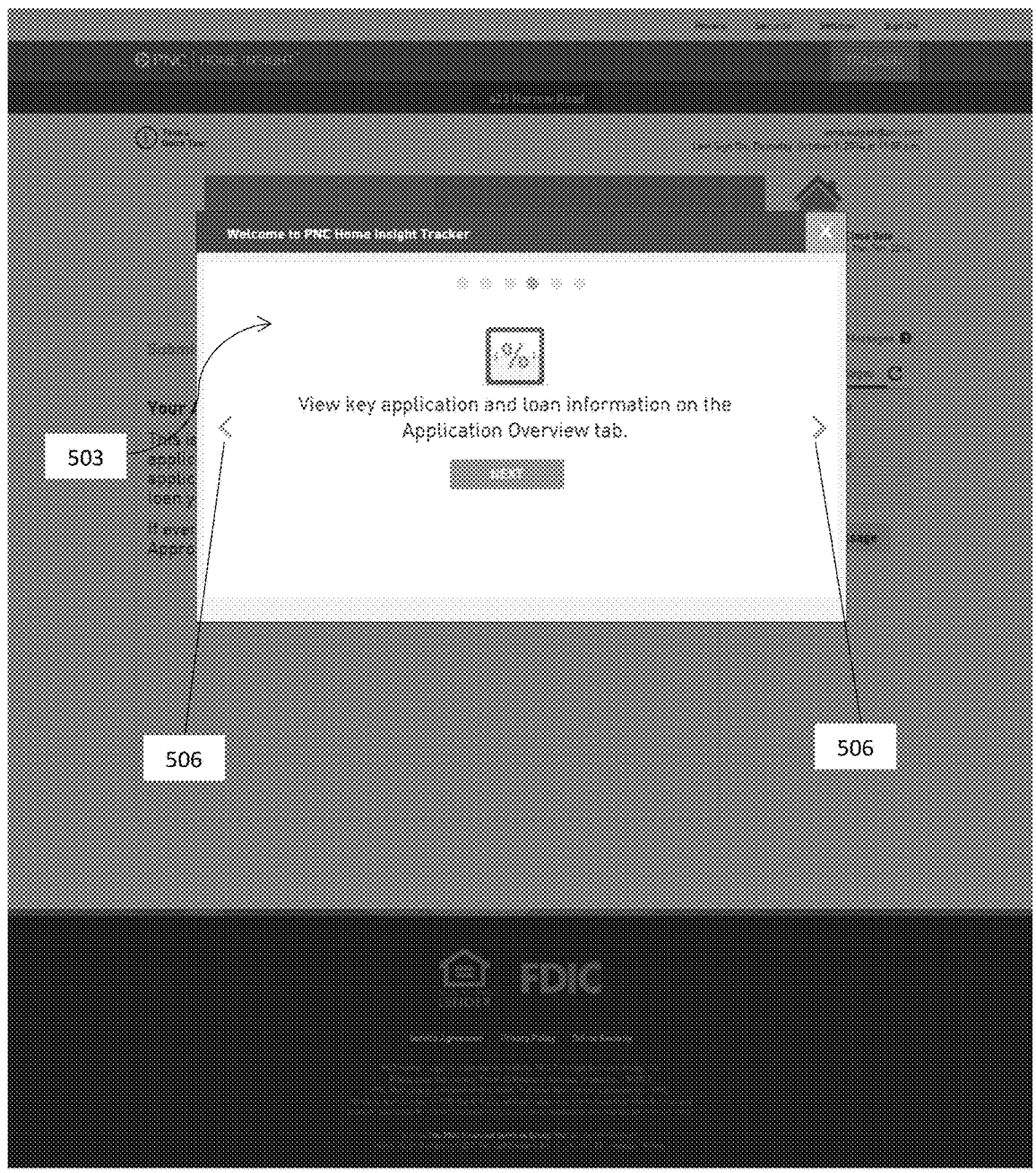
Figure 6E:
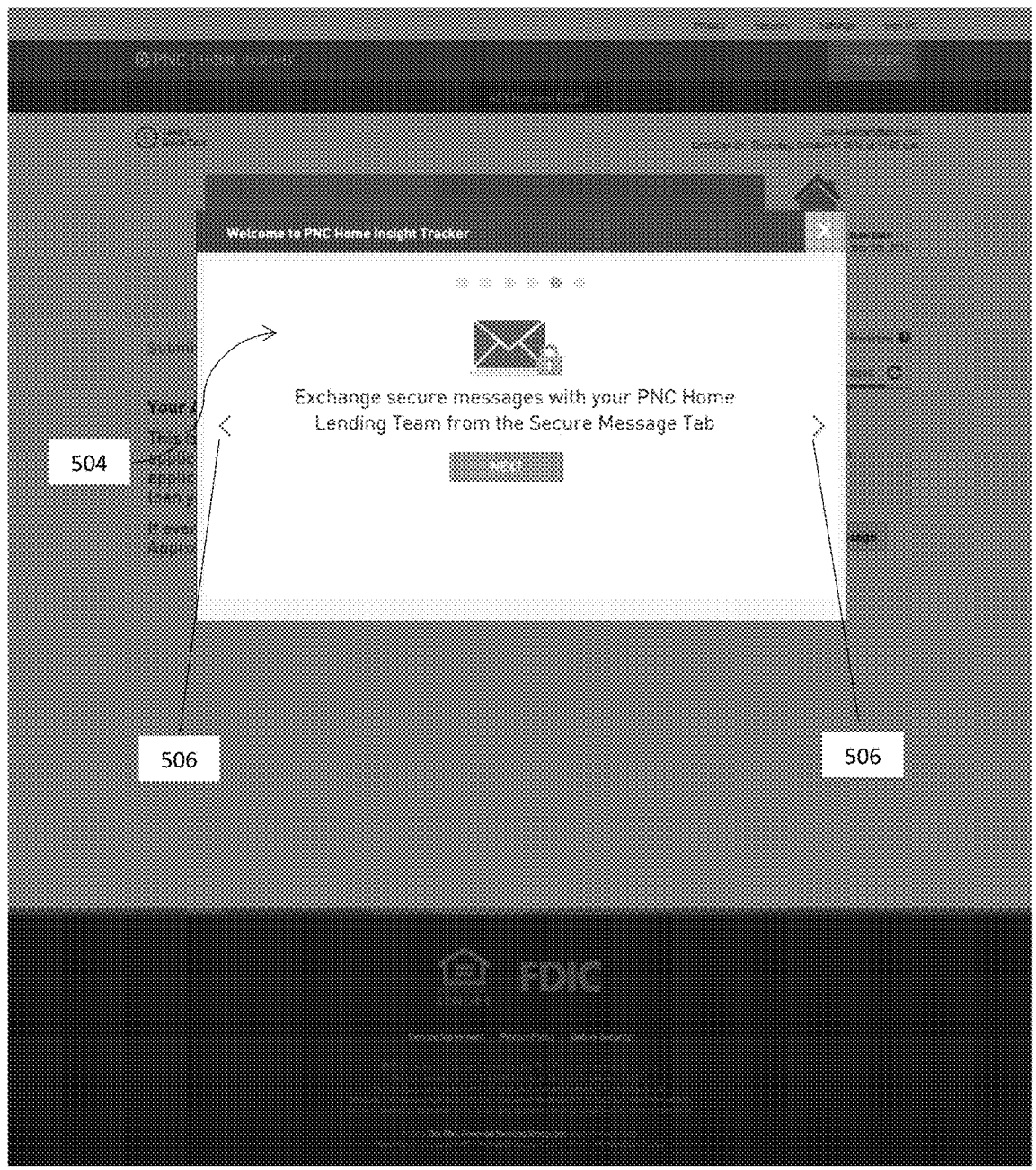
Figure 6F:
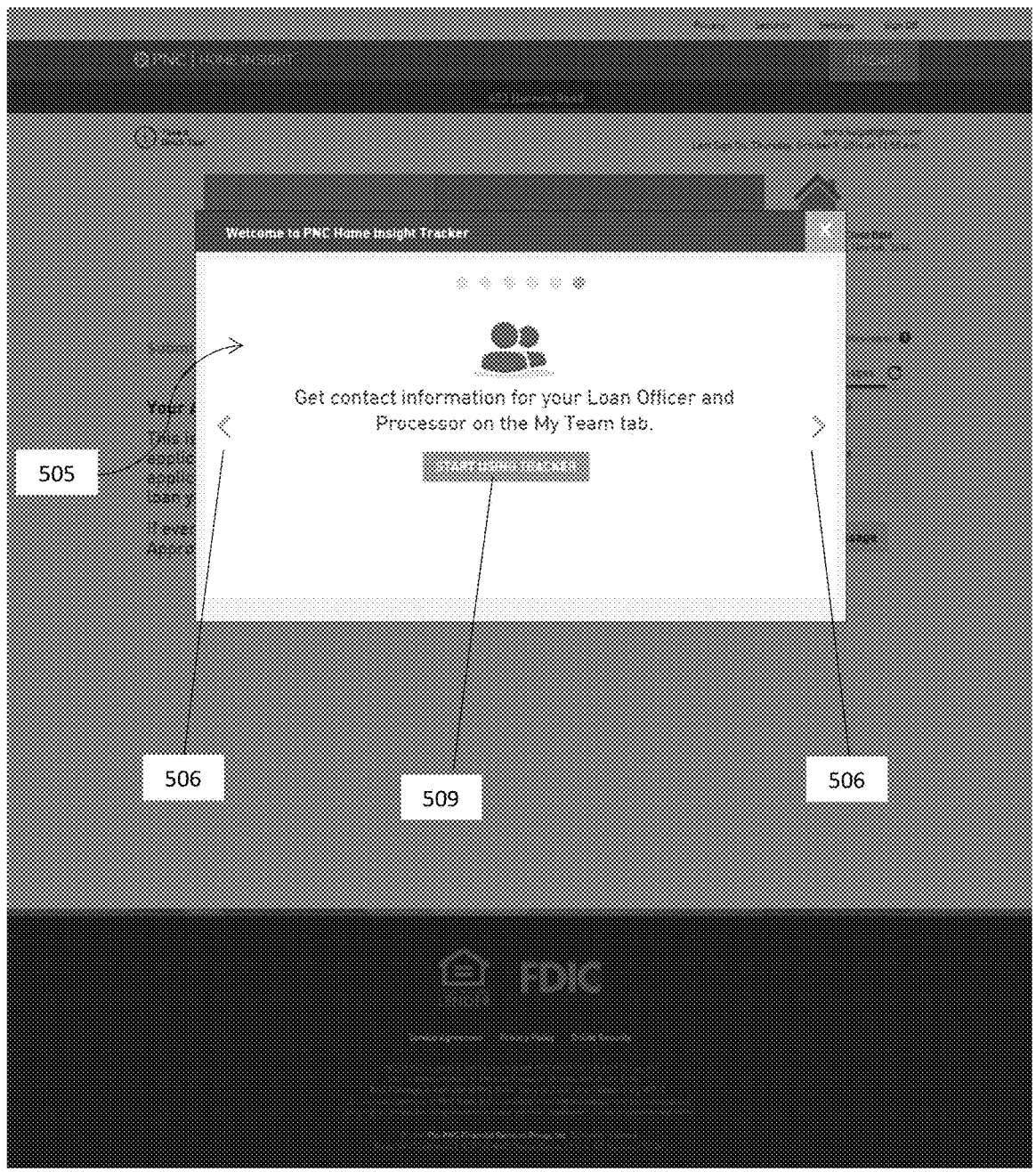

An exemplary tutorial for a buyer 201 is shown in FIGS. 6A-F. Activating a tutorial indicator 407 may present screen displays 500-505 through which a user may navigate in sequential order via a next/back indicator 506. FIG. 6A illustrates a welcome screen display 500 of an exemplary tutorial. A user may elect to "skip tour" 507 or "take tour" 508. FIG. 6B illustrates a progress bar guide screen display 501 of an exemplary tutorial. FIG. 6C illustrates a documents guide screen display 502 of an exemplary tutorial. FIG. 6D illustrates an application overview guide screen display 503 of an exemplary tutorial. FIG. 6E illustrates a secure message guide screen display 504 of an exemplary tutorial. FIG. 6F illustrates a my team guide screen display 505 of an exemplary tutorial. Any tutorial screen display 500-505 may be provided with a start indicator 509 to enable a user to exit the tutorial.

Referring now to FIGS. 7A-F, exemplary embodiments of various screen displays 602-607 of process steps 600A-F that may be accessed via process step indicators 402A-F (See FIG. 5) of a progress indicator 401, are disclosed. The progress indicator 401 may be programmed to graphically and/or textually illustrate a process by which a user may purchase an asset, obtain financing for an asset, and/or manage a debt associated with financing an asset. The progress indicator 401 may be segmented into process steps 600A-F, each accessed via process step indicators 402A-F. Each process step 600A-F delineates activities that are completed, pending, or incomplete. Activities are events, duties, and/or obligations that should be performed by a user and/or by other users in order to accomplish purchasing an asset, obtaining financing for an asset, and/or managing debt associated with financing an asset. Activating a process steps 600A-F provides a user access to data, graphical/textual displays, and/or screen displays 602-607 associated with the corresponding process step 600A-F. Process steps 600A-F may include, but are not limited to, "application received" 600A, "gathering documents" 600B, "submitted for loan decision" 600C, "conditional approval" 600D, "final approval" 600E, and/or "loan closing" 600F. Activating a process step 600A-F may present a graphical display, a textual display, a tutorial, and/or a screen display.

Preferably, the progress indicator 401 is configured as a combination of graphical and textual displays. This may be done to convey copious data with effective sensory stimulation to direct a user to distilled information of that data. For example, the progress indicator 401 may be configured as an elongated bar with segmented components that highlight upon activation. Activation of the process step indicator 402A-F may grant access to data and display information related to an associated process step 600A-F. Any screen display 602-607 of an accessed process step 600A-F may be configured to display the progress indicator 401 on a portion of that screen display 602-607 highlighting the process step 600A-F that was activated. Highlighting may be in a form of an indicator arrow 601 displayed adjacent to a process step 600A-F.

Figure 7C:
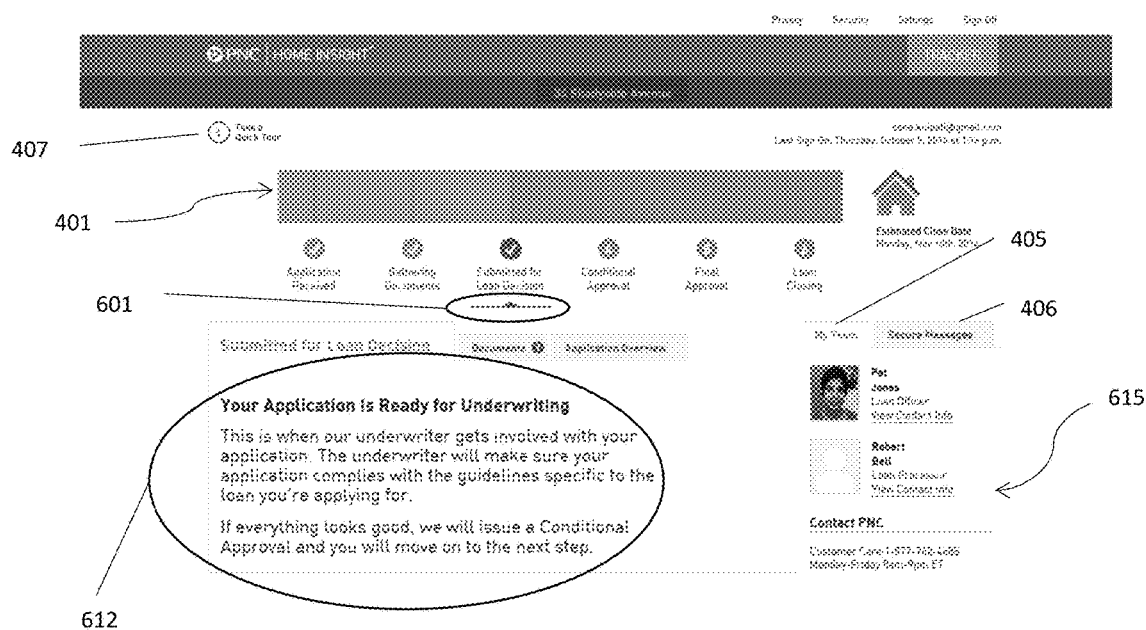

For example, accessing an application received process step 600A displays the application received screen display 602 with the progress indicator 401 displayed on a top portion of the screen display 602 and the application received process step 600A highlighted with an indicator arrow 601, as shown in FIG. 7A. Preferably, similarly configured screen displays 603-607 appear upon accessing other process steps 600B-F. A gathering documents screen display 603 may be displayed by activation of the process step indicator 402B associated with the gathering documents process step 600B, as shown in FIG. 7B. A submitted for loan decision screen display 604 may be displayed by activation of the process step indicator 402C associated with the submitted for loan decision process step 600C, as shown in FIG. 7C. A conditional approval screen display 605 may be displayed by activation of the process step indicator 402D associated with the conditional approval process step 600D, as shown in FIG. 7D. A final approval screen display 606 may be displayed by activation of the process step indicator 402E associated with the final approval process step 600E, as shown in FIG. 7E. A loan closing screen display 607 may be displayed by activation of the process step indicator 402F associated with the loan closing process step 600F, as shown in FIG. 7F.

As will be explained in more detail and illustrated later, activating the process step indictors 402A-F and propagating through the screen displays 602-607 enables a user to navigate the system 100 in an orchestrated manner, providing a user with a comprehensive overview of the application process. Activation of other indicators enables users to communicate and coordinate activities with other users and/or the system 100 regarding the application process, which will also be described and illustrated later.

The application received screen display 602 may be programmed to display information pertaining to a status of whether a buyer 201 submitted an application for purchasing and/or financing an asset, and as to whether a financial institution 203 has received that application. The gathering documents screen display 603 may be programmed to display information pertaining to documentation involved with processes related to financing, processing financing paperwork, and obtaining approval. The submitted for loan decision screen display 604 may be programmed to display information pertaining to activities being performed regarding the application and approval process. The conditional approval screen display 605 may be programmed to display information pertaining to statuses of pending issues, expected and estimated dates, requests for supplemental information, etc. The final approval screen display 606 may be programmed to display information pertain to whether final approval has been granted and/or a summary of events/activities. The loan closing screen display 607 may be programmed to display information steps being taken by users to close the loan application process.

Portions of any screen display 602-607 may be configured to at least display: 1) profile information 608 of a user; 2) usage information 609 about a user's use of the system; 3) asset-identifying information 610 about an asset being purchases and/or financed by a user; 4) estimated date information 611; and/or 5) a status panel display 612 of a process step 600A-F selected.

Profile information 608 may include, but is not limited to, data representing a name of a user, contact information of a user, etc. Usage information 609 may include, but is not limited to, data representing dates and times a user logs in, accesses the system and/or panel, etc. Asset-identifying information 610 may include, but is not limited to, data representing location information of an asset, a type of asset, etc. The estimated date information 611 may include, but is not limited to, graphical and/or textual information about an expected event. This event may be, for example, an estimate closing date of a home being purchase by a user.

The status panel display 612 may provide information regarding activities that are incomplete, pending, and/or complete with respect to a user's progress of a particular process step 600A-F. Statuses may comprise information about activities that a user should perform and data a user should submit in order to complete a process step 600A-F, progress to a next process step 600A-F, meet a condition, etc. Statuses may be configured to at least: 1) inform users of which steps are to be performed in response to a completed activity; 2) inform a user of expected time periods for completion in order to comport with estimated time frames; and/or, 3) inform a user of steps and/or activities that other users should be performing. This may include activities that are being performed and/or have been performed, and data that is being submitted and/or has been submitted.

The process step indicator 402A-F may be programmed to display a numerical display 613 corresponding to the process step 600A-F that it is associated with. For example, process step indicator 402A may display a number "1" to indicate that it, and the application received process step 600A, represents the first step in the process. The process step indicator 402A-F may be programmed to change from a numerical display to a check mark 614 after the associated process step 600A-F has been completed. Alternatively, or in addition, each segment of a progress indicator 401 may highlight to indicate that an associated process step 600A-F has been completed. This highlighting may comprise a "completed" segment having a color contrasting with a color of an "incomplete" and/or "pending" segment. Other highlighting, as described earlier, may be used. In an exemplary embodiment, each "completed" segment is highlighted with a color contrasting with a color of "incomplete" segments to graphically depict where in the process a user is (i.e., a progress bar is displayed).

While exemplary embodiments may depict a progress indicator 401 having the disclosed process step indicators 402A-F and associated process steps 600A-F, one skilled in the art, with the benefit of the present disclosure, will appreciate that disclosed systems 100 and methods 200 are not limited to exemplary versions as depicted. It is understood that any number and combination/permutation of segmentations, process step indicators 402A-F, and/or process steps 600A-F may be utilized to provide a comprehensive, expedient, or otherwise accommodating experience to a user whose application process is commensurate therewith.

While the status panel display 612 is illustrated in FIGS. 7A-F as textual and/or graphical information displays, the system 100 may be configured to provide communications, notifications, alerts, messages, etc. of the same. For example, upon completion of an activity, notifications may be communicated to a buyer 201 or other users informing them of the status change. Communications, alerts, notifications, and messages may be transmitted and/or exported as described earlier. Such statuses, communications, and/or notifications enable creating of a team of users, which may coordinate activities via a network of devices 101 in an efficient and effective manner. Each user may have an account of each user's progress so that error, redundancy, and repugnancy may be reduced. All users involved with a process may allocate resources and plan according to estimated time frames and expected time periods. As a result, system infrastructure may be consumed only when needed.

A my team indicator 405 (See FIG. 5) may be programmed to display a my team panel display 615 when activated, which enables a user to access and view data representing team member 616 information. This may include, but is not limited to, loan officer information, loan processor information, broker information, etc. A loan officer 202 or other user may be automatically assigned/associated to/with a buyer's 201 team by the system 100 or by another user (e.g., a financial institution 203), thereby becoming a team member 616 of a buyer's 201 team. A my team panel display 615 may be programmed to present information that includes, but is not limited to, contact information of each team member 616, title of a team member 616, credential information of each team member 616, a picture/thumbnail of a team member 616, etc.

The broker 206 may be include as a member 616 of the my team. Including the broker 206 may be achieved via an opt in indicator 1100 of the second panel 400, which will be described and illustrated later. After the broker 206 is registered and a buyer 201 opts in the broker 206, the broker's 206 information may be displayed along with the other members 616 of the my team in the my team panel display 615, as described herein. The broker 206 becoming a my team member 616 may be conditioned on whether the broker 206 accepts to be included in the my team. Opting in/out a broker 206 enables tailoring the team of users to generate a more comprehensive network of devices 101. As will be described and illustrated later, the my team panel display 615 preferably includes additional features when the broker 206 becomes a team member 616.

Figure 8:
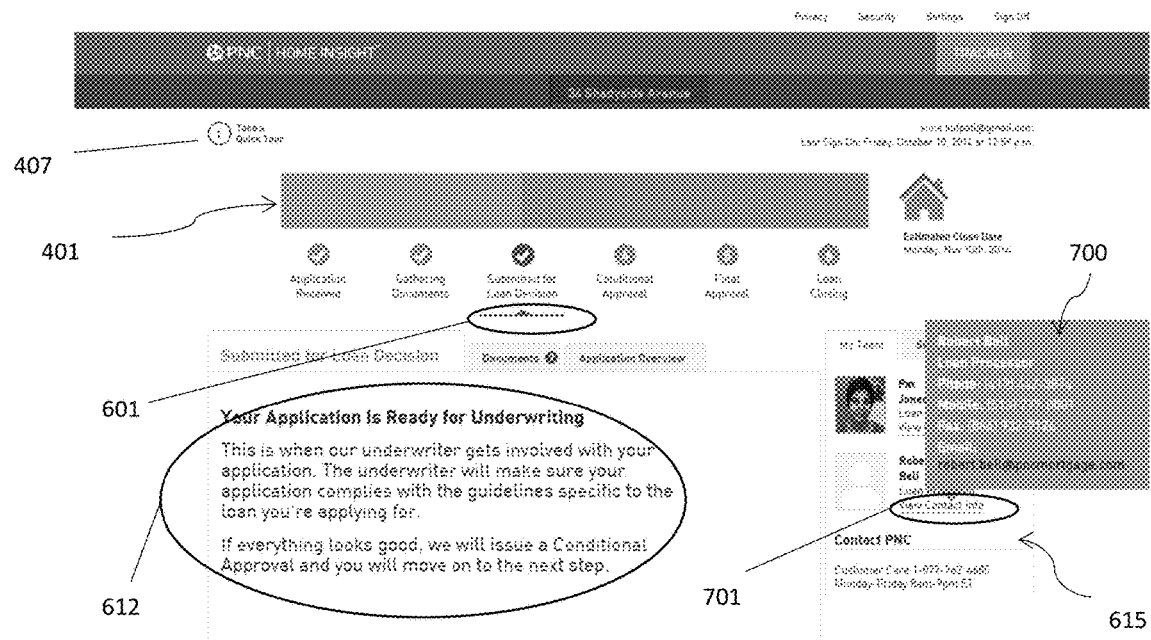
FIG. 8 is an exemplary embodiment of a my team panel display showing a my team member screen display.

Referring to FIG. 8, a my team panel display 615 may be configured to display a team member screen display 700 including textual information about a team member 616 when a user activates a team member indicator 701 associated with team member information (e.g., when a user causes a cursor to hover over a "View Contact Info." text display, contact and/or credential information may be displayed in a pop-up comment screen).

Figure 9B:
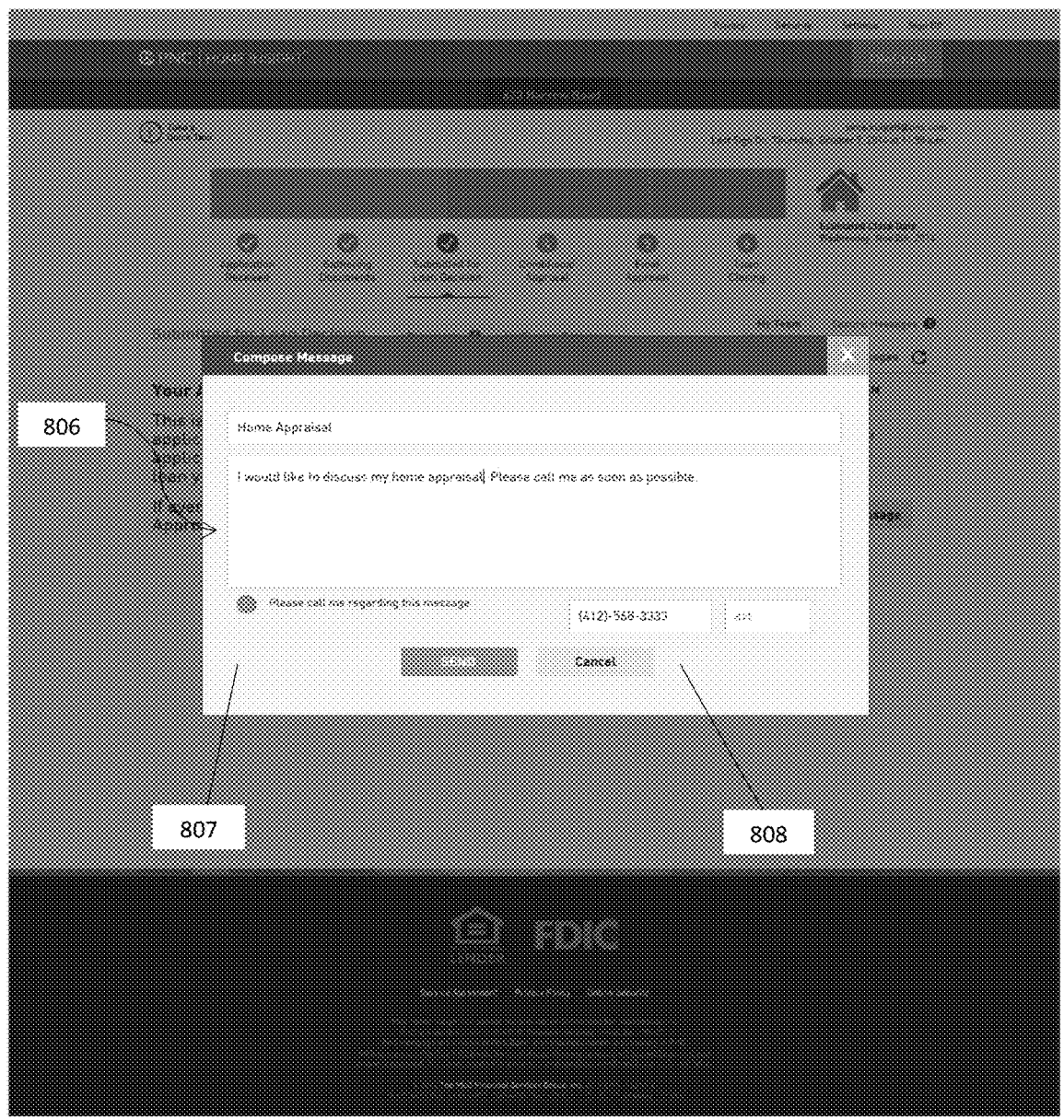

Referring now to FIGS. 9A-D, exemplary embodiments of a secure message panel display 800 showing exemplary embodiments of a compose message screen display 806, a confirmation sent screen display 809, and a message detail screen display 810, are disclosed. A secure message indicator 406 may be programmed to display a secure message panel display 800 when activated, which enables a user to communicate to any team member 616. A secure message panel display 800 may be programmed to enable a user to compose a message via activation of a compose message indicator 801. It also enables a user to review incoming/received messages and review outgoing/sent messages. A secure message panel display 800 may be programmed to present messages in a coalesced format. This coalesced format may comprise an "inbox message" bank 802, a "sent message" bank 803, a hierarchical listing of messages within each message bank 802, 803, etc. A secure message panel display 800 may be provided with a refresher indicator 804 to update information accessed and displayed by a secure message panel display 800. A secure message panel display 800 may be programmed to display a message number indicator 805 depicting a number of messages within a message bank 802, 803. A user may inform a recipient of a message that a phone call is desired in response to a sent message, as shown in FIG. 9B. This may be achieved by providing a telephone response indicator 807 within a compose message screen display 806, along with providing a telephone number input box 808.

Figure 9C:
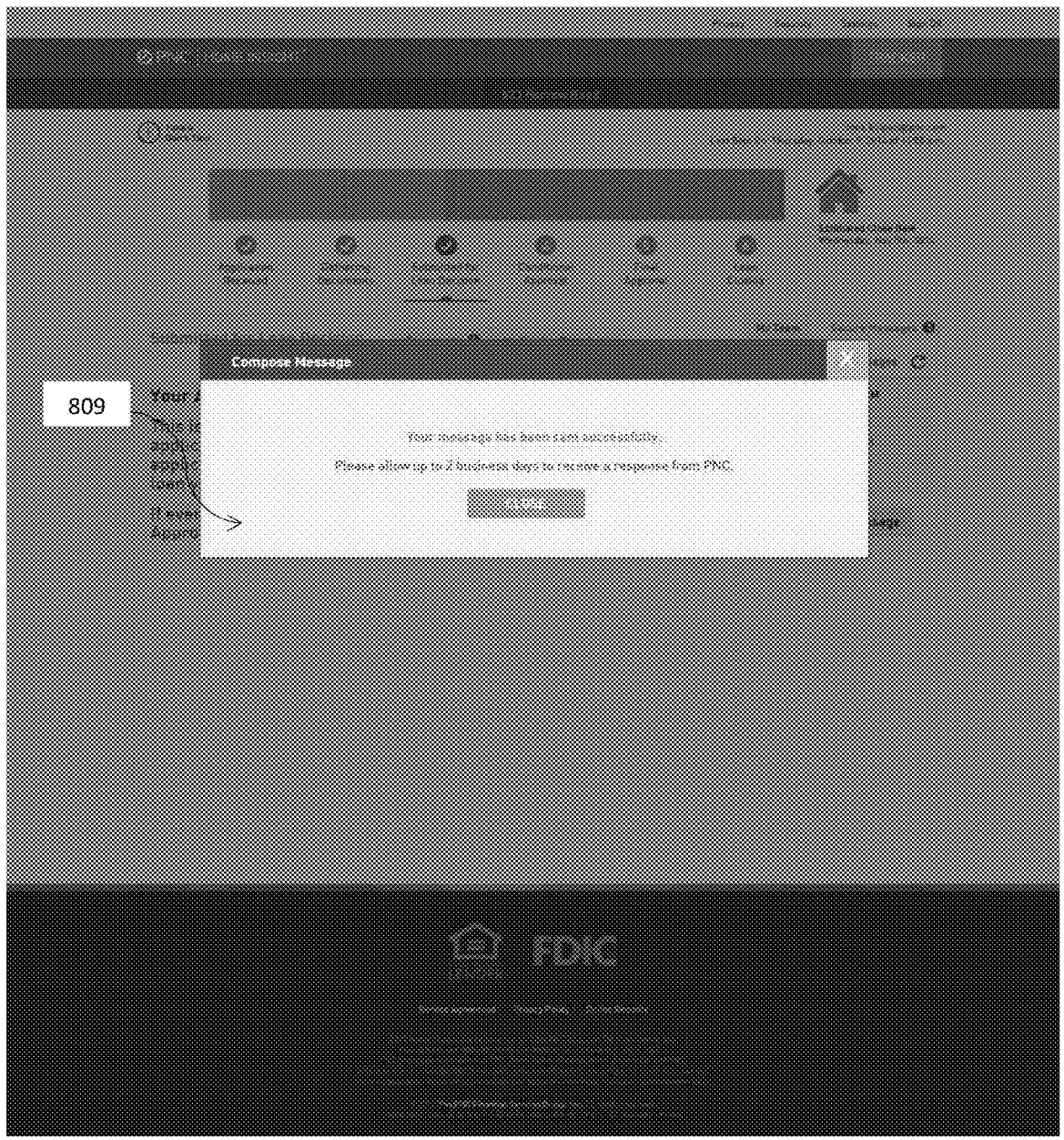
Figure 9D:
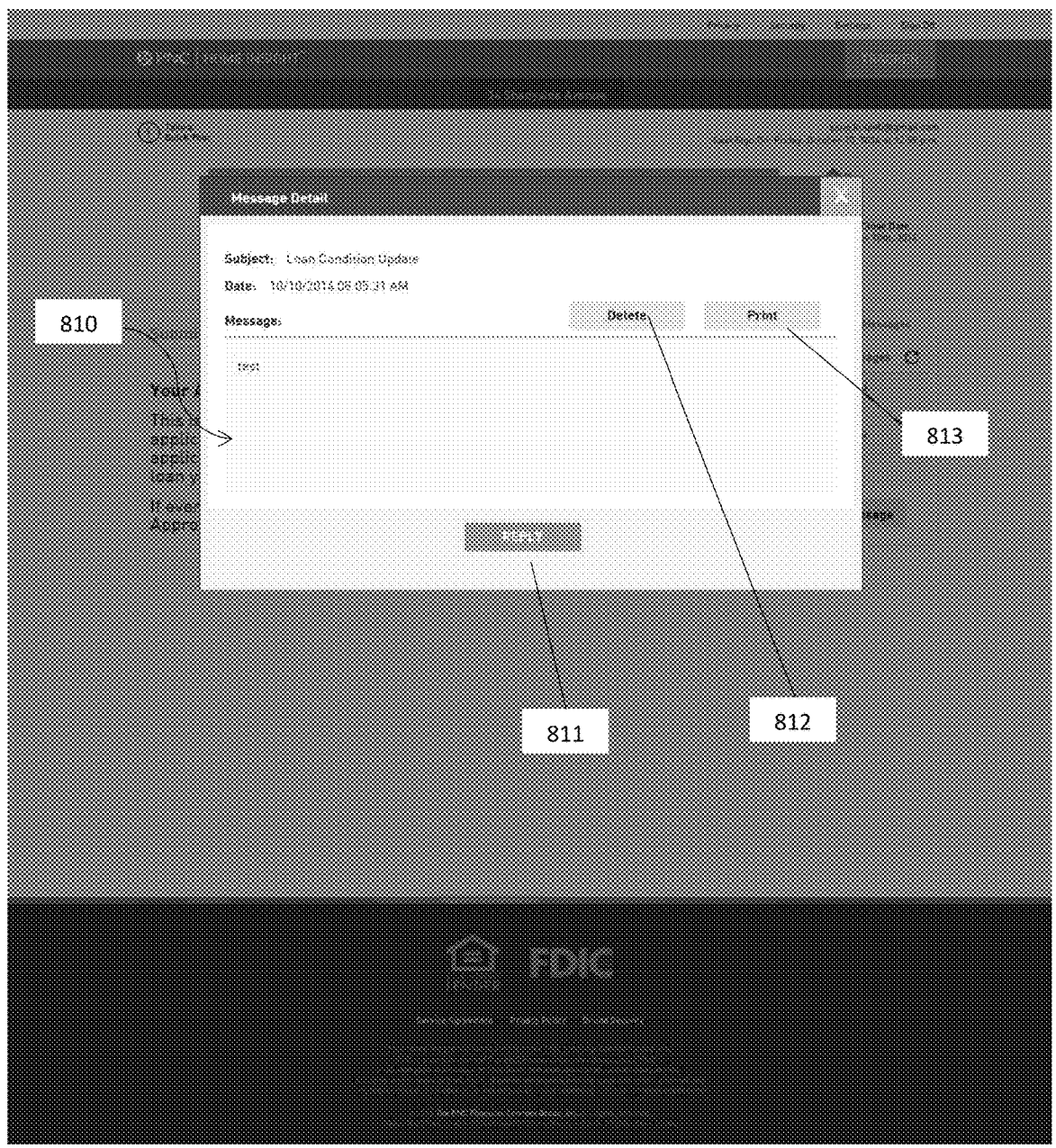

A secure message panel display 800 may be programmed to display a confirmation sent screen display 809 informing a user that a message had been successfully sent, as shown in FIG. 9C. A message detail screen display 810 may appear when a user accesses a message that has been receive and/or sent, at least enabling a user to read the message, reply to the message, delete the message, and/or print the message. This may be achieved via a reply indicator 811, a delete indicator 812, and a print indicator 813, as shown in FIG. 9D.

Figure 10A:
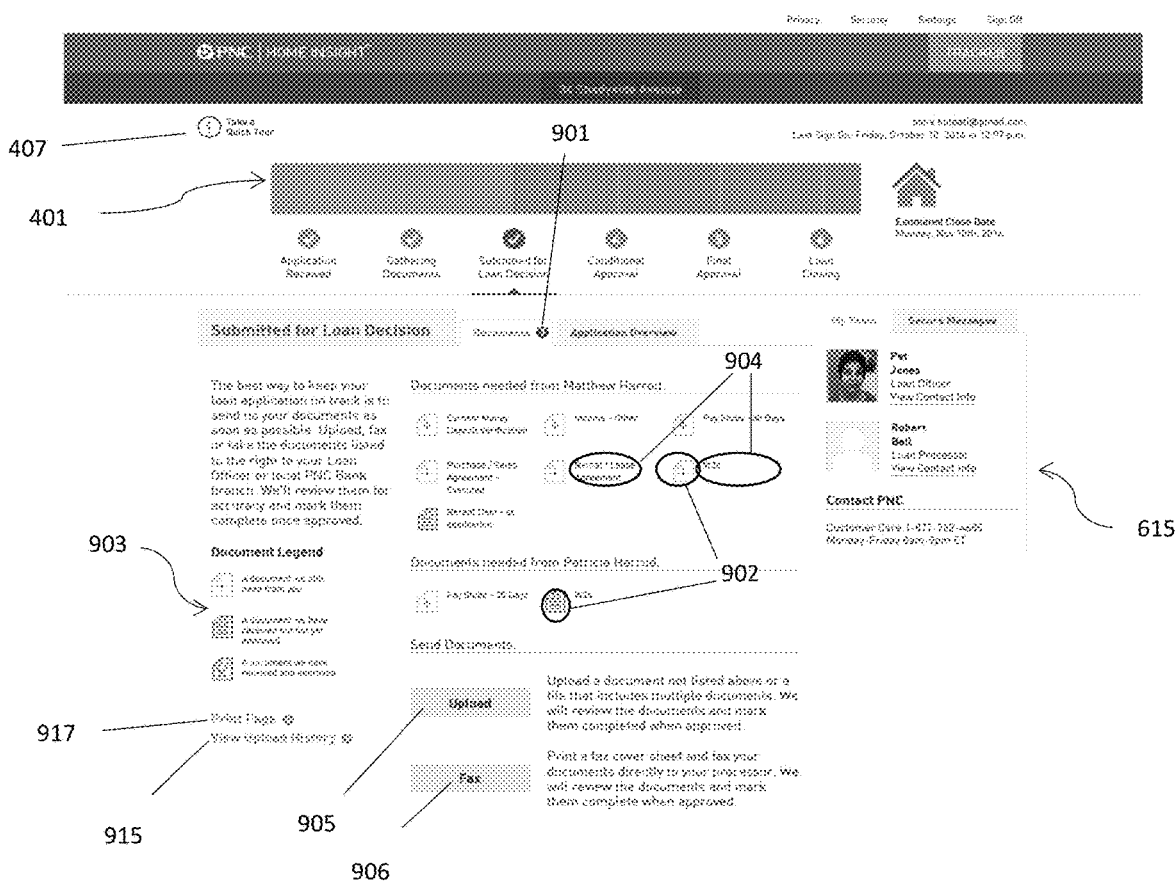
FIGS. 10A-F are exemplary embodiments of a document panel display showing exemplary embodiments of an upload screen display, and upload file conformation screen display, a fax screen display, a document status screen display, and an upload history screen display.

Referring now to FIGS. 10A-F, exemplary embodiments of a document panel display 900 showing exemplary embodiments of an upload screen display 907 (See FIG. 10B), an upload file conformation screen display 909 (See FIG. 9C), a fax screen display 910 (See FIG. 10D), a document status screen display 910 (See FIG. 9E), and an upload history screen display 916 (See FIG. 10F), are disclosed. Activating a documents indicator 403 may present a documents panel display 900, which may be configured to present a user with a list and/or a display of data representing documents that may be involved with purchasing an asset, applications for financing, and/or management of debt associated therewith. The documents panel display 900 may be provided with a documents numerical indicator 901 depicting a number of documents that are requested to be submitted and/or have been submitted. The documents panel display 900 may be configured to display document icons 902 representing documents that should be submitted, documents that have been submitted but not approved, and/or documents that have been submitted and have been approved. The documents panel display 900 may be configured to present information segmented by a number of users. For example, if a buyer 201 is a couple, then the documents panel display 900 may be segmented to display information for each individual comprising the buyer 201, as shown in FIG. 10A.

A document icon legend 903 may be provided to indicate what each document icon 902 represents. For example, the document icon legend 903 may indicate that a particular document icon 902 represents a document that has not been submitted, a document that has been submitted but not approved, and/or a document that has been submitted and approved. Once a document has been submitted and/or submitted and approved, the document icon 902 may be programmed to change to indicate as such. This may be achieved by a user (e.g., a loan officer 202) transmitting data to the system 100 and/or the system 100 automatically making the change. Document icons 902 may be accompanied with document text 904 to indicate which type of document that the document icon 902 is associated with. Document text 904 may include, but is no limited to, a profit/loss statement, a recent debt document, a pay stub document, a credit report document, a divorce/separation agreement document, a judgment document, etc.

Figure 10B:
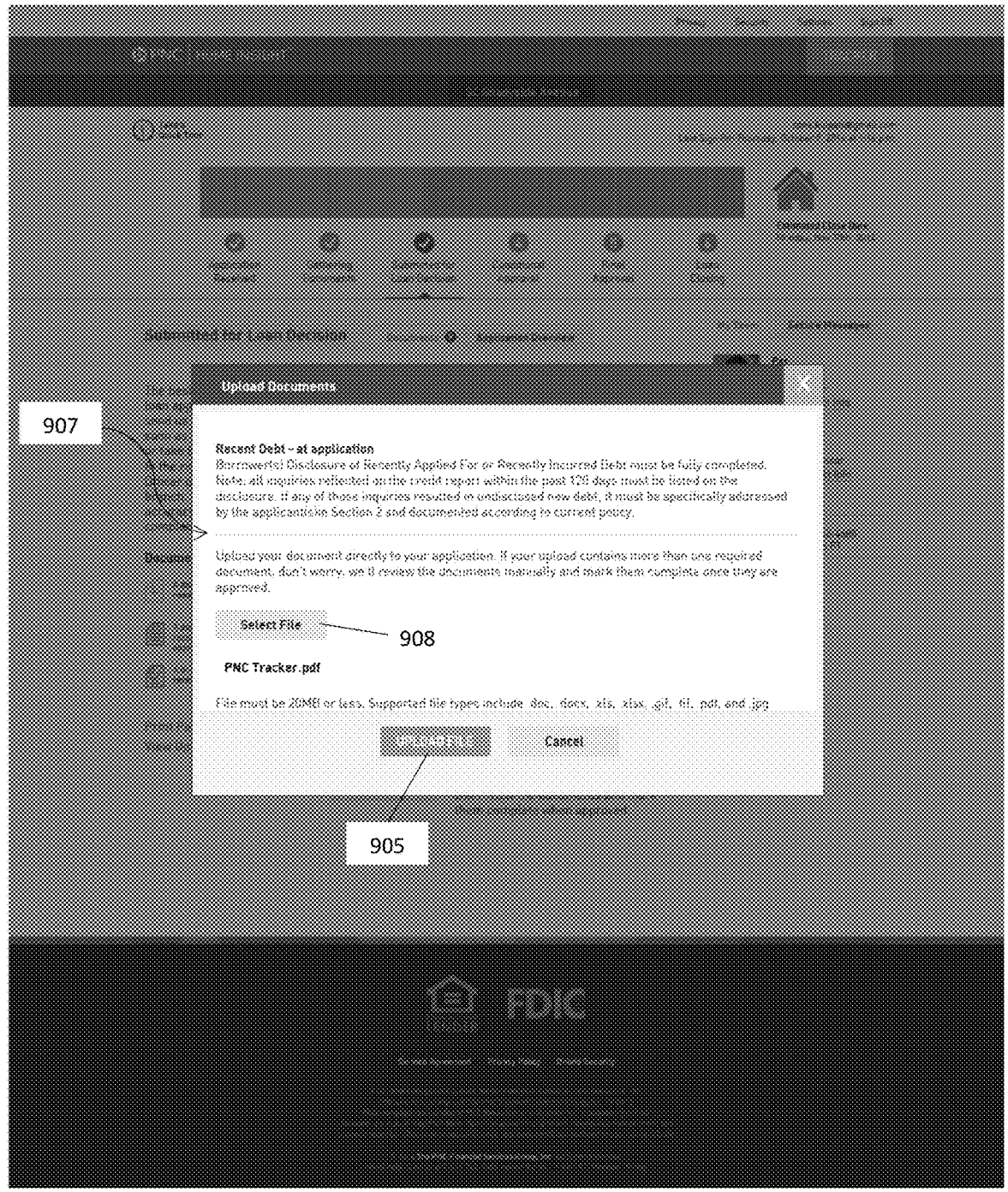
Figure 10C:
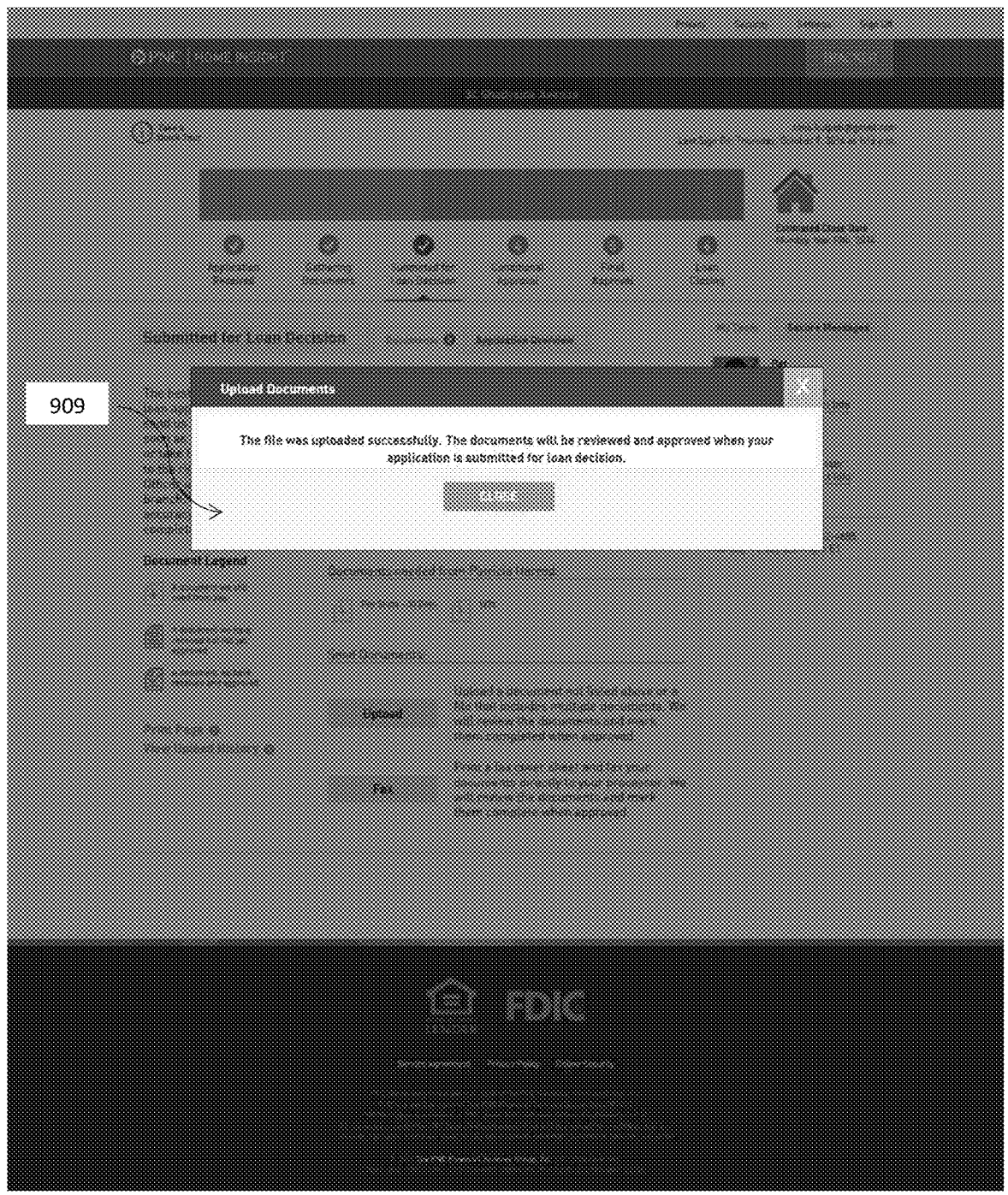
Figure 10D:
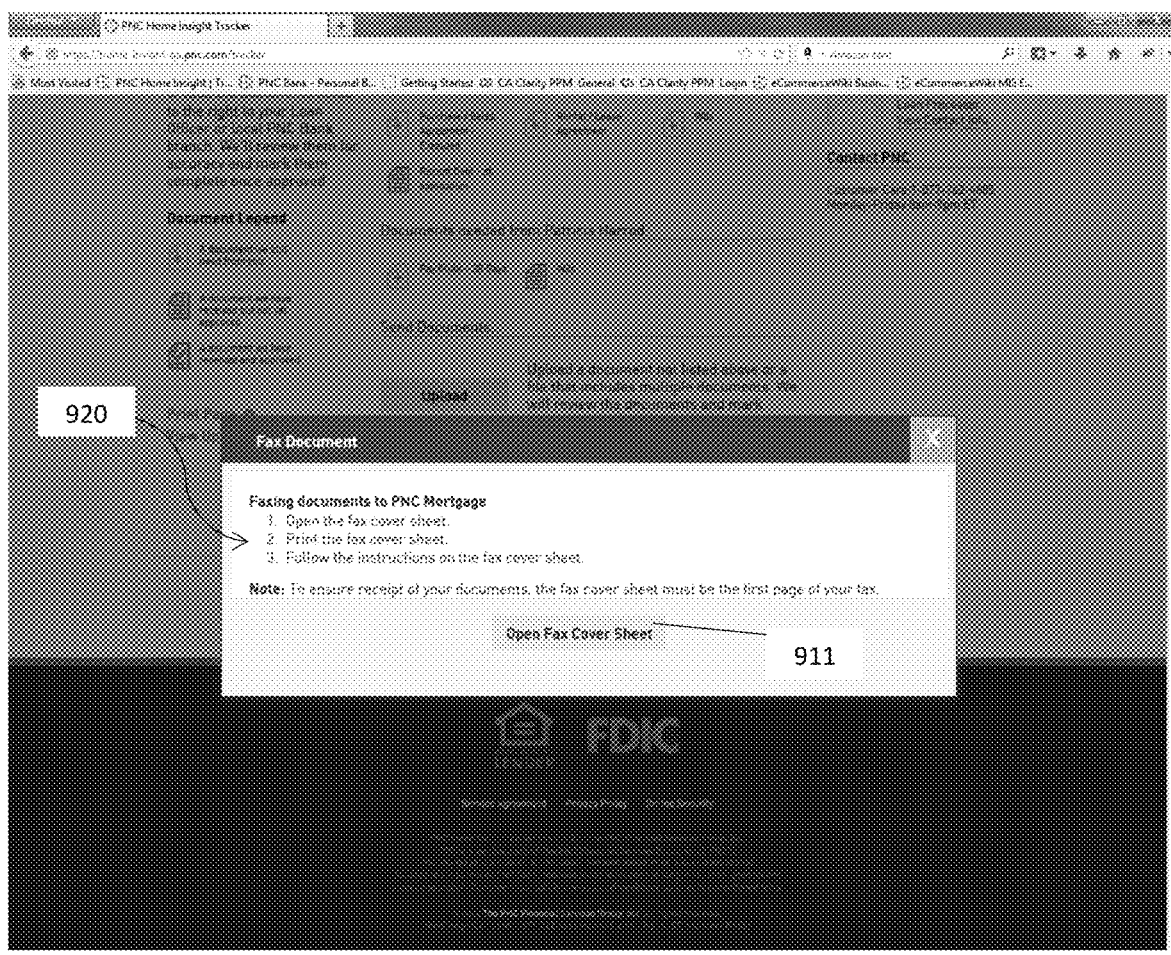
Figure 10E:
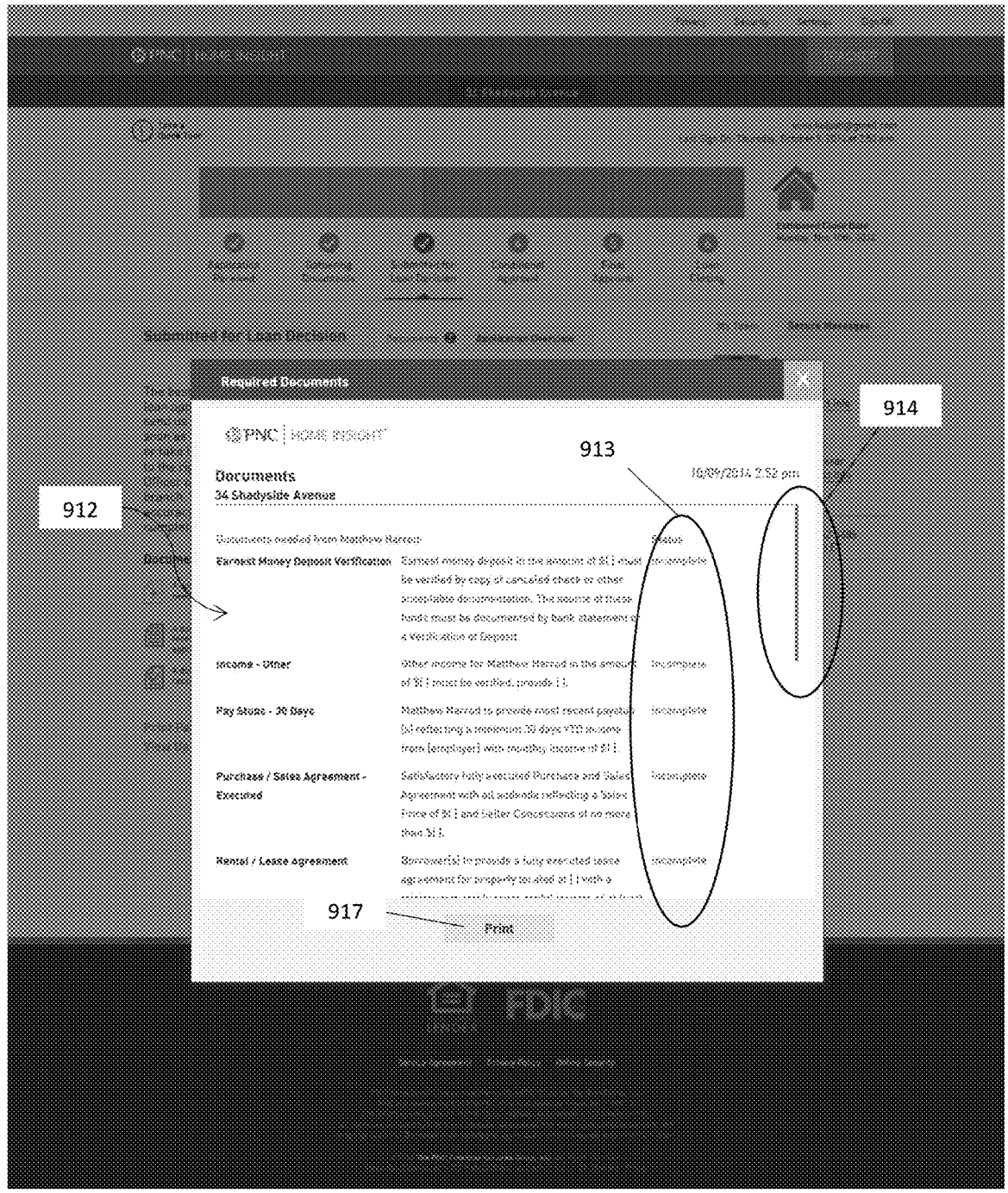

Each document icon 902 may be programmed to grant access to, upload, and/or download a digital data file of a document. In addition, an upload indicator 905 may provide the same. A user may upload a document by accessing a digital data file of it from the user's computer device 101, as shown in FIG. 10B. An upload screen display 907 may be provided after the upload indicator 905 is activated. A user may use a select a file indicator 908 to retrieve a file from the computer device 101 and upload it to the system 100. An upload file confirmation screen display 909 may be displayed upon successful completion of an upload, as shown in FIG. 10C.

A document may be submitted/received by a user in another fashion, such as facsimile, post mail, hand-delivery, etc., after which it may be uploaded to the system 100. This may be achieved by image/document scanning, electronic document management systems, etc. Electronic signatures and/or digital signatures may be utilized. A fax indicator 906 may be activated to present a user with a fax screen display 920, which may enable a user to access a fax cover sheet via a fax cover sheet indicator 911 to facilitate facsimile submission of a document.

Once a document is uploaded by a first user, a second user may be able to download a document from the system 100. For example, the loan processor 205 may upload a recent debt document to the system 100 to be accessed by a buyer 201. The buyer 201 may download that document, complete it, and upload the completed document into the system 100. The loan processor 205 may then download the completed debt document for processing.

A communication and/or notification may be transmitted by the system 100 indicating if/when each document has been received by the system 100 and/or approved/processed by a user. This communication and/or notification may be transmitted to a user, multiple users, or discriminatorily to a user based upon a user type and status. In addition, a document status screen display 912 may be provided indicating a document status 913 (See FIG. 10E). The system 100 may generate an "incomplete" status if no document has been received by the system 100, a "pending" status if received by the system 100 but not approved/processed by a user, and/or a "complete" status if received by the system 100 and approved by a user. A document status screen display 912 may be configured to present such document status information 913 in a coalesced format. This coalesced format may be configured within a scroll function indicator 914 to enable a user to review full content of a document status screen display 912 that may be presented in a truncated format.

Such document statuses 913, and associated communications and/or notifications thereof, enhance coordination of the team 616 in an efficient and effective manner. For example, the loan processor 205 may provide document icons 902 and document text 904 to inform the buyer 201 of which documents are required, or the loan processor 205 may upload a document for the buyer 201 to complete. The system 100 may automatically transmit communications and/or notifications and update screen displays and indicators to represent a change in activity. For example, the document may be indicated by the system 100 as incomplete, and a communication may be transmitted to the buyer 201 that an activity is prepared and should be acted upon by the buyer 201. After the buyer 201 acts upon the document and uploads that document, a communication may be transmitted by the system 100 to the loan processor 205 and/or other users indicating that document as pending. Once the loan processor 205 reviews and approves/processes that document, a communication may be transmitted by the system 100 to the buyer 201 and/or other users indicating that document as complete.

Figure 10F:
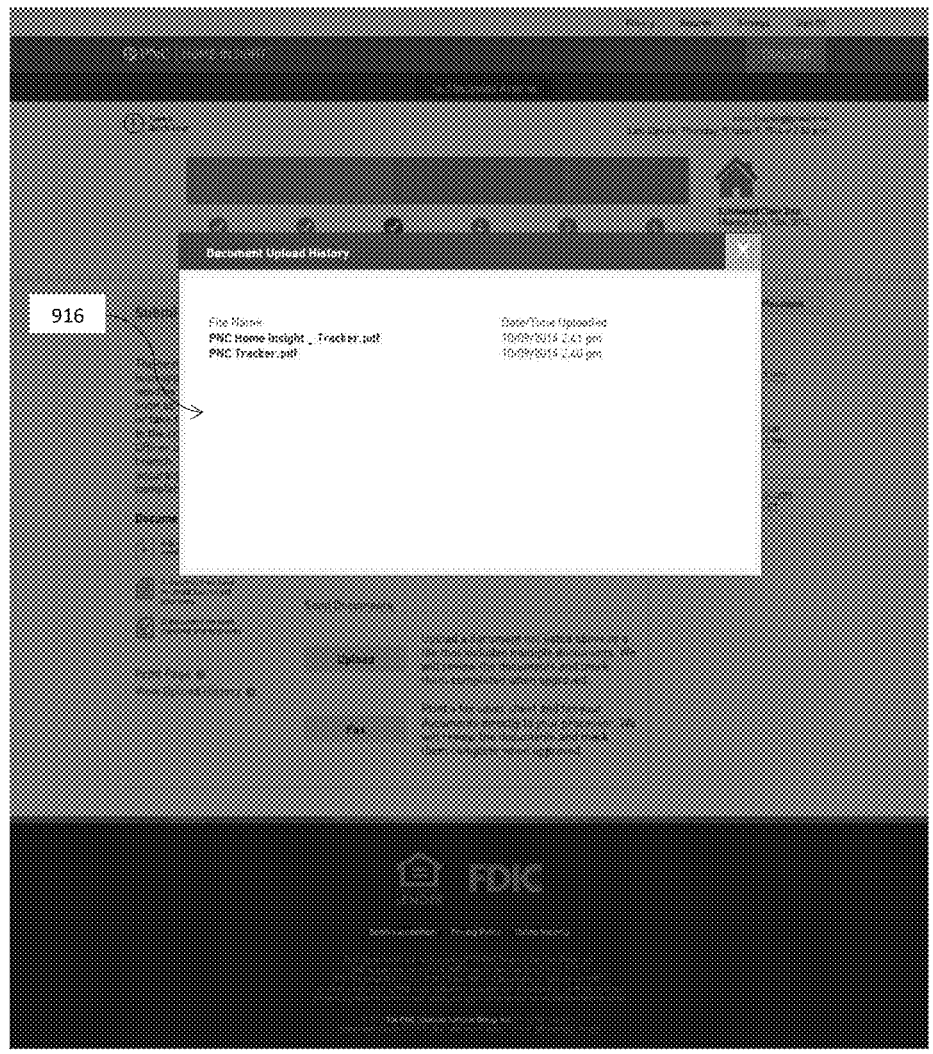

The documents panel display 900 may be programmed with a view upload history indicator 915, which may present graphical and/or textual information on an upload history screen display 916 representing upload activity, as shown in FIG. 10F. This may include, but is not limited to, data representing number of documents uploaded, type of documents uploaded, images of documents uploaded, statuses of documents uploaded, dates and times of documents uploaded, etc.

A save indicator (not shown) and/or print page indicator 917 may be programmed to convert data into a file format such a Word Document, PDF, Excel, etc. Data converted to a file format or the data itself may be transmitted via the system 100 to other users and/or system 100. The system 100 may be configured to automatically save data as described earlier and/or transmit data to users and/or the system 100. A print page indicator 917 may be provided on any screen display 113, which may be programmed to enable a user to print a screen display 113 in a printer-friendly format in addition to convert data into a file format. The system 100 may be configured to associate and display a timestamp (not shown) with an output generated by the system 100, as well as incorporate such timestamp into any printed page.

Figure 11:
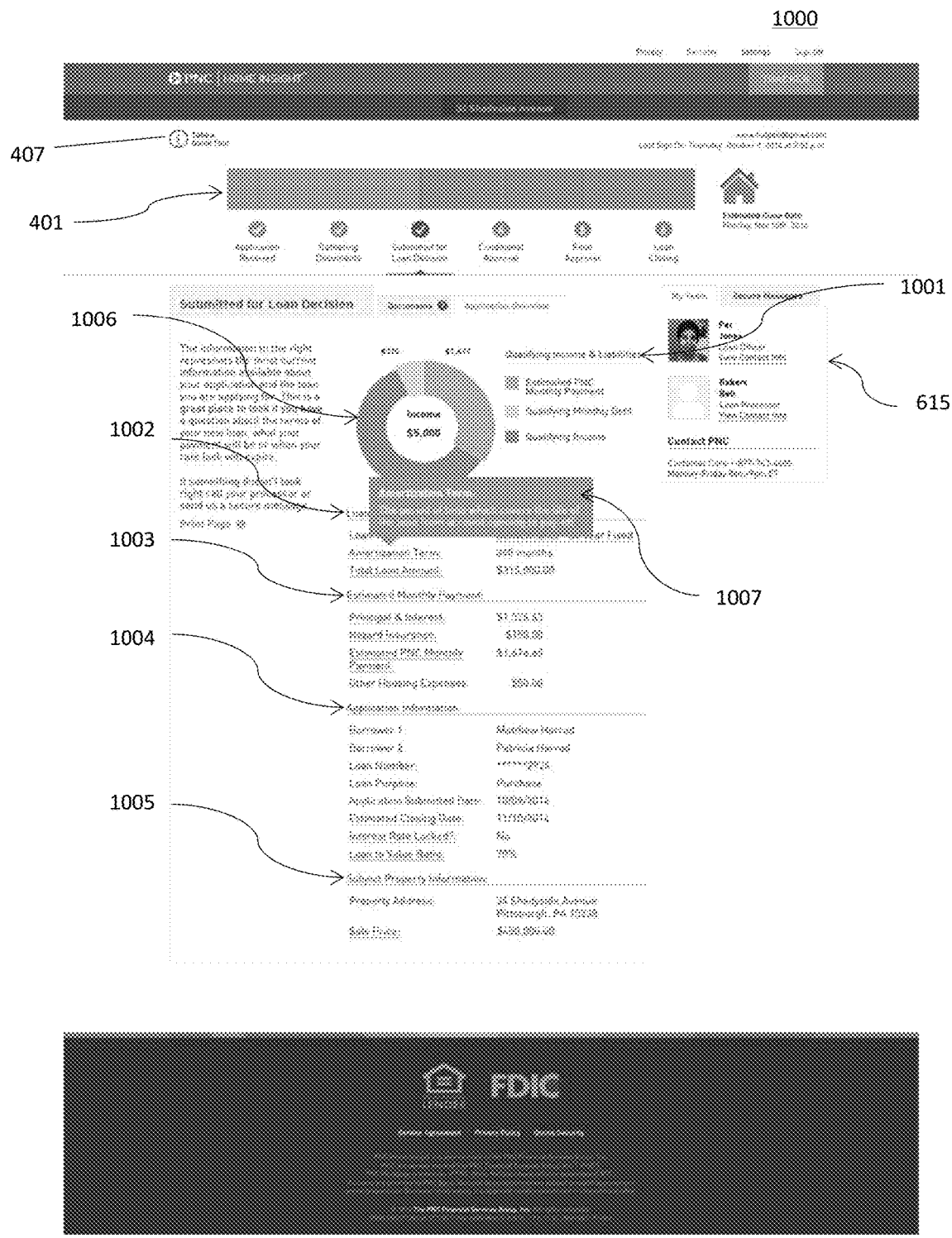
FIG. 11 is an exemplary embodiment of an application overview panel display.

Referring now to FIG. 11, an exemplary embodiment of an application overview panel display 1000, is disclosed. Activating the application overview indicator 403 may present an application overview panel display 1000, which may be programmed to display data regarding information that may be considered when determining approval/denial of obtaining financing. Portions of an application overview panel display 1000 may be programmed to display at least a qualifying income and liabilities segment 1001, a loan term and type segment 1002, an estimated monthly payment segment 1003, an application segment 1004, and/or a property segment 1005. Such information may be displayed in a graphical and/or textual manner. Such a graphical representation may be configured as a circular graph 1006 with segmented components that may highlight upon activation. This may be done to display copious data with effective sensory stimulation to direct a user to distilled information of that data. Data presented on the application overview panel display 1000 is retrieved from purchasing/financing data 204.

Other graphic and/or textual displays may be highlighted without being activated to indicate that they may be associated with, or function as, an indicator. For example, an "Amortization Term" text may be highlighted (e.g., being underlined) to indicate to a user that the text may be activated as an indicator to provide a pop-up or comment screen 1007. A comment screen 1007 may be programmed to provide a definition of a text (e.g., define what Amortization Term is).

The qualifying income and qualifying liabilities segment 1001 may be programmed to display information that may include, but is not limited to, data representing income, qualifying income, qualifying monthly debt, estimated loan payment, recurring debt, housing payment, and the like. The system 100, through a computational algorithm, may determine qualifying income and qualifying liabilities based upon inputted data representing such information.

The loan term and loan type segment 1002 may be programmed to display information that may include, but is not limited to, data representing amortization term, total loan amount, interest rate, percentage rate, first rate adjustment, index, etc.

The estimated monthly payment segment 1003 may be programmed to display information that may include, but is not limited to, data representing principal and interest, hazard insurance, estimated monthly payment, estimated property insurance payment, other insurance payment, estimated tax payment, other housing expenses, etc.

The application segment 1004 may be programmed to display information that may include, but is not limited to, data representing borrower, loan number, loan purpose, application submitted date, estimated closing date, interest rate, loan to value ratio, etc.

The property segment 1005 may be programmed to display information that may include, but is not limited to, data representing property address, sale price, appraised value, estimated market value, etc.

Figure 12A:
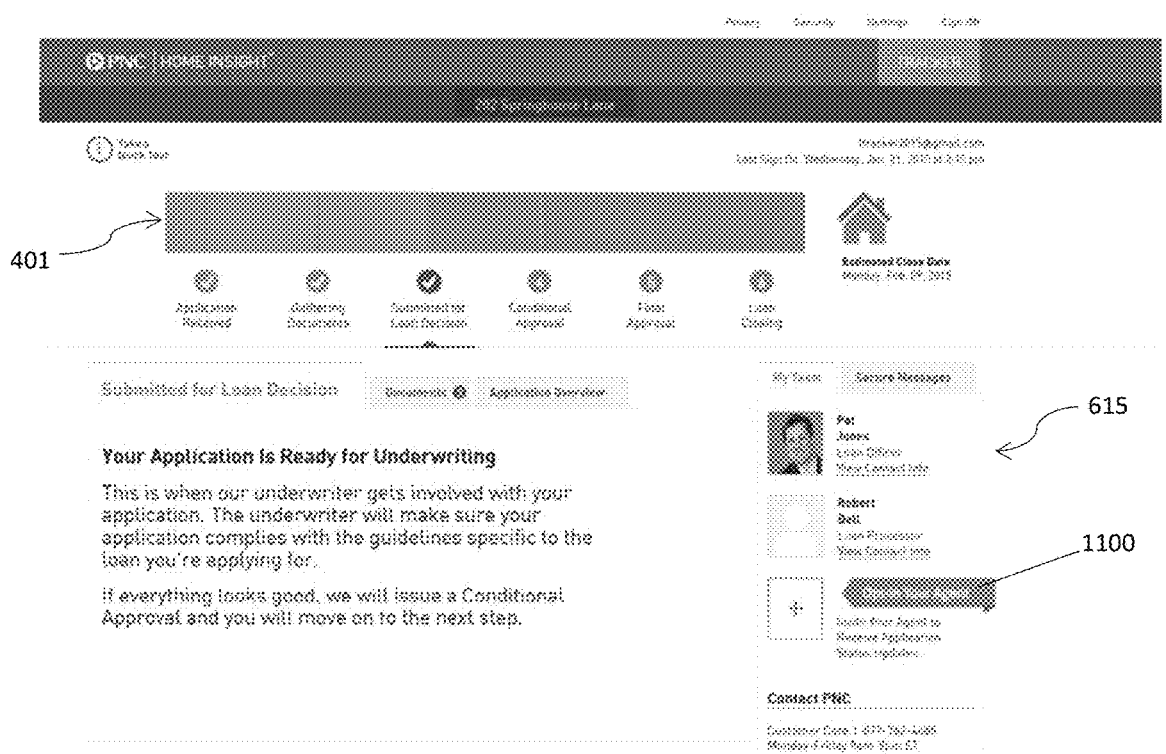
FIGS. 12A-M are exemplary embodiments of an opt in feature accessed through the second panel.

Referring now to FIGS. 12A-M, exemplary embodiments of an opt in feature accessed through the second panel 400, are disclosed. As described earlier, a buyer 201 may include a broker 206 to be a team member 616 via an opt in indicator 1100 displayed on the second panel 400. The opt in indicator 1100 is preferably displayed within the my team panel display 615, as shown in FIG. 12A. The opt in indicator 1100, when activated, may be configured to enable a buyer 201 to associate a broker 206 with the buyer's 201 account. Opting in a registered broker 206 enables the broker 206 to receive communications and/or notifications regarding status updates of a buyer's 201 account via the fourth panel 1400. The details of these communications and/or notifications will be discussed later.

Preferably, in order for a broker 206 to become a team member 616, the broker 206 must register via the third panel 1300 and be opted in by the buyer 201. Being a team member 616 may also be conditioned upon the broker 206 accepting the opt in. However, the system 100 may be configured to require more or less steps in order to permit the broker 206 to become a team member 616. The broker 026 may register before or after receiving a solicitation via an opt in communication. The system 100 may be configured to require the broker 206 to register only once, register each time a buyer 201 solicits an opt in request, or register upon occurrence of any other condition. The registration process will be discussed later.

Figure 12B:
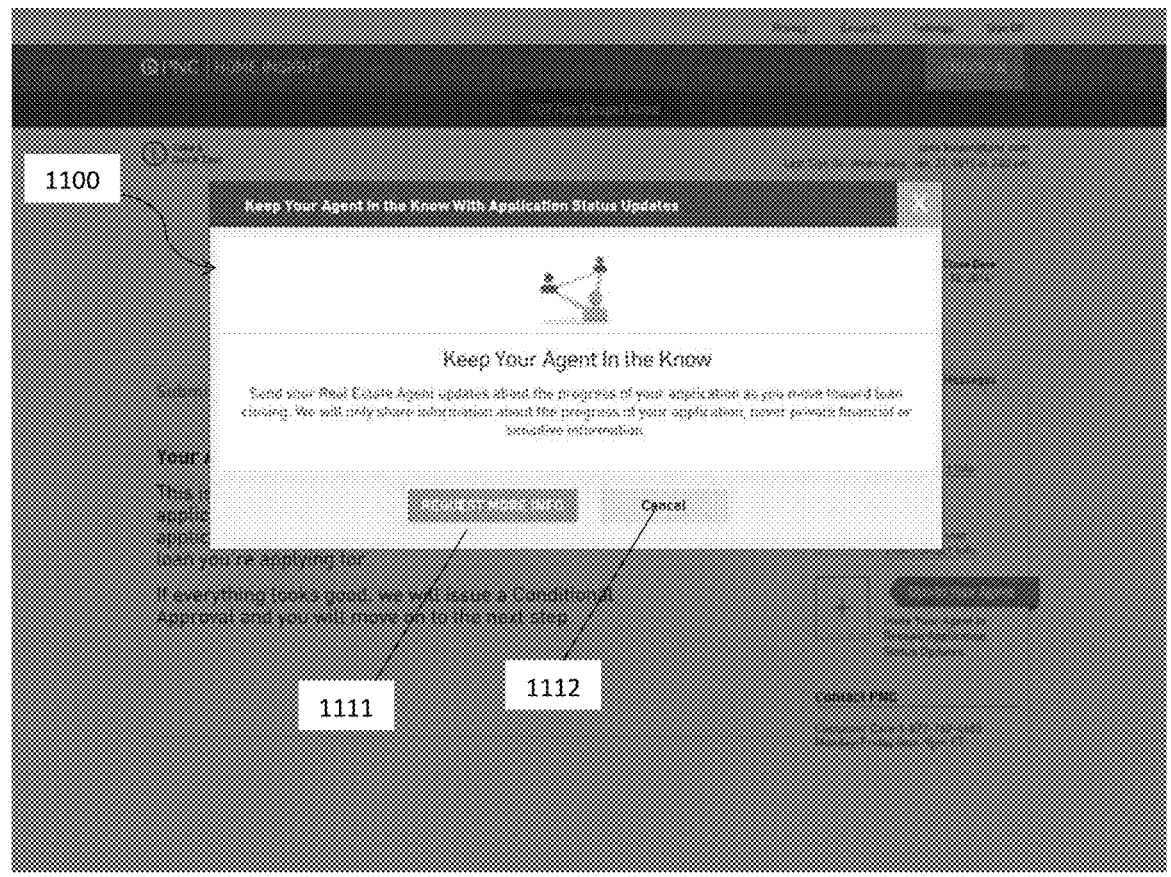
Figure 12C:
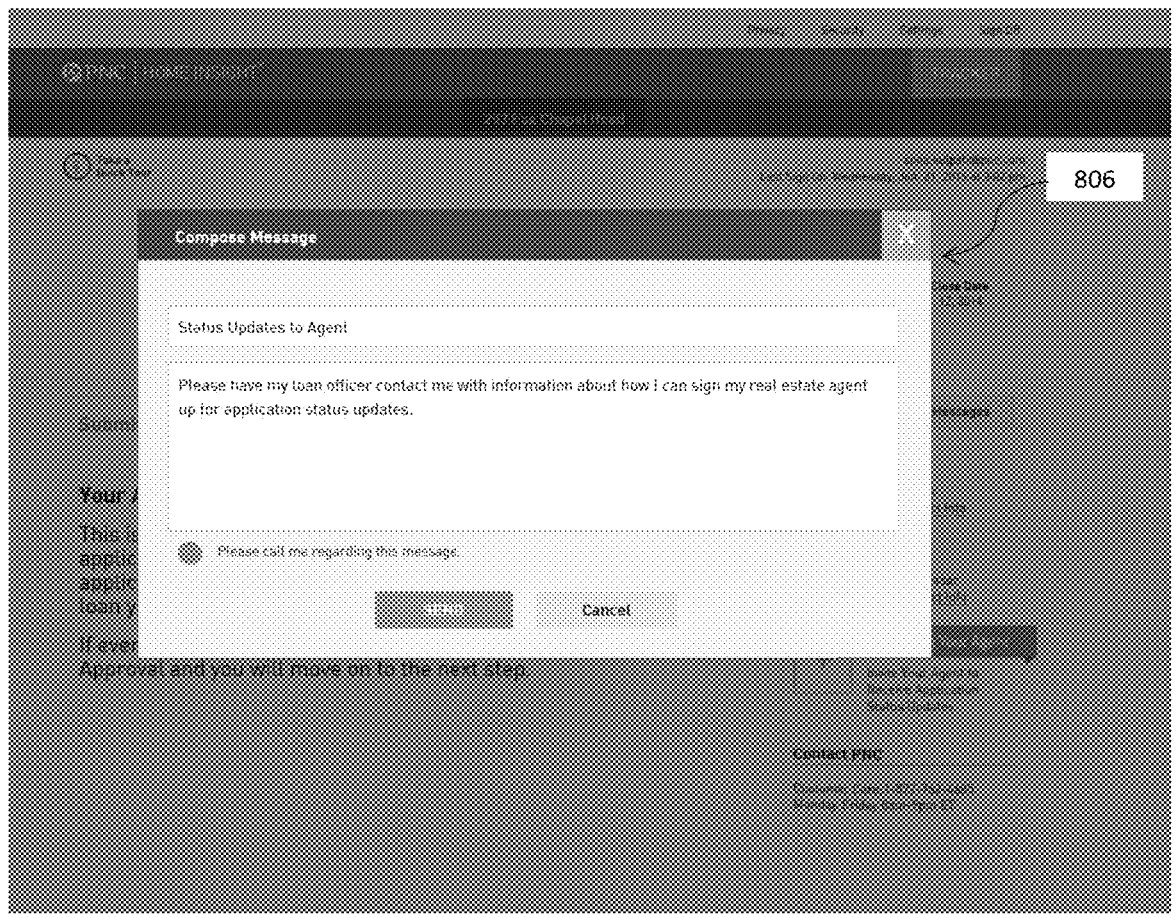
Figure 12D:
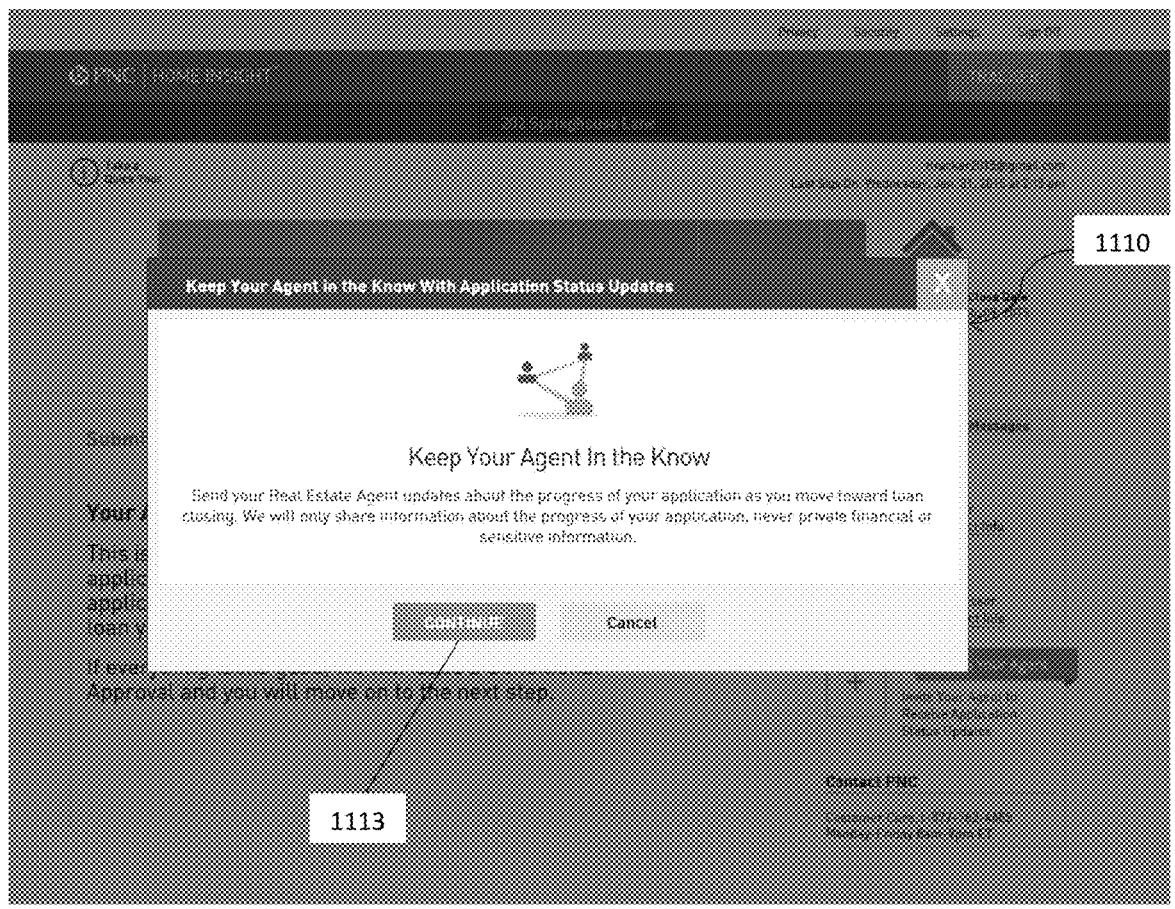

Activation of the opt in indicator 1100 enables the buyer 201 to solicit a request to have the broker 206 become a team member 616. Activating the opt in indicator 1100 generates the keep your agent in the know screen display 1110, as shown in FIG. 12B. This screen display 1110 may include information describing the opt in feature. The buyer 201 may compose a message to request information about the opt in feature from another user (e.g., the loan officer 202) by activating the request more info indicator 1111. FIG. 12C shows the compose message screen display 806 associated with the op in feature. The buyer 201 may cancel the opt in by activating the cancel indicator 1112. Alternatively, the buyer 201 may proceed by activating the continue indicator 1113.

Figure 12E:
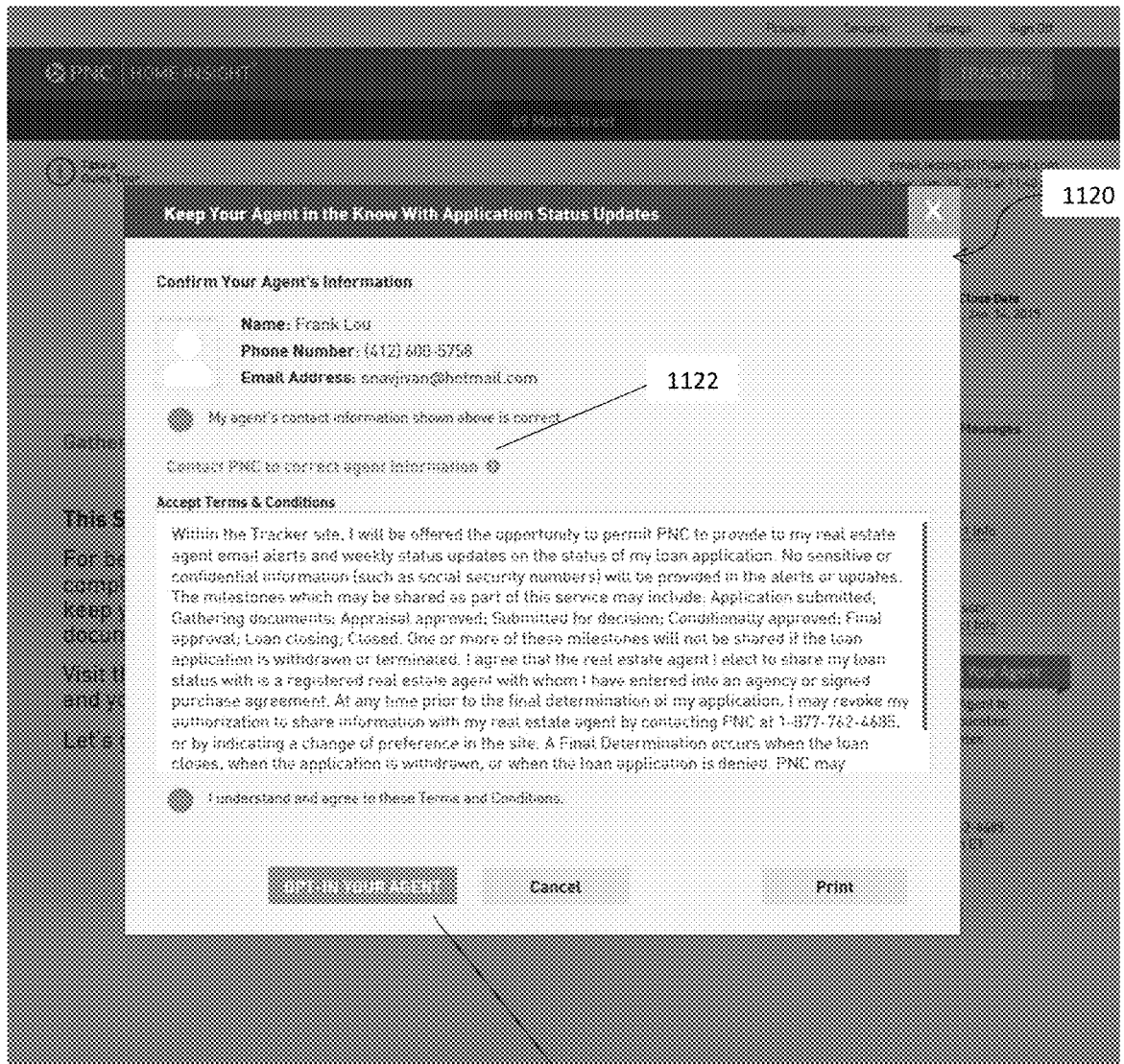

A buyer 201 may be presented with a terms and conditions screen 1120, which automatically populates the broker's 206 information if the system 100 already has the broker's 206 information (i.e., if the broker 206 is already registered), as shown in FIG. 12E. A buyer 201 may confirm that the broker's 206 information is correct by activating the agent opt in indicator 1121. The buyer 201 may also activate the correct agent information indicator 1122 to input/update the broker's 206 information.

Figure 12F:
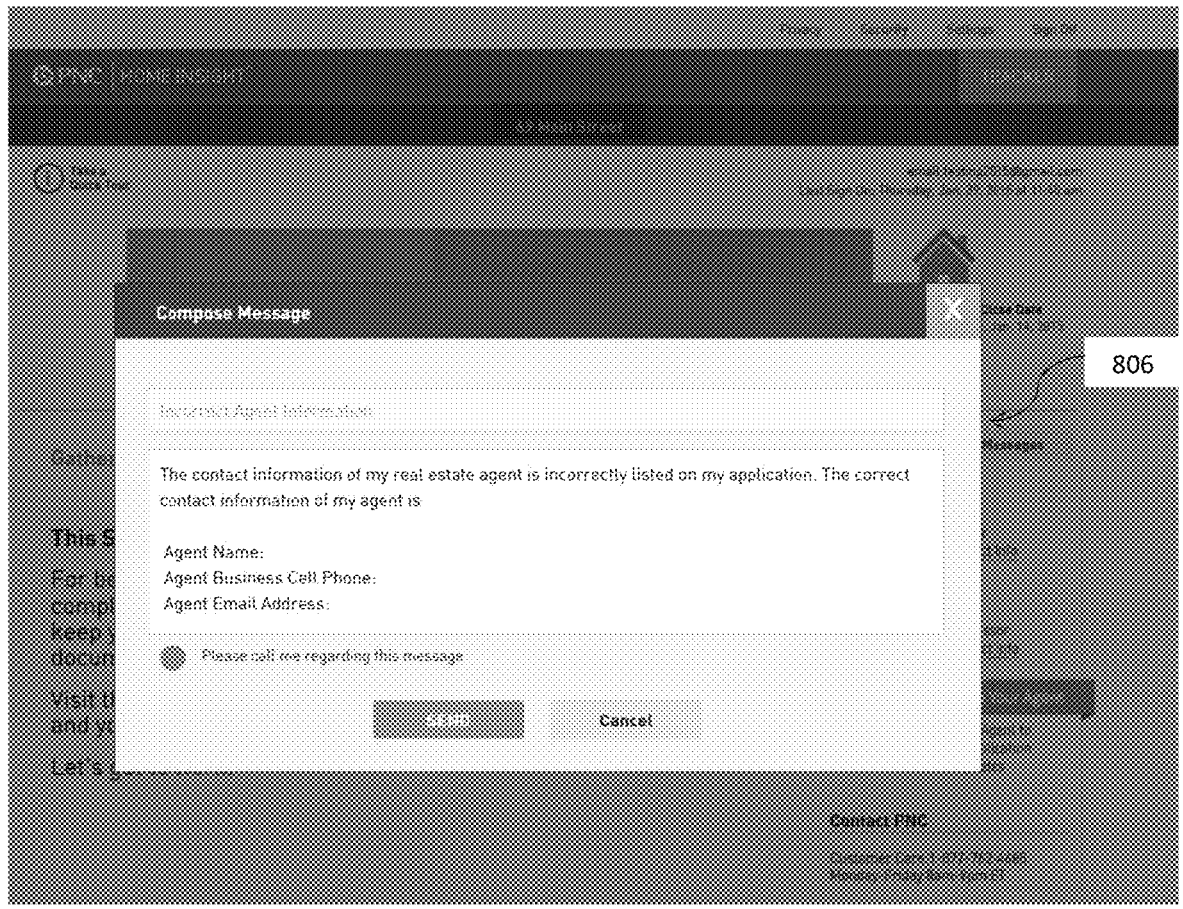

Upon activating the correct agent information indicator 1122, a buyer 201 may be presented with a compose massage screen display 806 to correct/updated the broker's 206 information, as shown in FIG. 12F. This message is preferably sent to the loan processor 205 and/or the system 100. This message may prepopulate a standard message with the input titles for the buyer 201.

Figure 12G:
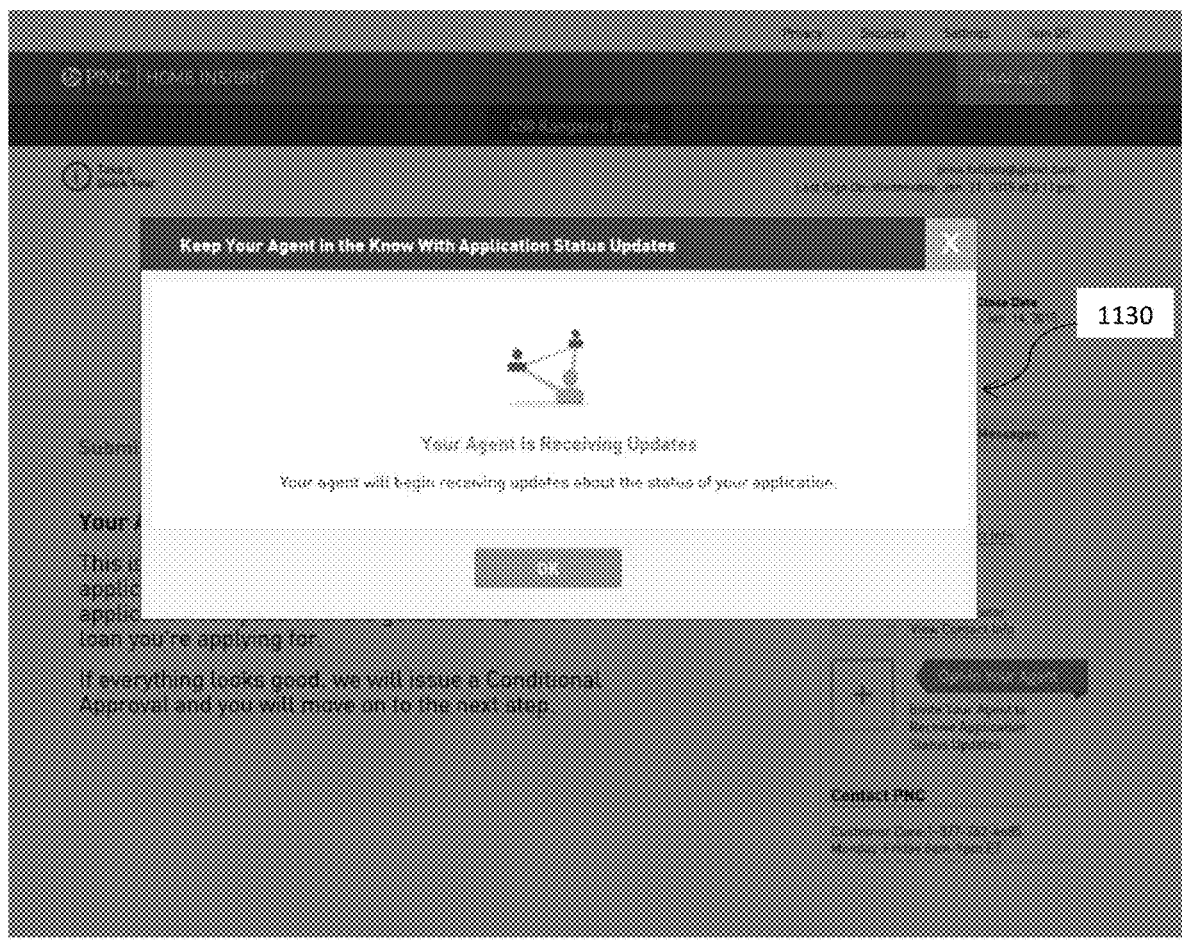

If a broker 206 is already registered, then the system 100 may display the your agent is receiving updates screen display 1130, as shown in FIG. 12G. Once opted in by the buyer 201, the system 100 may populate the broker's 206 information within the my team panel display 615 similar to how the other team members 616 are displayed (See FIG. 12I). Because the broker 206 is already registered in this scenario, the my team panel display 615 may be programmed to display a status for the broker 206 as "Receiving Updates".

Figure 12H:
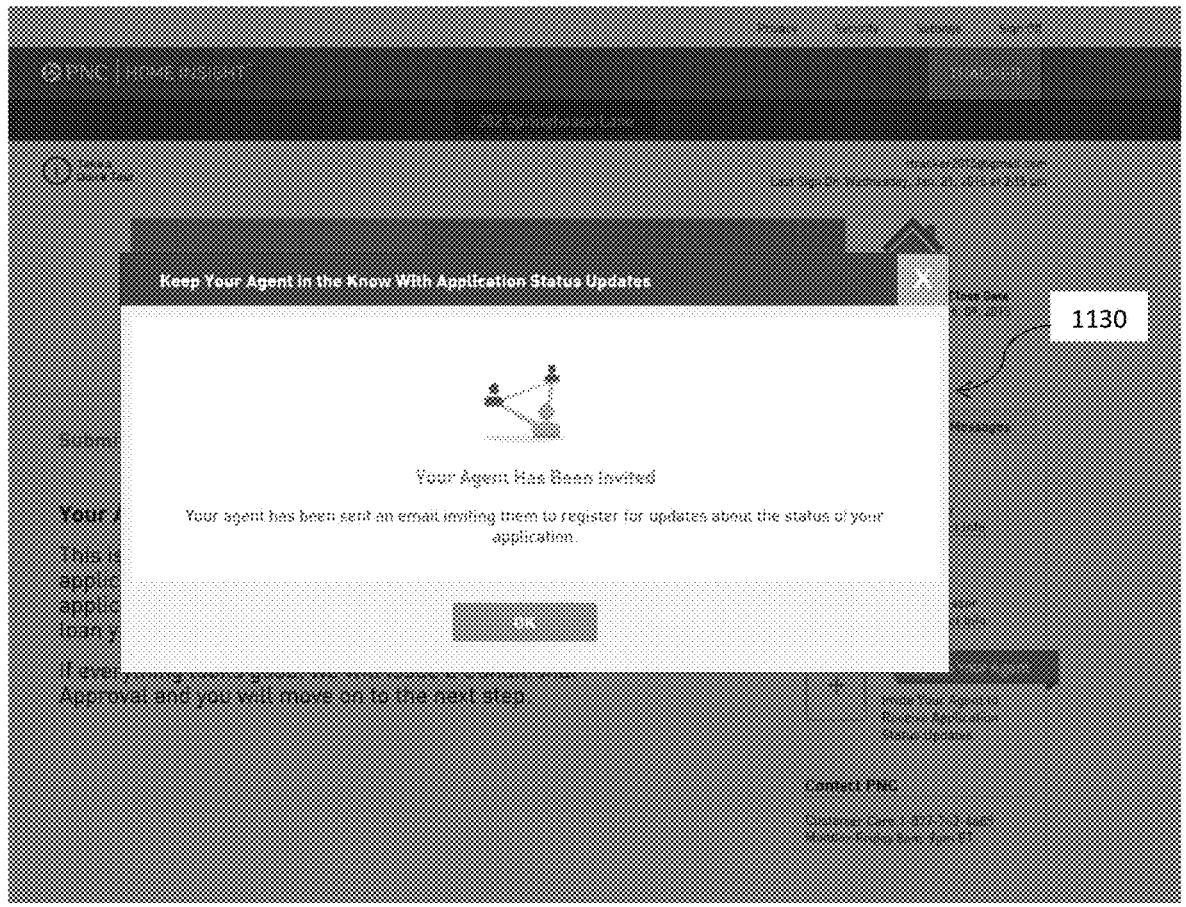
Figure 12I:
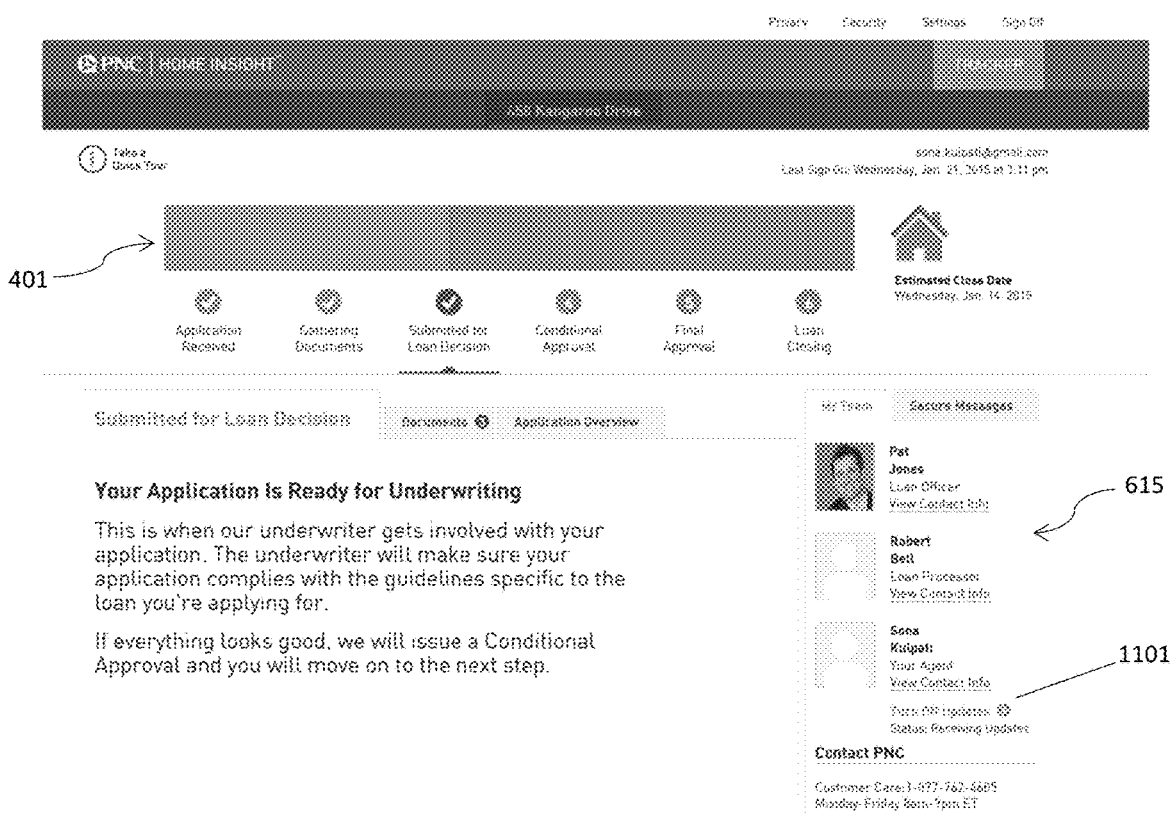
Figure 12J:
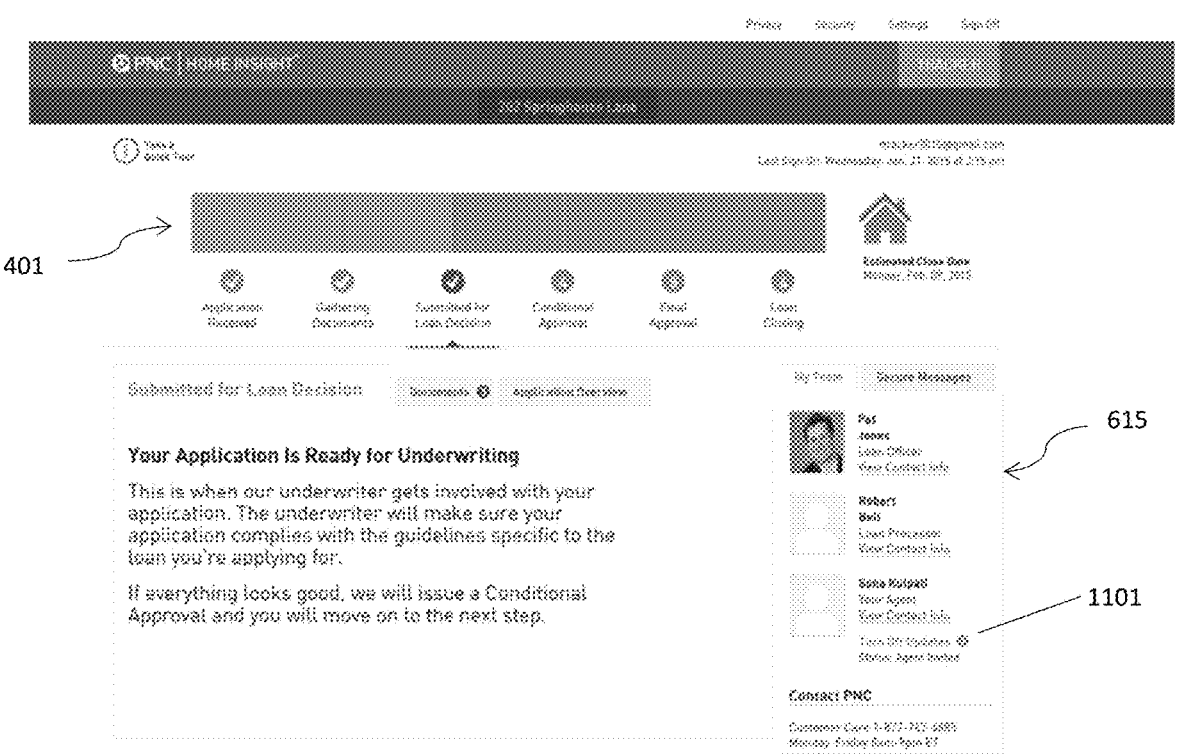

If the broker 206 is not registered, then the system 100 may display the your agent has been invited screen display 1140, as shown in FIG. 12H. Again, once opted in by the buyer 201, the system 100 may populate the broker's 206 information within the my team panel display 615 similar to how the other team members 616 are displayed (See FIG. 12J). Because the broker 206 is not registered in this scenario, the my team panel display 615 may be programmed to display a status for the broker 206 as "Agent Invited".

Figure 12K:
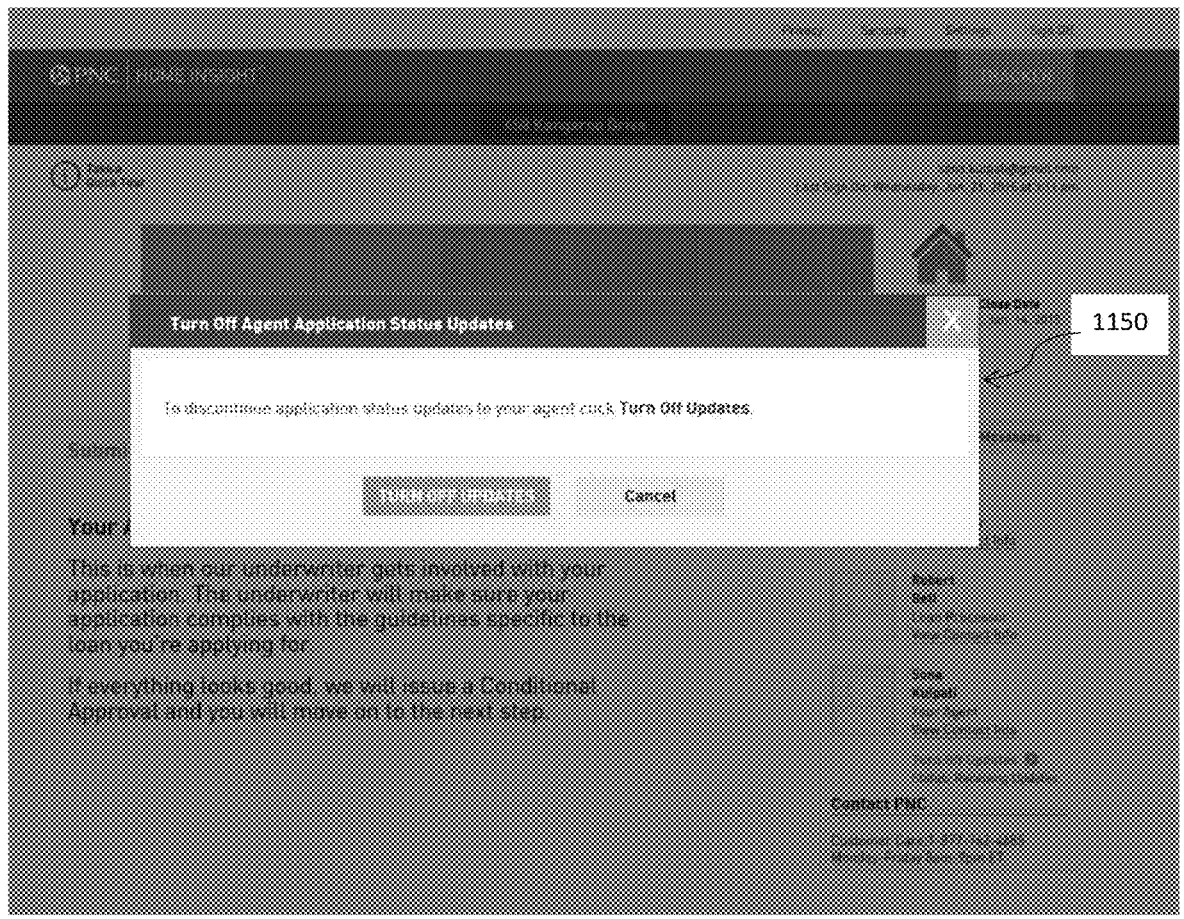
Figure 12L:
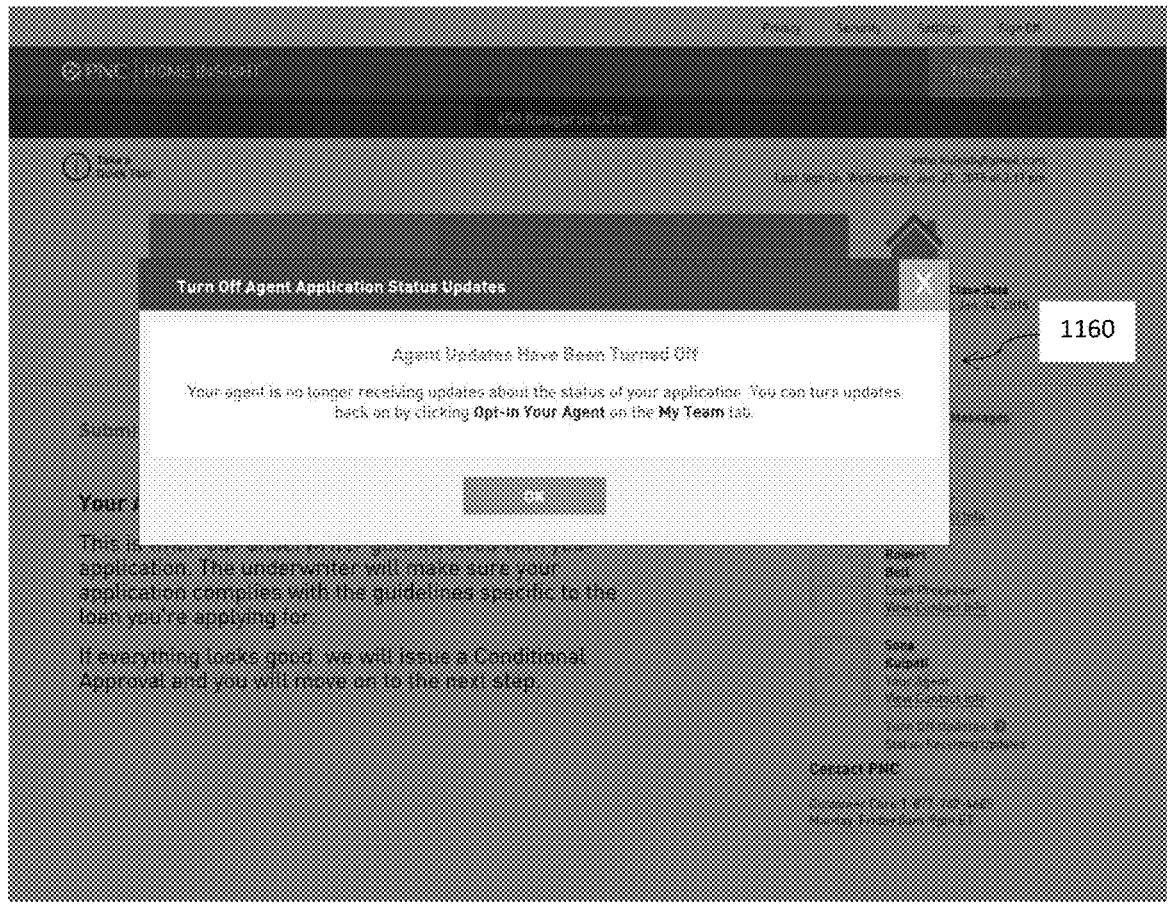

Once opted in, a buyer 201 may opt out the broker 206 at any time by activating the turn off updates indicator 1101. Upon activation of the turn off updates indicator 1101, the buyer 201 may be presented with the turn off agent status updates screen displays 1150, 1160, as shown in FIGS. 12K and 12L. The turn off updates indicator 1101 enables a buyer 201 to prevent the broker 206 from receiving any communications and/or notifications related to the buyer's 206 account. This may include, but is not limited to, disassociating accounts that were previously linked.

Similarly, a broker 206 may opt out of receiving communications and/or notifications from a particular buyer 201 or a plurality of buyers 201. A broker 206 may also unregister from the system 100. In addition, the system 100 may opt out a broker 206 and/or unregister a broker 206 automatically based upon a condition. Moreover, the system 100 may be configured to enable another user (e.g., a financial institution 203) to opt out and/or unregister a broker 206. Furthermore, the system 100 may be configured to enable a user (e.g., a financial institution 203) to prevent another user (e.g., broker 206) from registering and/or re-registering.

Figure 12M:

FIG. 12M illustrates an exemplary communication and/or notification generated by the system 100 informing a buyer 201 that the buyer 201 has opted in the broker 206, that the broker 206 is registered, and the broker 206 is now a team member 616. Similar communications and/or notifications may be generated whenever a team member's 616 status changes in any way and/or when a team member 616 is added/removed. The change in status and/or addition/removal of a team member 616 may be due to a manual input of a user or may be due to a condition met so as to occur automatically by the system 100. A condition may include, but is not limited to, a change in email address of a user, a user opting out, a blacklisting of a user, etc. For example, if a broker's email address changes, the system 100 may be configured to automatically op out the broker 206 so as to require the broker 206 is be opted back in and/or re-register. FIG. 12M shows a communication and/or notification that may be sent to the buyer 201 regarding the broker's 206 status; however, a similar communication and/or notification may be sent to any user regarding any other user's status. For example, a buyer 201 may receive a different communication and/or notification if a broker 206 is opted in but is not registered, or when the buyer 201 opts out a previously opted in broker 206, or when the broker 206 decides to no longer receive updates, or when the system 100 opts out the broker 206, etc. The loan officer 202, the broker 206, or other users may receive similar communications and/or notifications. Again, communications and/or notifications may be sent discriminatorily base upon a user's status.

Figure 13A:
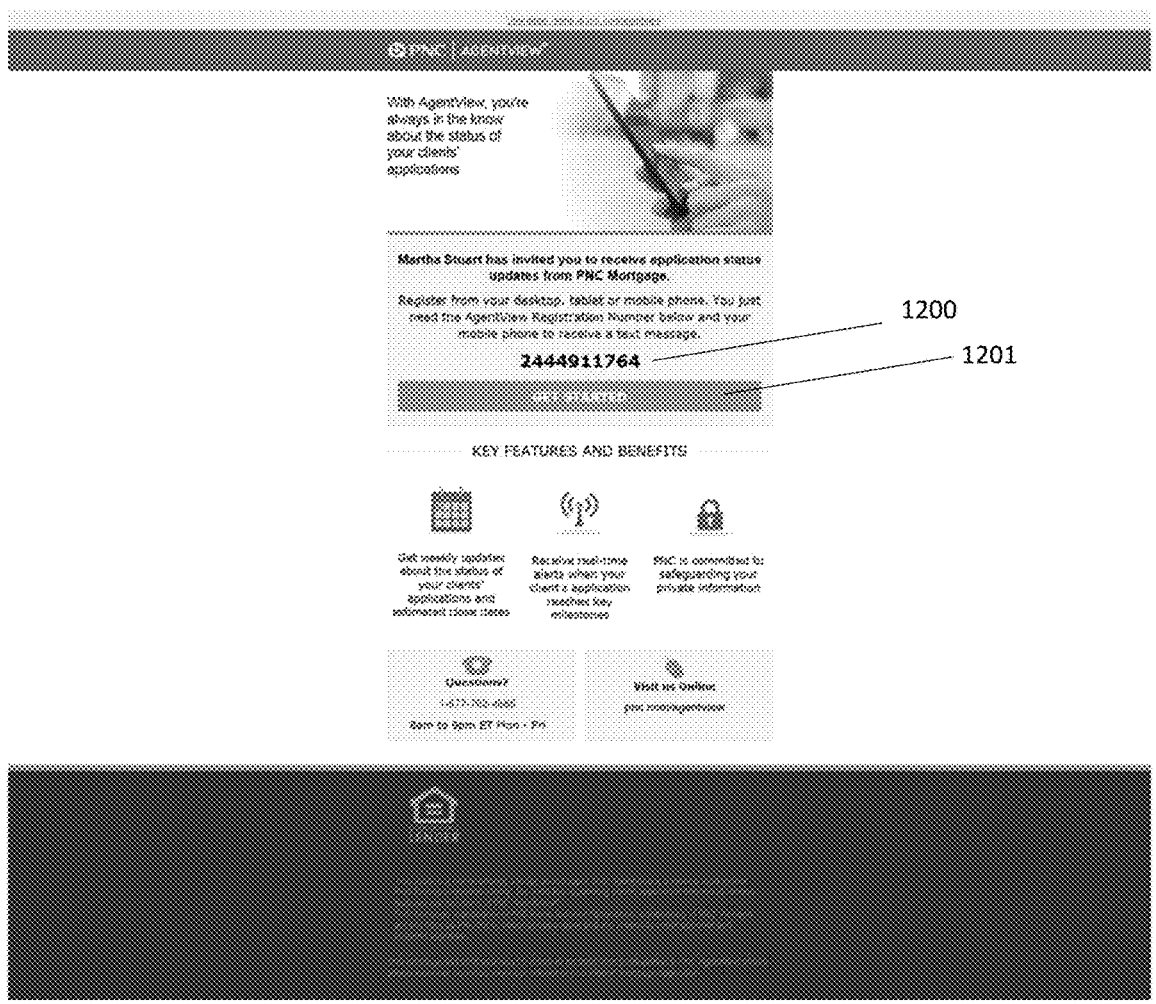
Figure 13C:
Figure 14A:
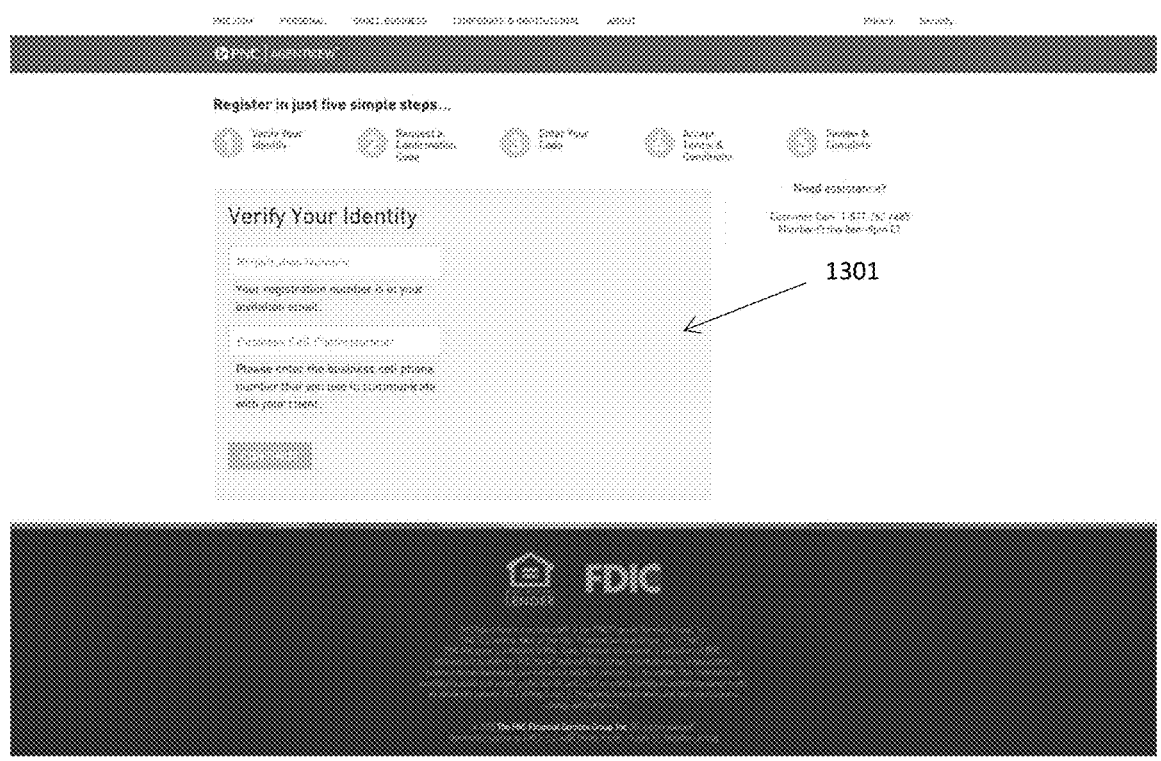
Figure 14B:
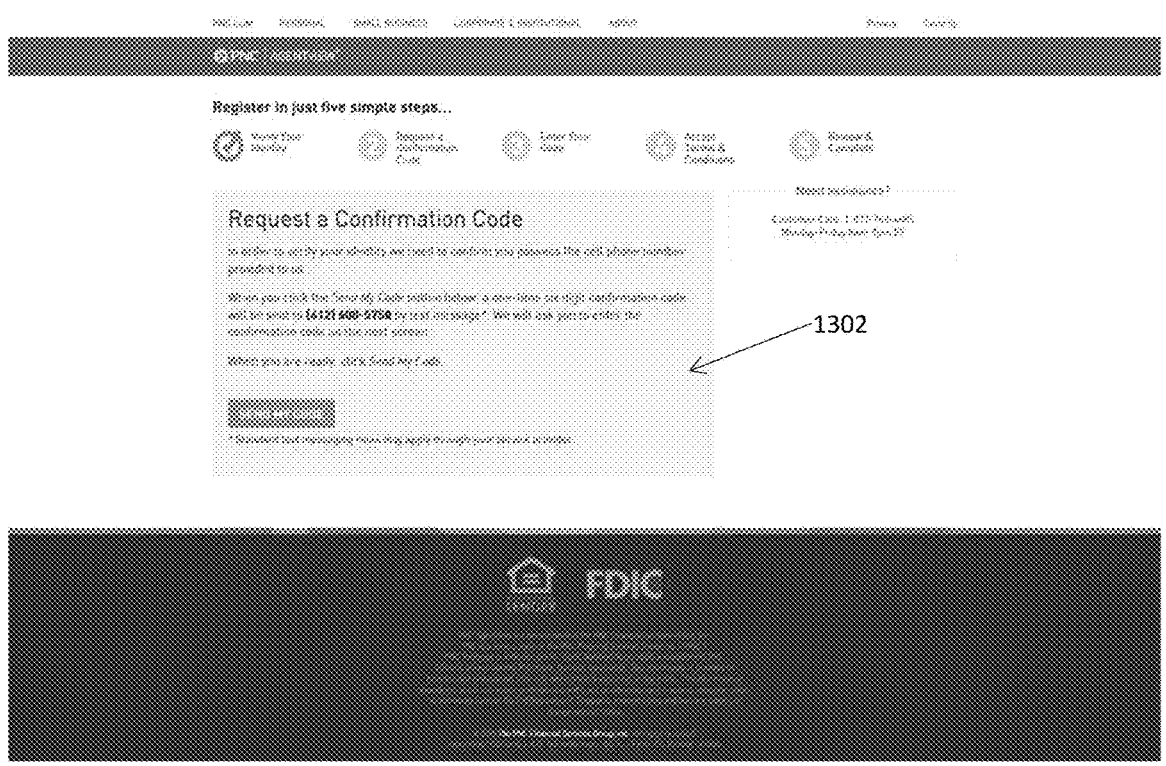
Figure 14D:
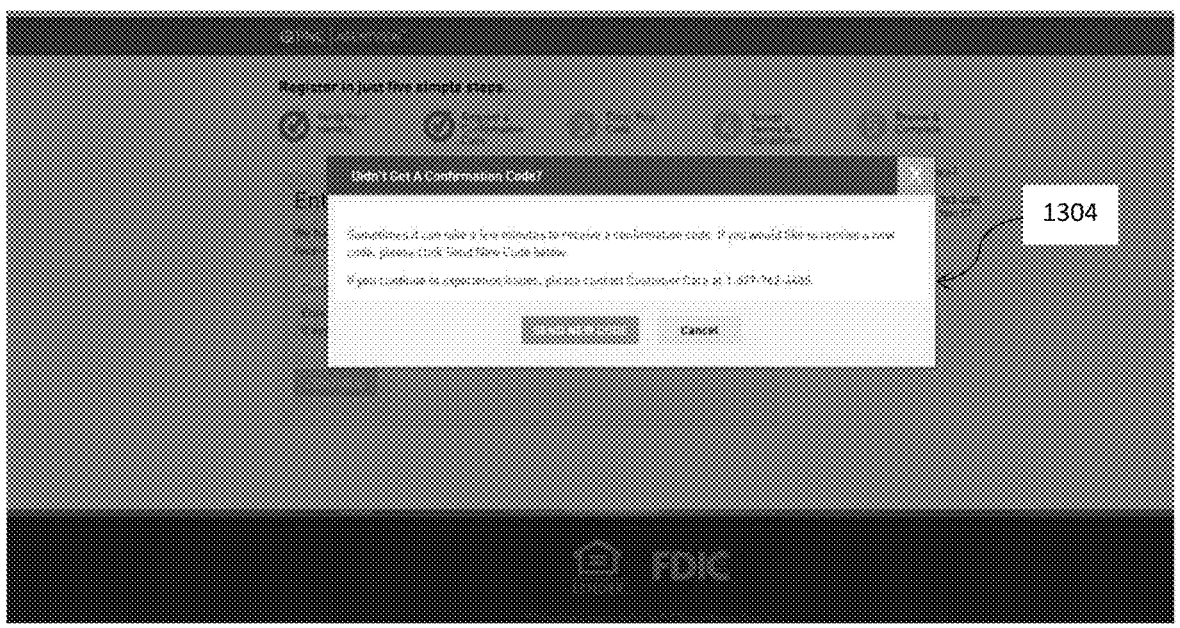
Figure 14F:
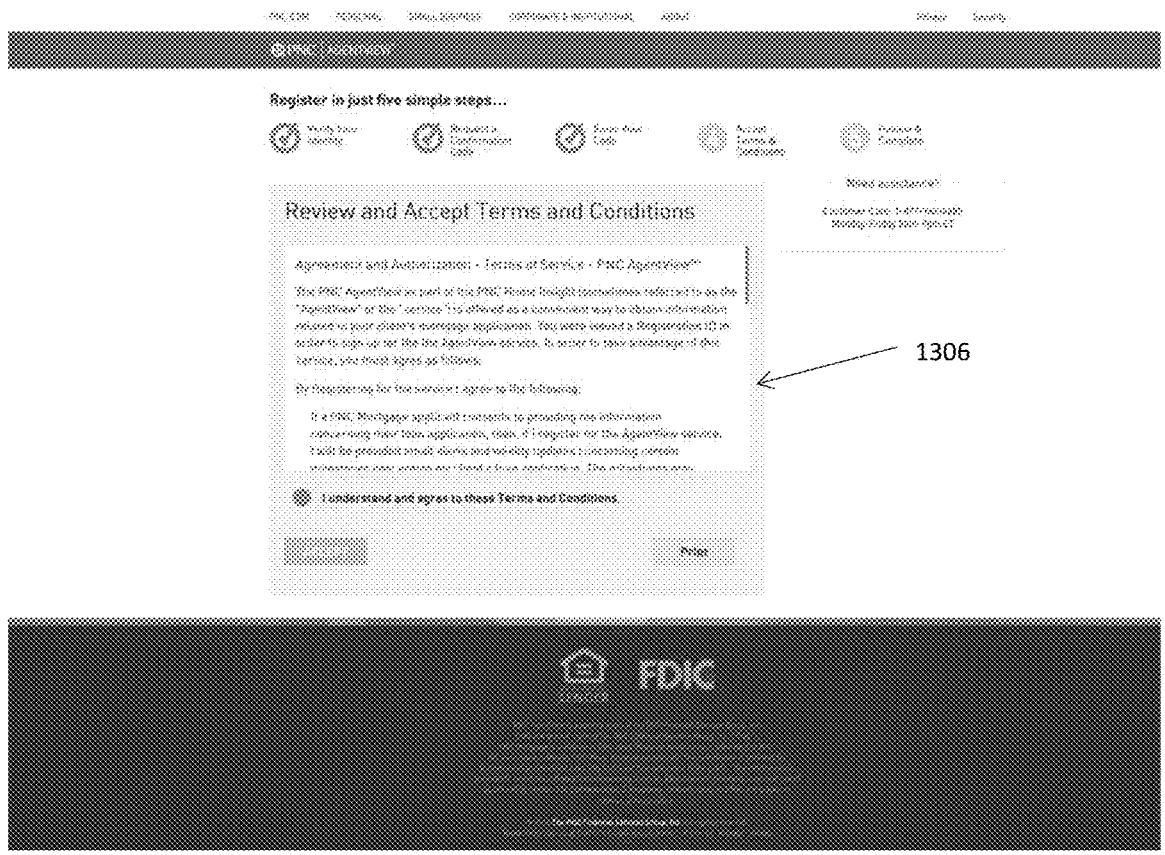

Referring now to FIGS. 13A-C, exemplary communications and screen displays that may be transmitted to a broker 206 soliciting an opt in by a buyer 201, are disclosed. When a buyer 201 opts in a broker 206, the broker 206 may receive a communication and/or notification as shown in FIGS. 13A and 13B, which may include a registration number 1200 and a link 1201 to enable the broker 206 to register with the system 100. This communication may be sent in accordance with the how the buyer 206 instructed the system 100 to provide the communication. For example, this communication may be sent to the broker 206 via email or text. Activating the link 1201 navigates the broker 206 to the AgentView landing webpage 1210, which may provide the broker 206 with information about the system 100 and method 200 and provide a registration indicator 1211.

Referring now to FIGS. 14A-H, exemplary registration screens 1301-1308 enabling a broker 206 to register with the system 100, are disclosed. Upon activating the registration indicator 1211, the broker 206 is presented with the registration screen displays 1301-1308 of the third panel 1300. The third panel 1300 enables the broker 206 to set up an account to be linked to at least one buyer 201 as described earlier. The third panel may also be provided with screen displays enabling adding, deleting, and/or modifying data associated with the broker's 206 account. This may include, but is not limited to updating a user I.D., email address and other contact information, updating a password, updating a personal security image, updating securing questions and answers, etc.

Figure 15A:
FIGS. 15A and 15B are exemplary progress alerts and summary progress reports that may be generated by the fourth panel and transmitted to the broker.
Figure 15B:

Referring now to FIGS. 15A and 15B, exemplary progress alerts 1401 and summary progress reports 1410 that may be generated by the fourth panel 1400 and transmitted to the broker 206, are disclosed. Upon registering, the broker 206 becomes a team member 616, and is set to receive communications and/or notifications via the fourth panel 1400. These communications and/or notifications may include, but are not limited to, buyer 201 opt in requests, changes in statuses of users, buyer 201 progress updates, etc. If the buyer 201 enables the broker 206 to receive buyer 201 progress updates, the broker 206 will then be able to receive progress alters 1401, summary progress reports 1410, etc.

FIG. 15A shows an exemplary progress alert 1401 that may be generated by the system 100 and transmitted to the broker 206. The progress alerts 1401 are preferably generated each time the buyer 201 progresses and/or completes a process step 600-F (See FIGS. 6A-F); however, the progress alerts 1401 may be generated due to other conditions that are met, conditions not met, pending statuses, etc. As by example, FIG. 15A illustrates a progress alert 1401 notifying the broker 206 that the buyer 201 has completed the conditional approved process step 600D (See FIG. 7A). Alternatively, or in addition, the broker 206 may receive summary progress reports 1410. FIG. 15B shows an exemplary summary progress report 1410 that may be generated by the system 100 and transmitted to the broker 206. The summary progress report 1410 of FIG. 15D shows a weekly synopsis of events of a buyer 201 in a coalesced format.

The progress alerts 1401 and the summary progress reports 1410 are configured by the fourth panel 1400, coalesced in accordance to algorithms of the system 100, and disseminated as soon as they are generated, held in a queue to be disseminated on a deferred basis, or disseminated periodically. In addition to being transmitted to the broker 206, the information, either in raw form or in coalesced format, may be saved to the database 103. Preferably, the progress alerts 1401 are generated and disseminated each time a buyer 201 progresses to a process step 600A-F. Preferably, the summary progress reports 1410 are generated and disseminated on a periodic cycle. This may be weekly for example. Preferably, the progress alerts 1401 are generated and disseminated for buyer 201 on an individual basis. For example, each time an individual buyer 201 progresses to the next step, a progress alert 1401 is sent to the broker 206. Preferably, the summary progress reports 1410 are generated and disseminated to include every buyer 201 associated with the broker 206 to which the report 1410 is sent. For example, a summary progress report 1410 is generated to include each buyer 201 associated with the broker 206. One skilled in the art will appreciate, with the benefit of the present disclosure, that other schemes of coalescing disseminating the information may be utilized without deviating from the teachings of the system 100 and method 200.

Any of the progress alerts 1401 and summary progress reports 1410 may include additional information. This may include, but is not limited to, loan officer 202 information, loan processor 205 information, buyer 201 information purchasing/financing data 204, etc.

While exemplary embodiments of s progress alerts 1401 and summary progress reports 1410 transmitted/displayed to the broker 206 are envisioned to model a buyer's 206 progress as depicted on the second panel 400, they do not have to mimic that data. One skilled in the art will appreciate, with the benefit of the present disclosure, that any number and combinations/permutations of process steps and/or activities may be utilized to provide a broker 206 with an accurate depiction of a buyer's 201 progress, even if these process steps are not displayed on the second panel 400.

While exemplary embodiments may illustrate an indicator as associated with a particular module 109, panel 110, or screen display 113, an indicator may be associated with any other, or multiple, modules 109, panels 110, or screen displays 113. For example, multiple panels 110 may be programmed to display a documents indicator 403, application overview indicator 404, etc.

Figure 16A:
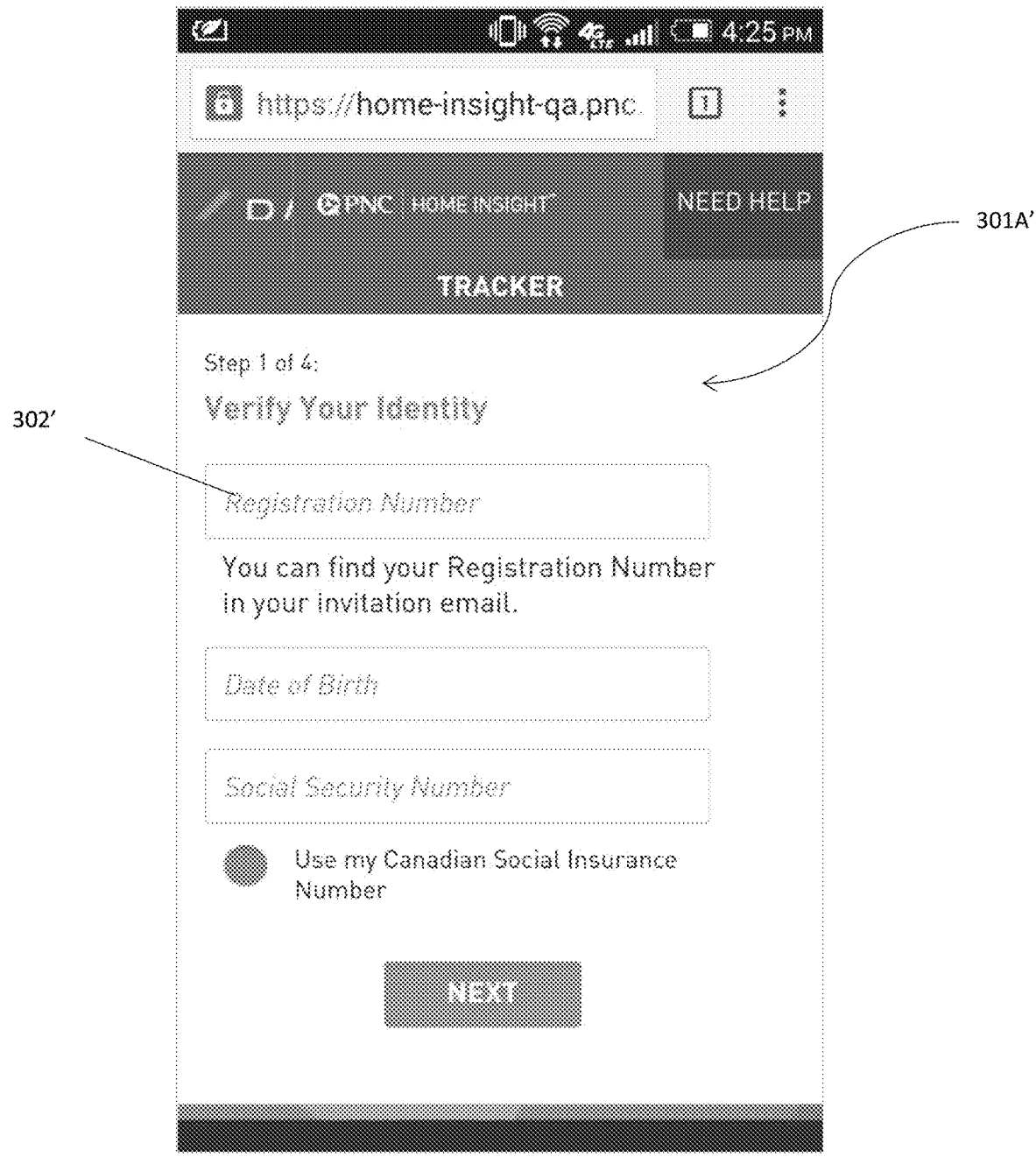
FIGS. 16A-D are exemplary embodiments of various login screen displays configured as mobile versions.
Figure 16B:
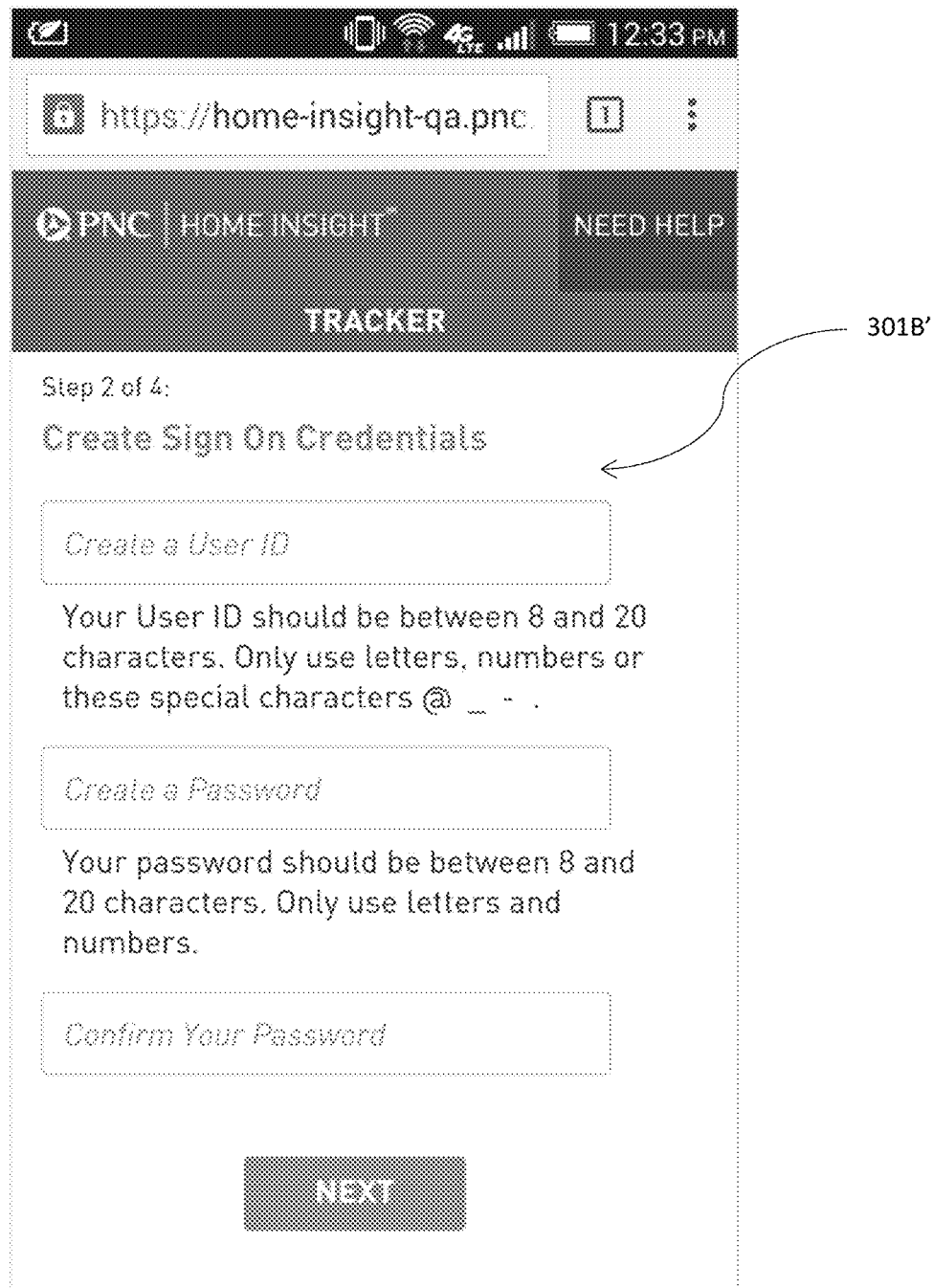

The system 100 may be configured to present various modules 109, panels 110, and screen displays 113 such as to be mobile-optimized. This may be achieved by presenting a user with a "view mobile" version indicator (not shown) on any panel 110 and/or screen display 113. Similarly, a mobile version may be provided with a "view full" version indicator 3000 (See FIG. 16A). Optimal use of a GUI, other interface, and/or website via a mobile computer device 101, as opposed to a desktop computer device 101, may be attained by providing mobile-optimized features through a mobile version. This may be achieved by reducing features, omitting content, and amplifying and/or enlarging interface elements. For example, a mobile version may not display a progress indicator 401 as a graphical display. As another example, a mobile version of the system 100 may be configured without upload and/or download features. The mobile-optimized versions will be discussed next. The various Figures of this disclosure related to the mobile versions include item denotations to reference elements described in the specification, and it is understood that elements indicated with a prime have similar functionality to those previously described. Therefore a full explanation of them will not be required.

Figure 16C:
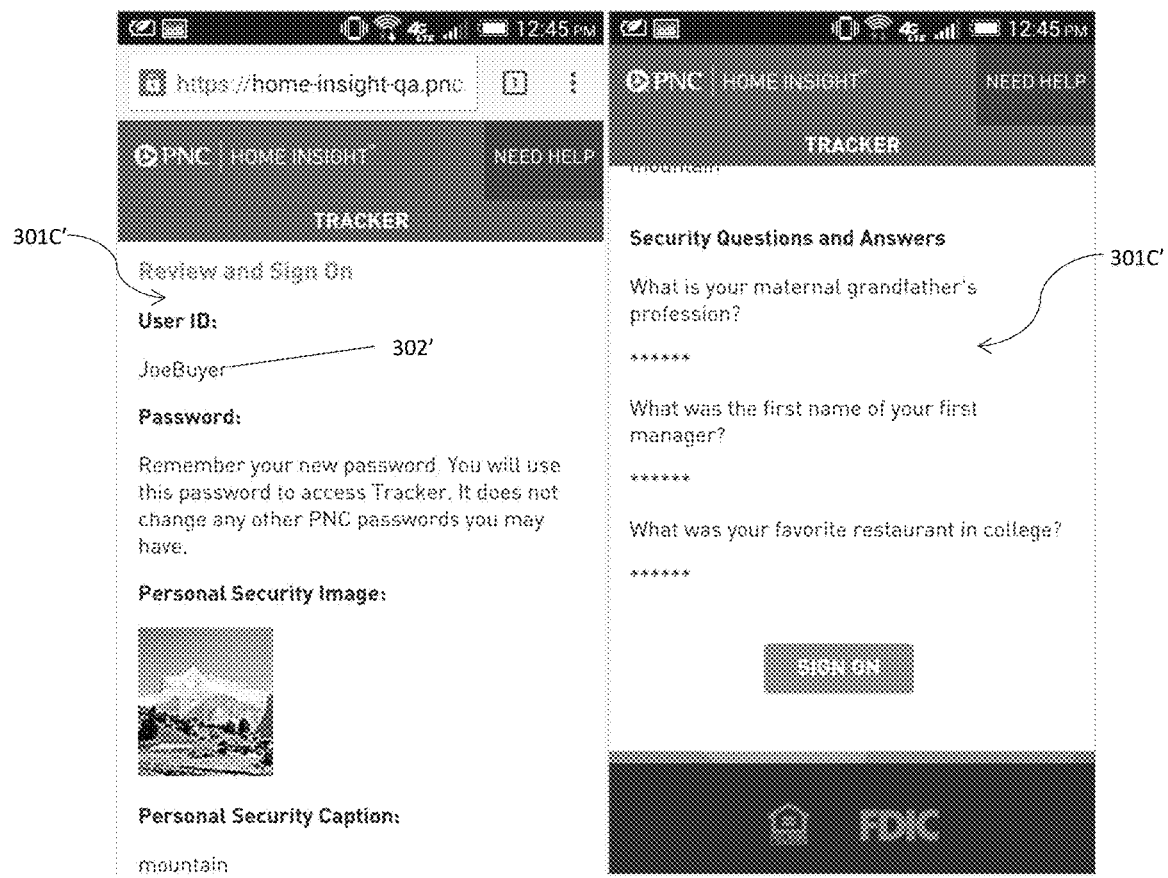
Figure 16D:
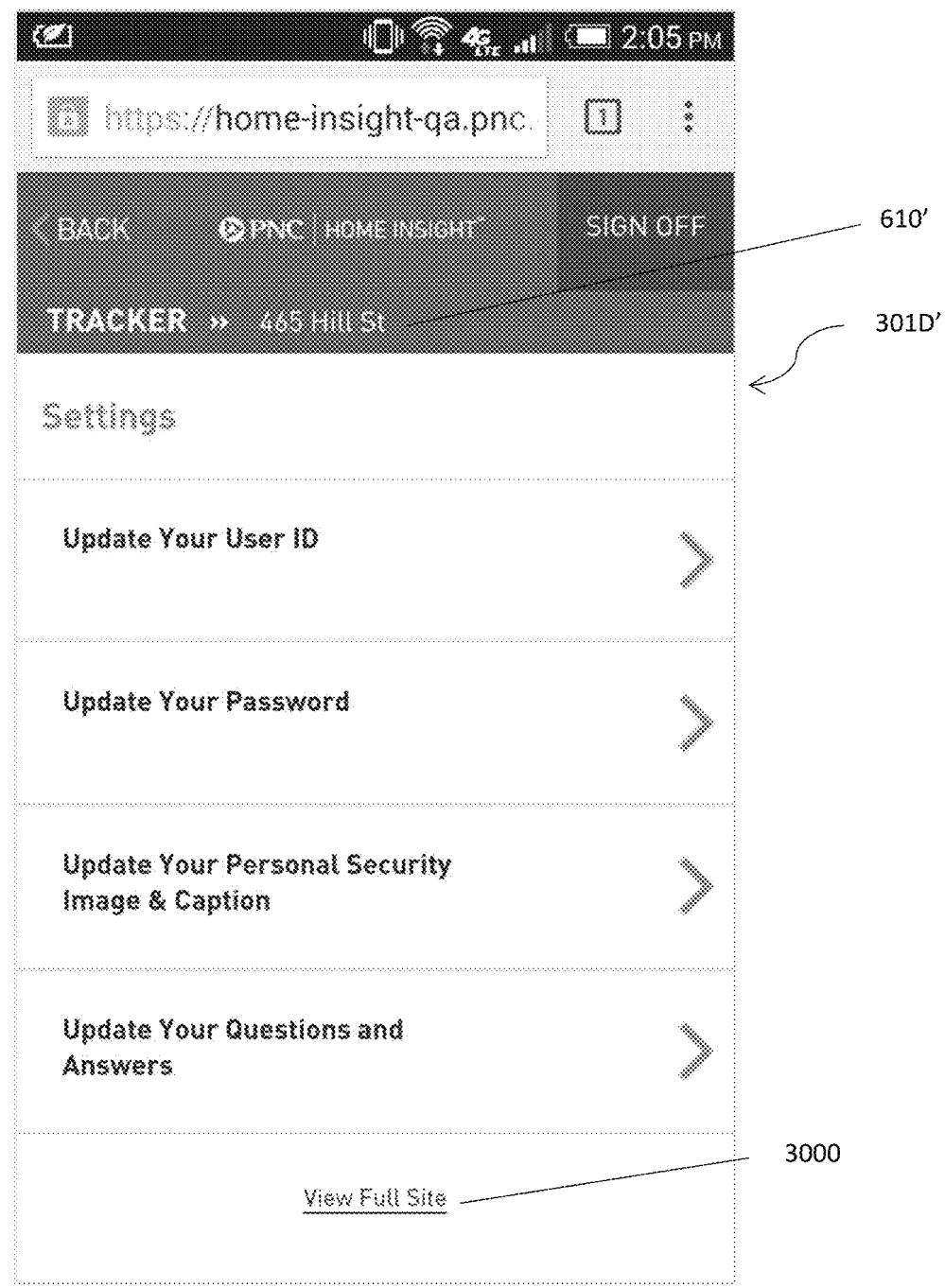

Referring now to FIGS. 16A-D, exemplary embodiments of various login screen displays 301A'-D' configured as mobile versions, are disclosed. A login and/or registration number 302' can be obtained, as shown in FIG. 16C. Note that FIG. 16C shows two screens in juxtaposition; however, this is done for ease of illustration because the contents of the secure login screen display 301' of FIG. 16C are too long to illustrate in one screen shot. As shown in FIG. 16D, a user has access to an account setting screen display 303'.

Figure 17A:
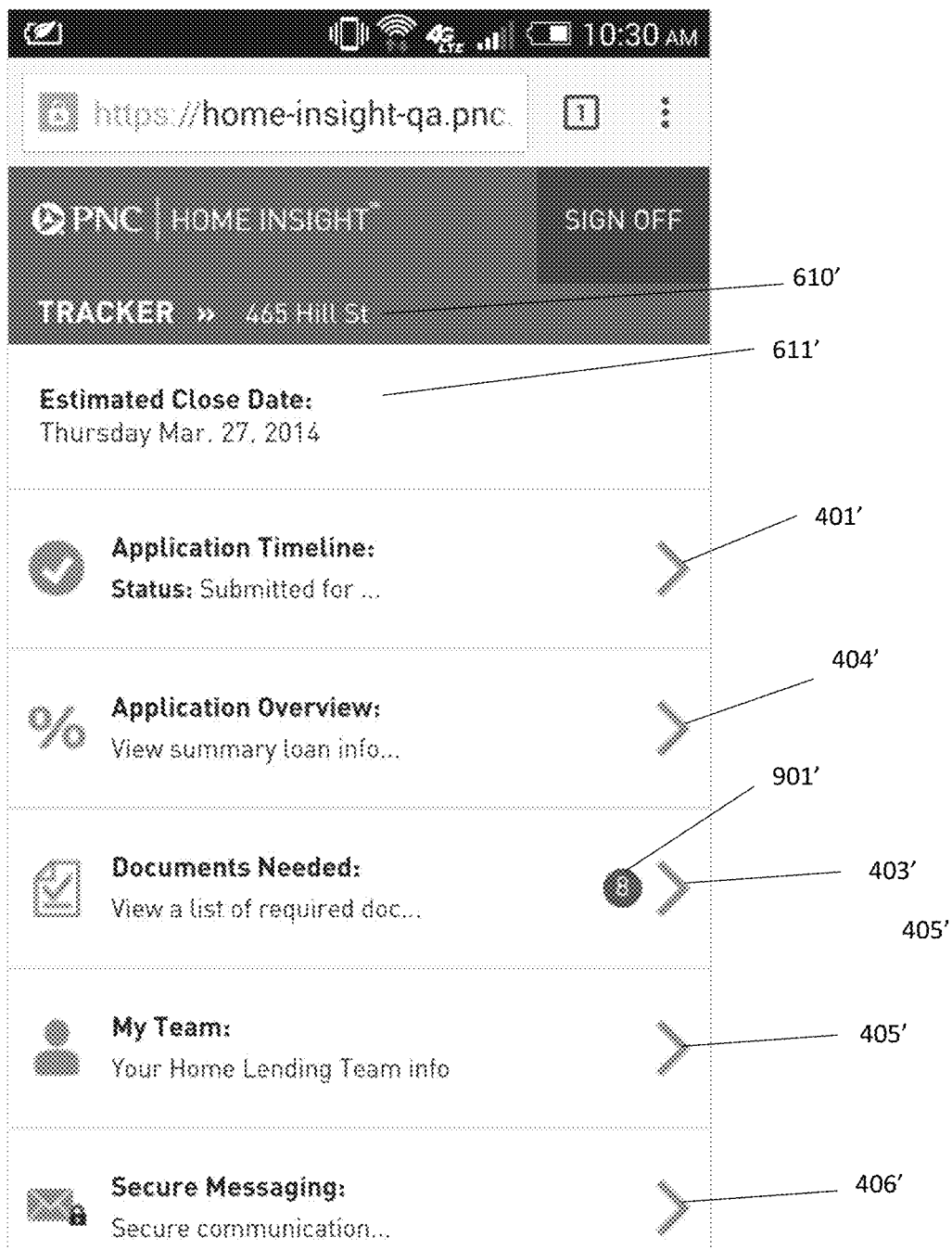
FIGS. 17A-B are exemplary embodiments of a second panel showing mobile versions of a progress indicator, a documents indicator, an application overview indicator, a my team indicator, and a secure message indicator.
Figure 17B:
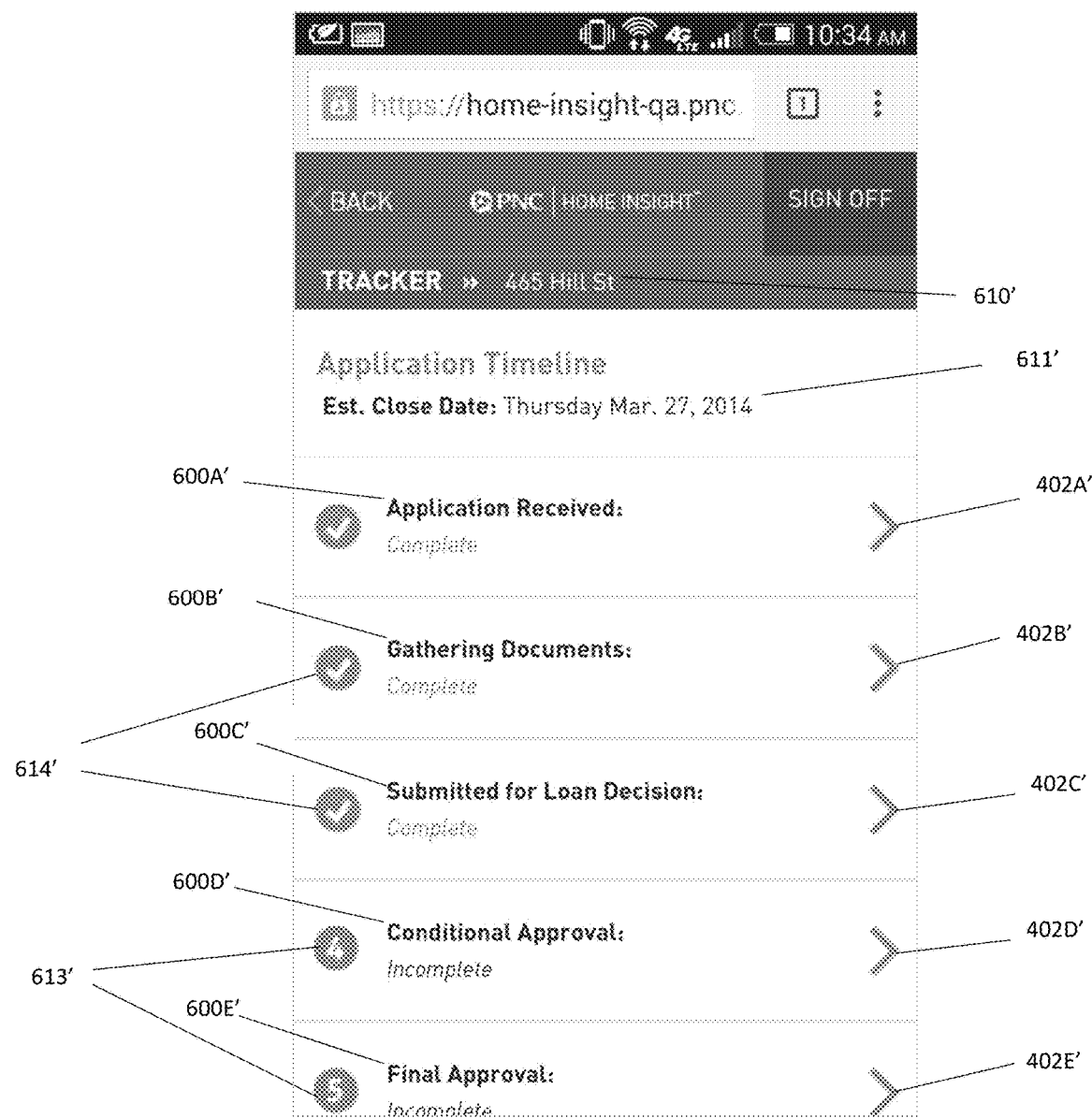
Figure 18A:
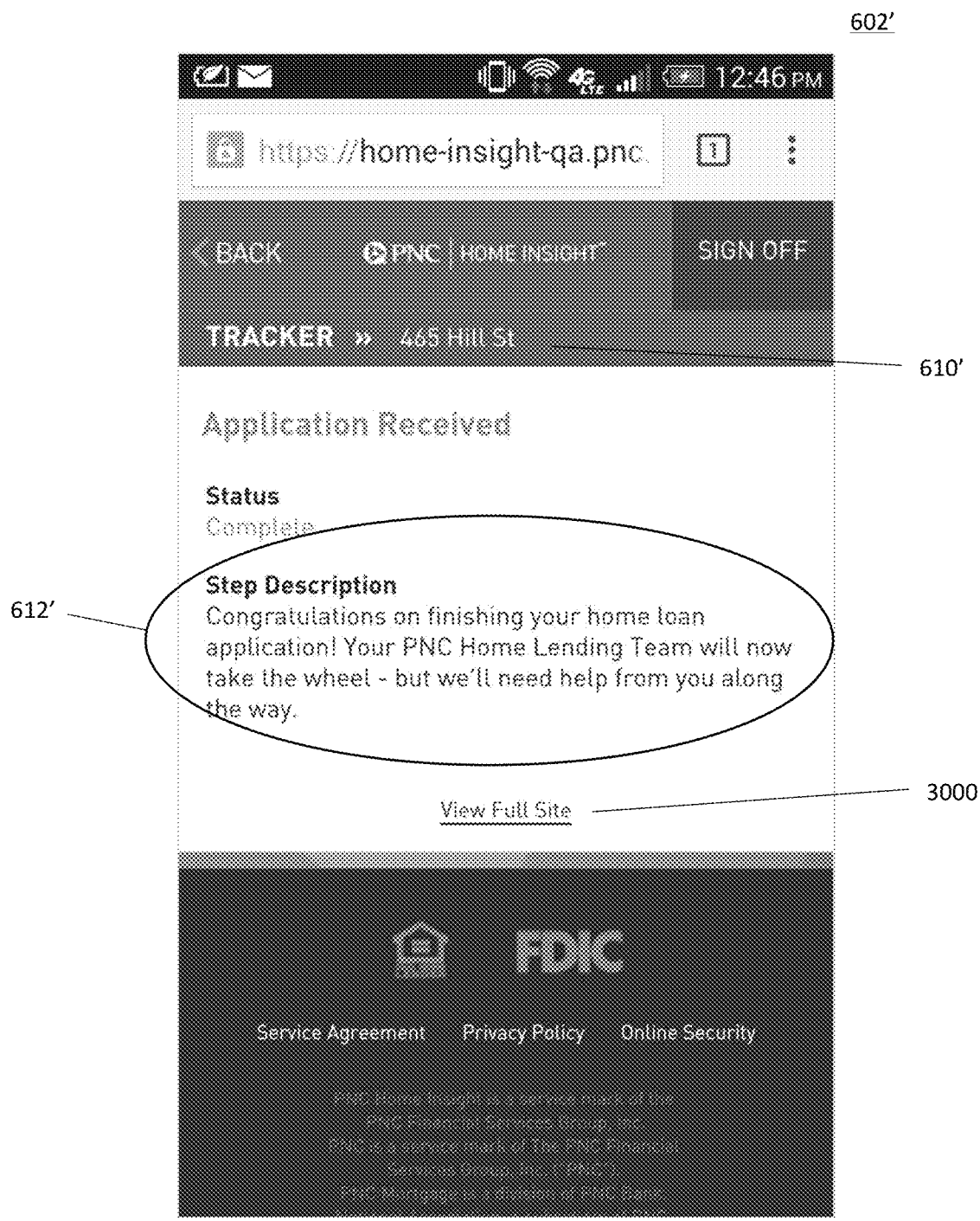
FIGS. 18A-F are exemplary embodiments of various screen displays of process steps configured as mobile versions.
Figure 18B:
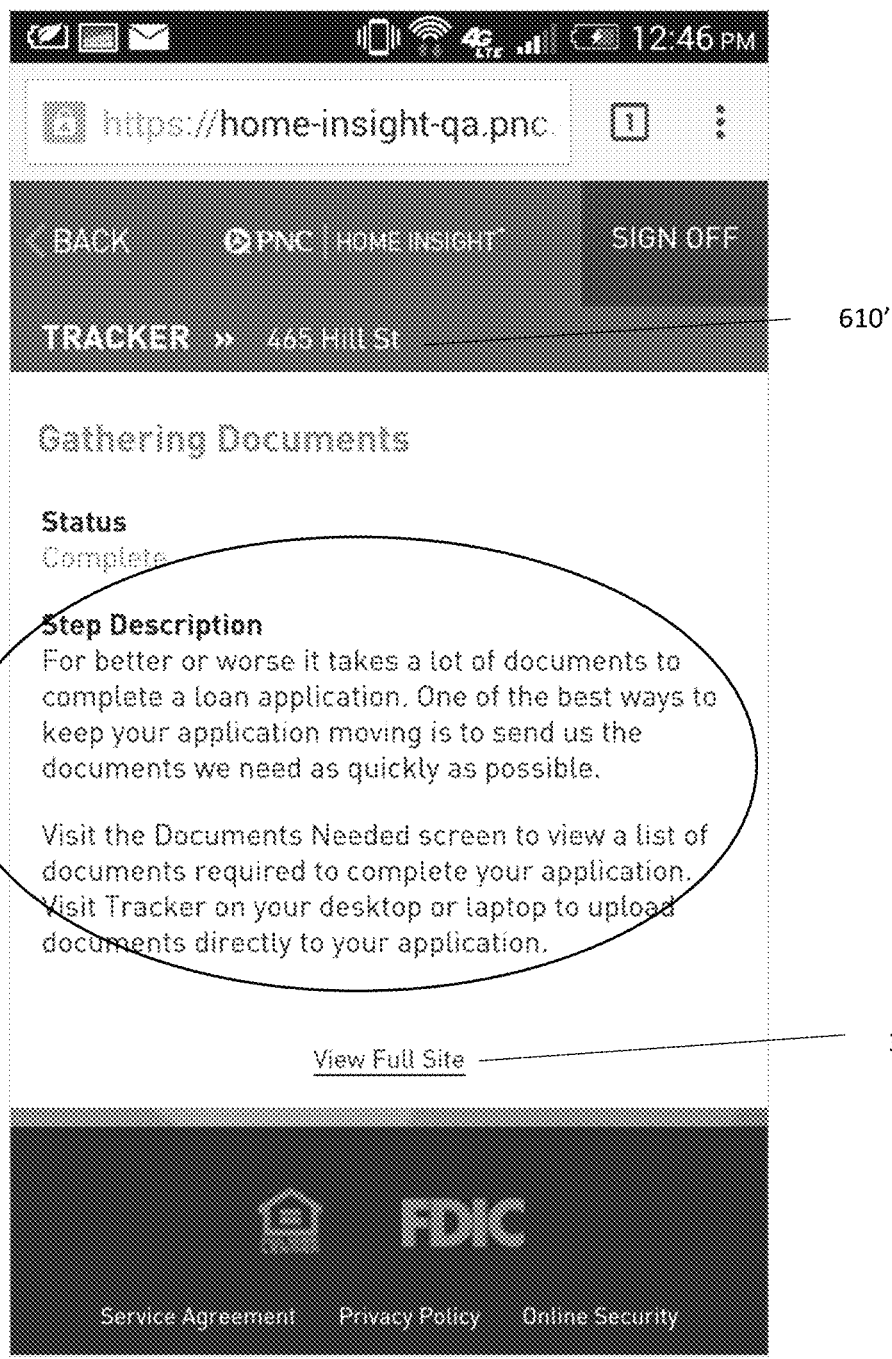
Figure 18C:
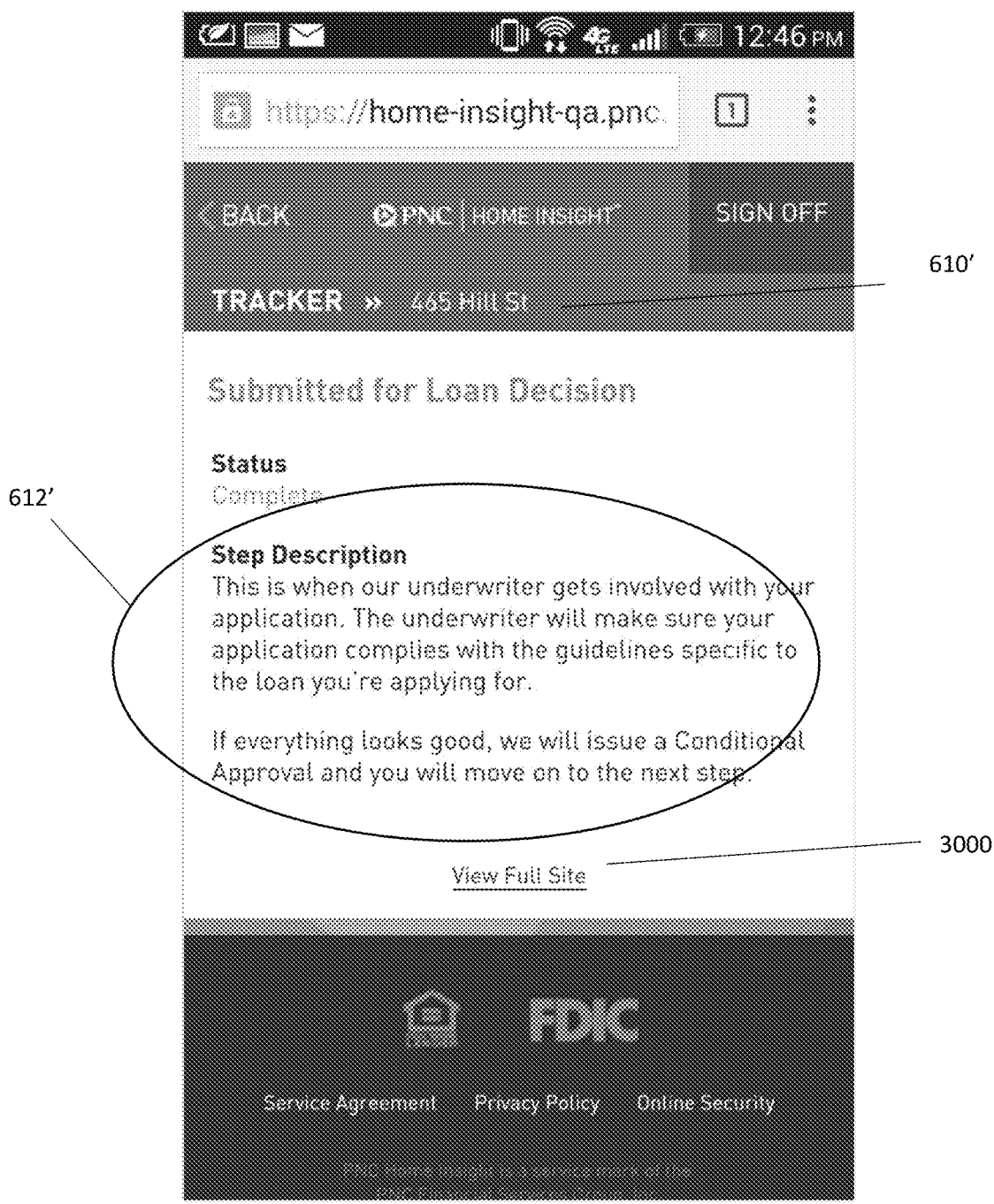
Figure 18D:
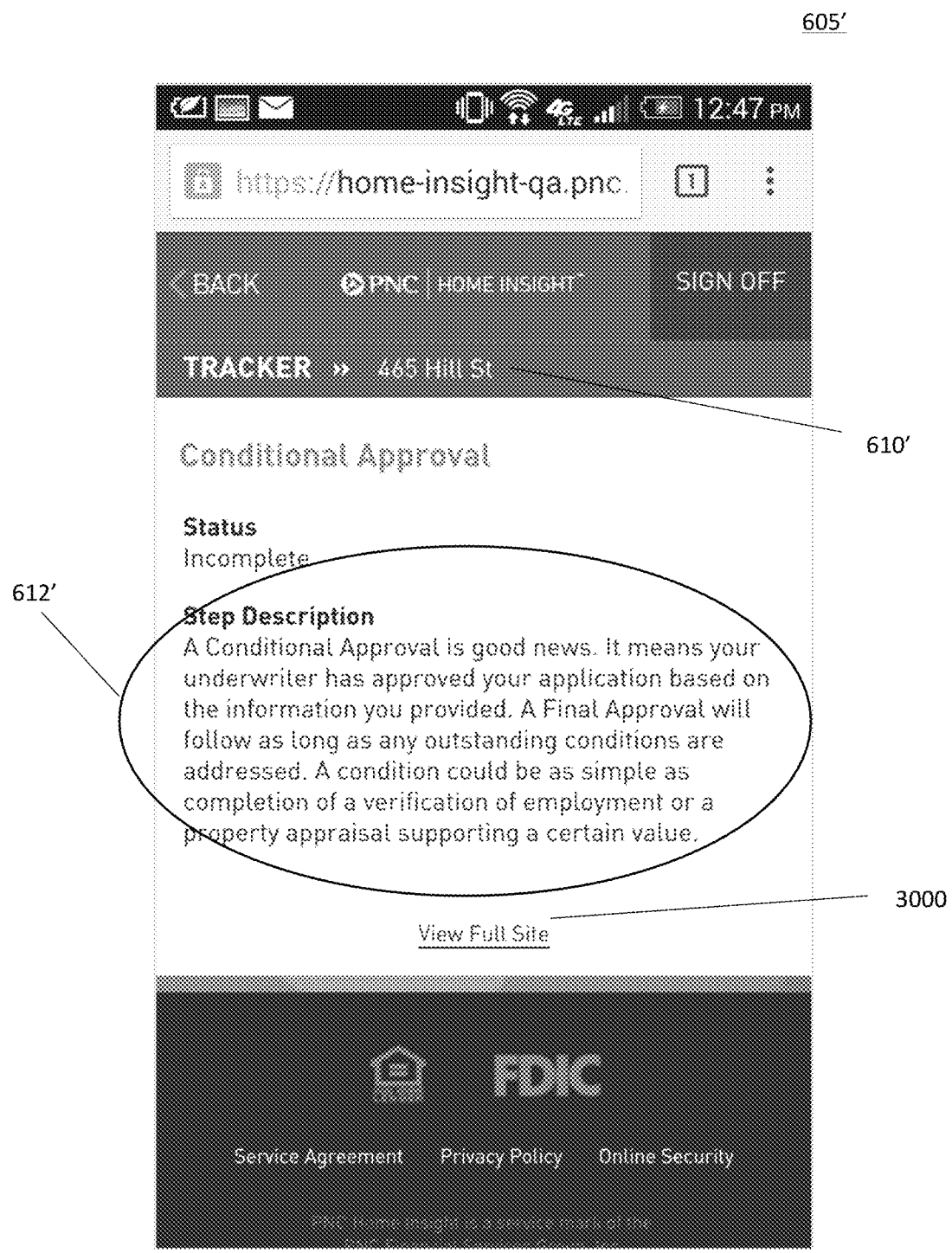
Figure 18E:
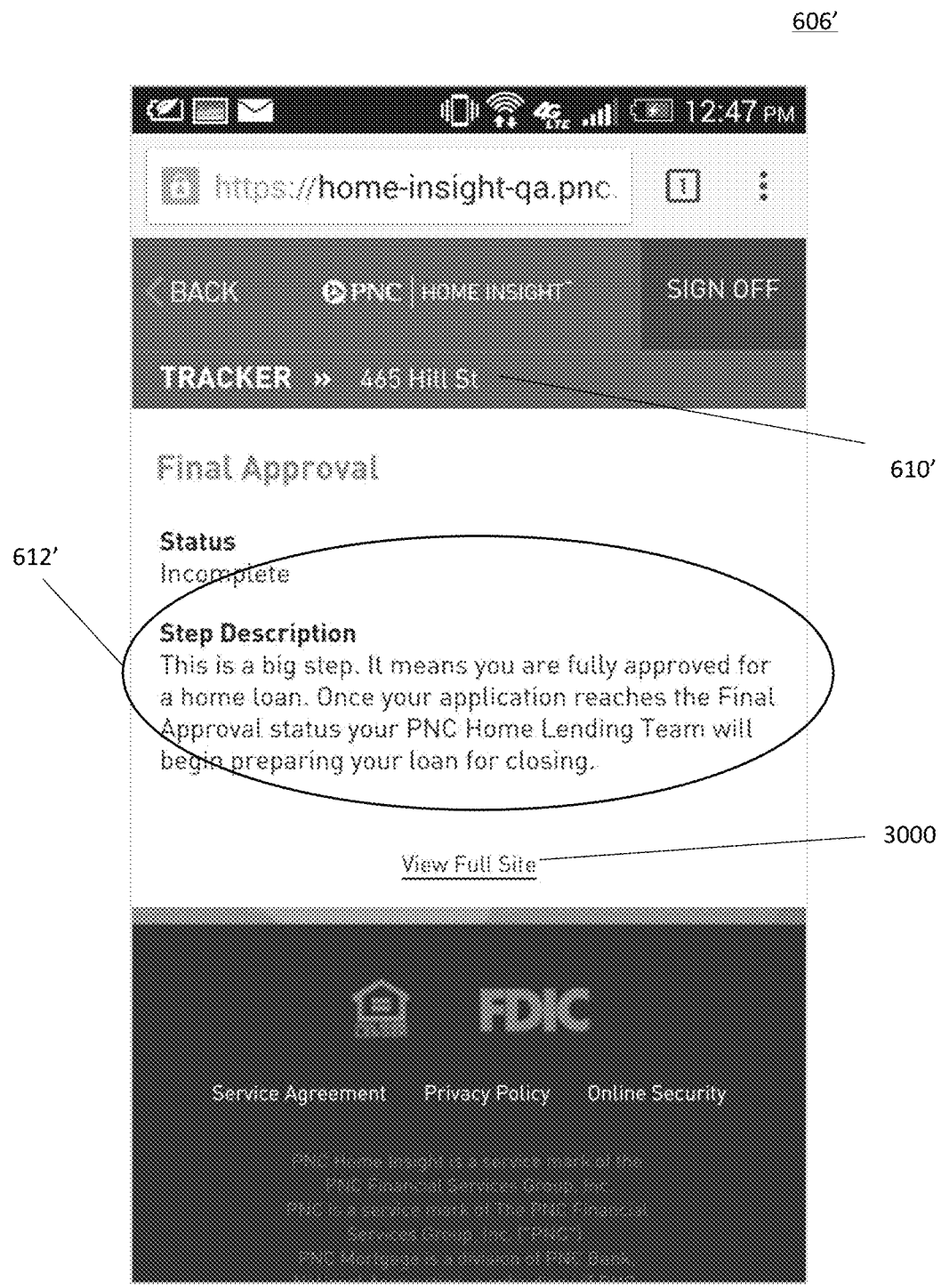
Figure 18F:
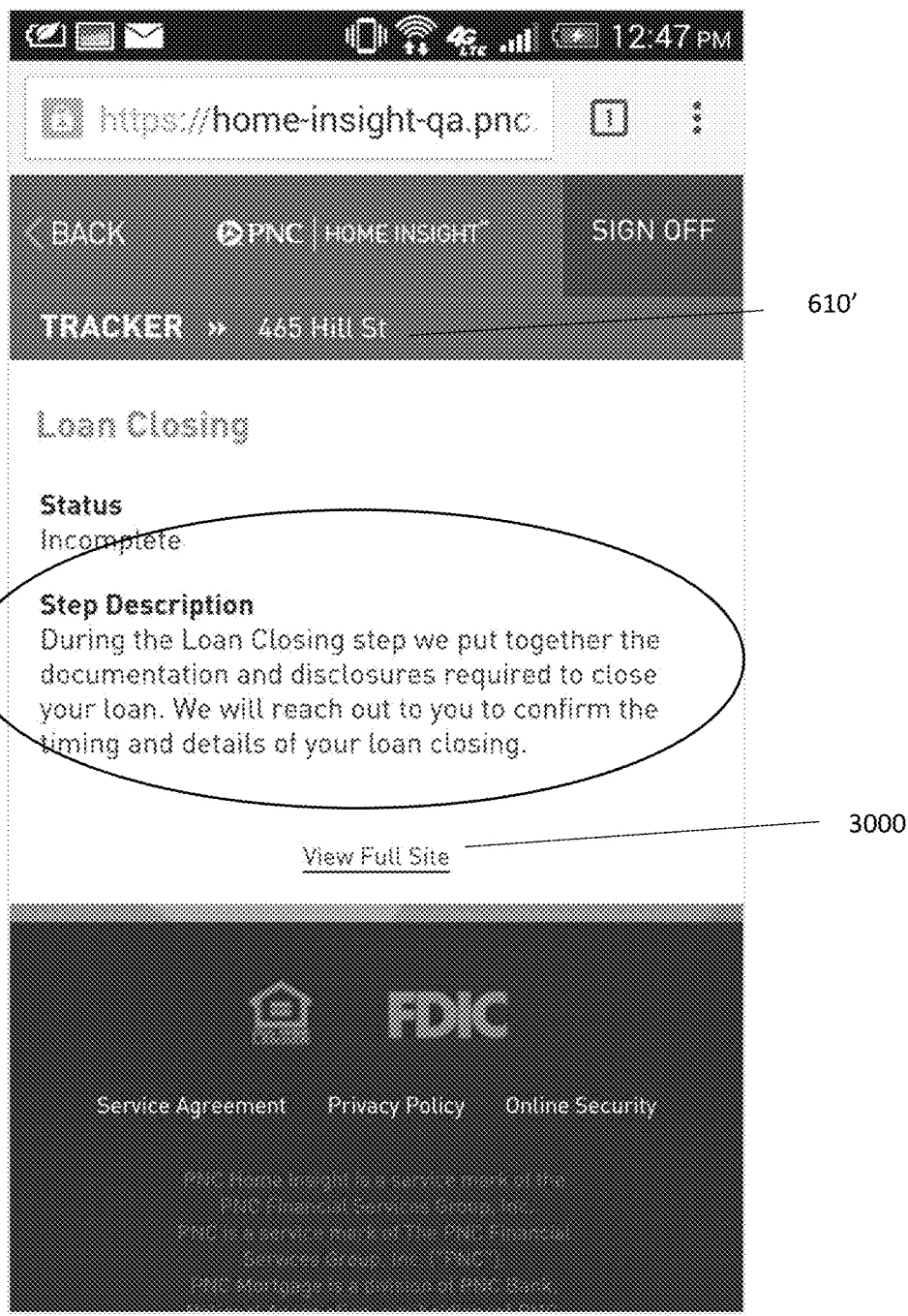

Referring now to FIGS. 17A and 17B, exemplary embodiments of a second panel 400' configured as a mobile version, showing a mobile versions of a progress indicator 401', a documents indicator 403', an application overview indicator 404', a my team indicator 405', and a secure message indicator 406', are disclosed. A documents number indicator

901' may be displayed as described earlier. In this embodiment, the progress indicator 401' is titled "Application Timeline", as shown in FIG. 17A. Activating the Application Timeline displays the process step indicators 402A'-F' and associated process steps 600A'-F', as shown in FIG. 17B. Numerical displays 613' and check marks 614' may be displayed, as described earlier.

Referring now to FIGS. 18A-F, exemplary embodiments of the various screen displays 602'-607' of process steps 600A'-F' configured as mobile versions, are disclosed. The screen displays 602'-607' corresponding to process steps 600A'-F' are presented in these Figures. For example, accessing an application received process step 600A' generates the application received screen display 602' shown in FIG. 18A. Each screen display 602'-607' is provided with a status panels 612', as described earlier.

Figure 19A:
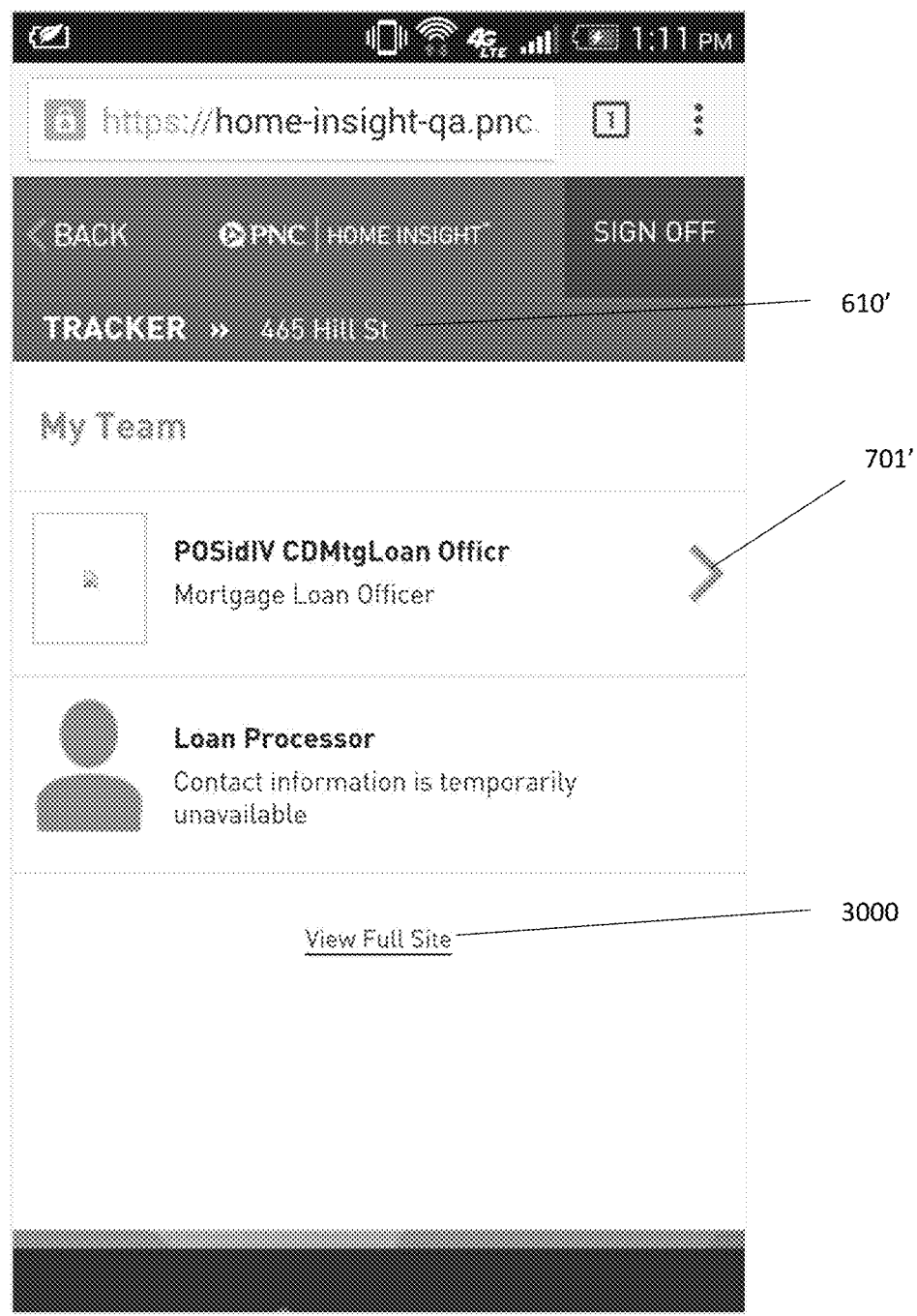
FIGS. 19A-C are exemplary embodiments of a my team panel display configured as a mobile version showing exemplary mobile versions of the team member screen displays.
Figure 19B:
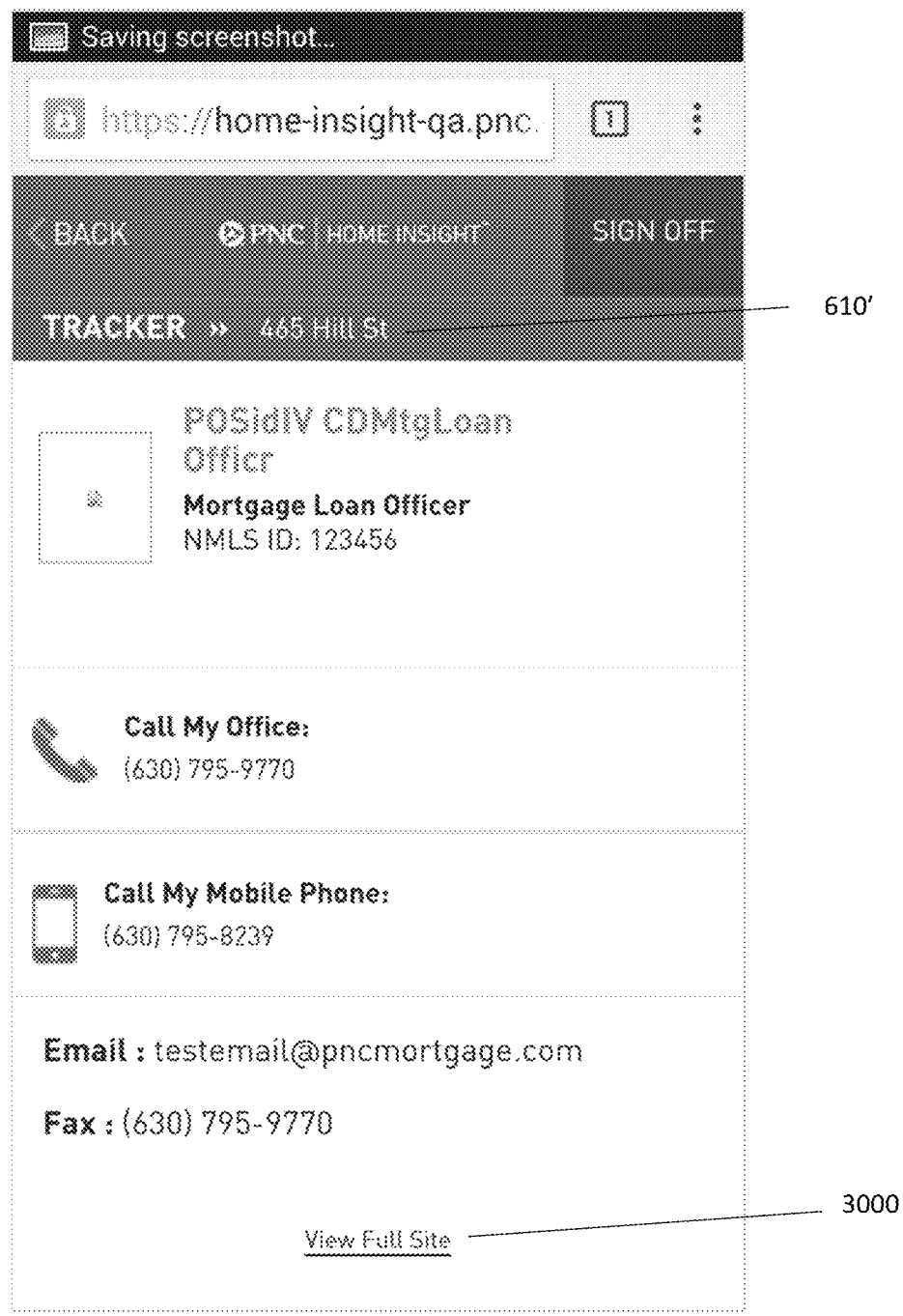
Figure 19C:
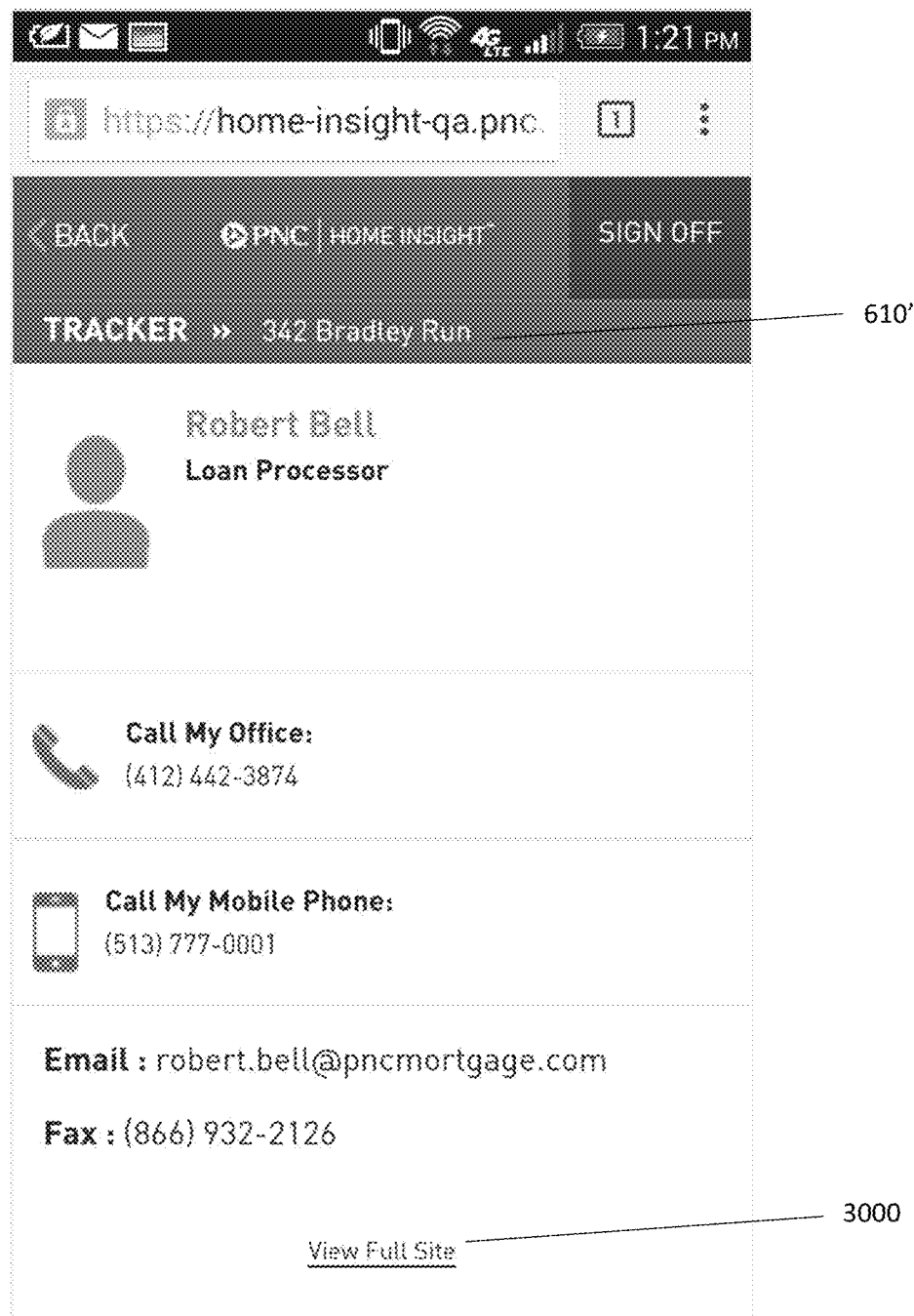

Referring now to FIGS. 19A-C, exemplary embodiments of a my team panel display 615' configured as a mobile version, are disclosed. A user may activate a team member indicator 701' of FIG. 19A, which displays the team member screen display 700' shown in FIGS. 19B and 19C. FIG. 19B illustrates a team member screen display 700' for a loan officer 202. FIG. 19C illustrates a team member screen display 700' for a loan processor 205.

Figure 20A:
Figure 20B:
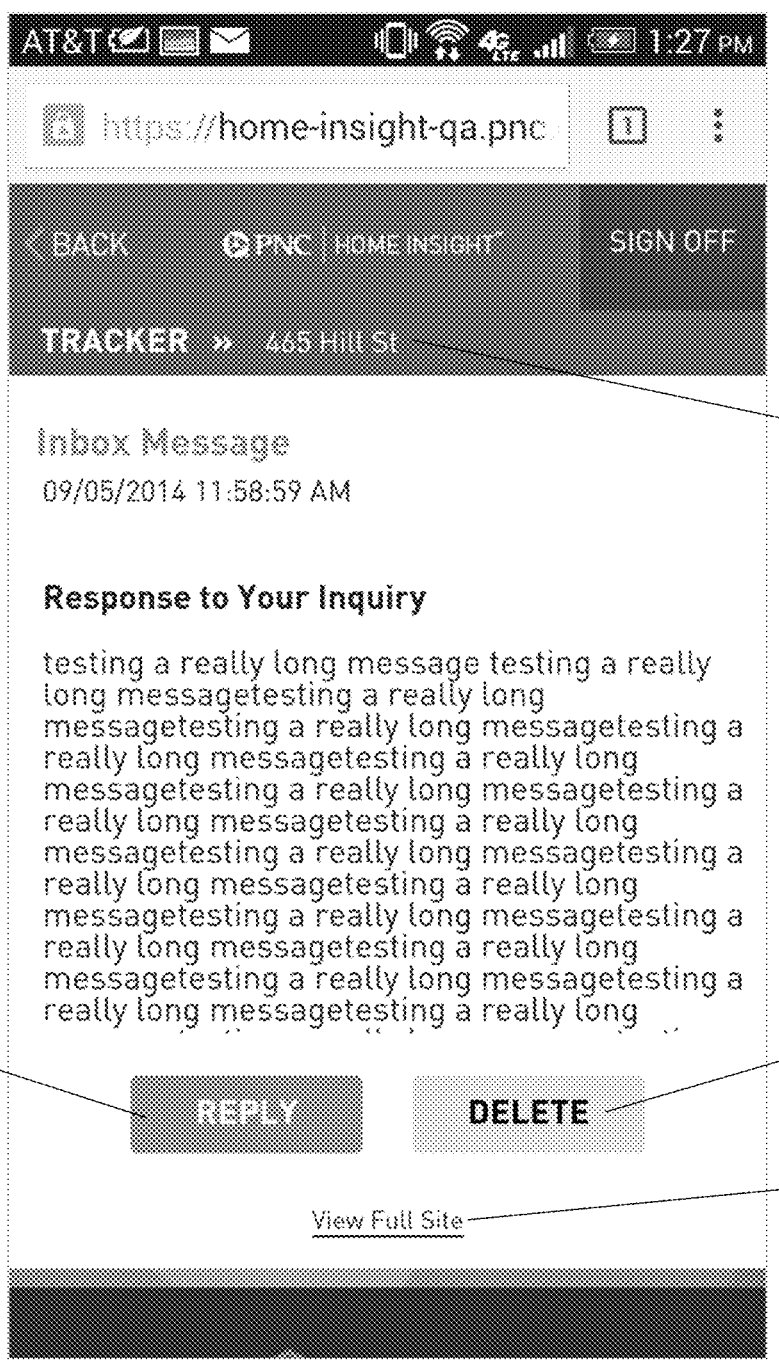
Figure 20C:
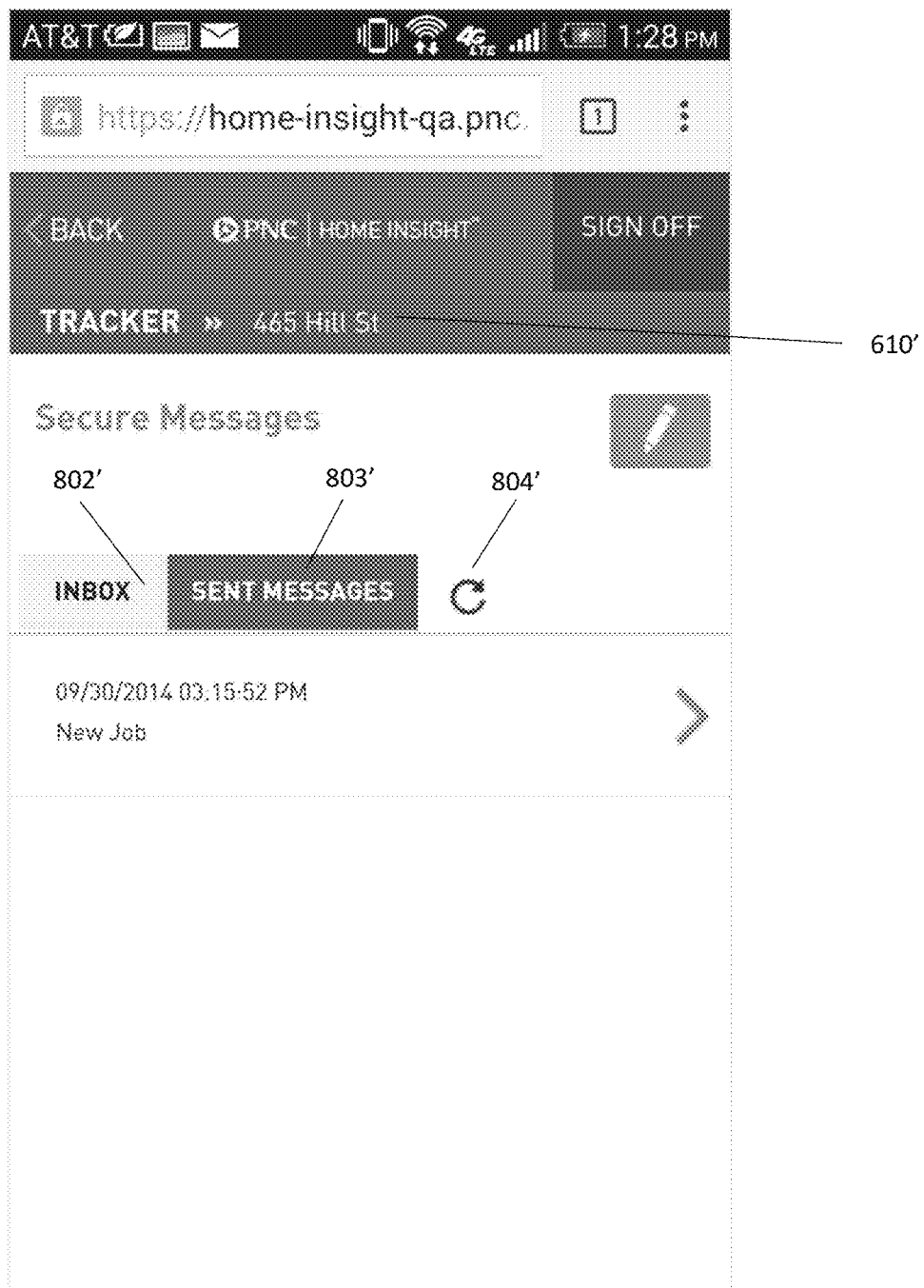
Figure 20D:
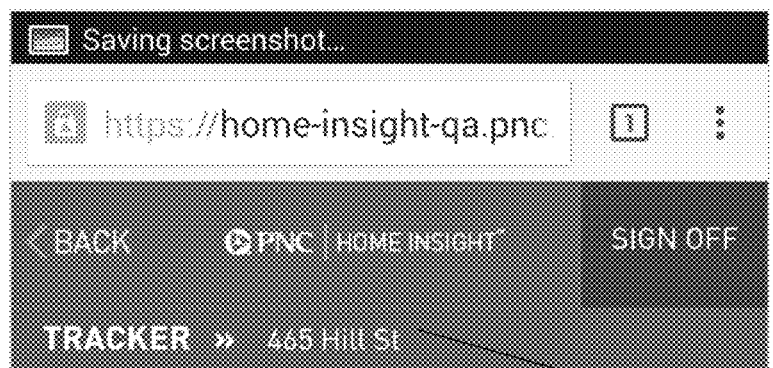
Figure 20F:
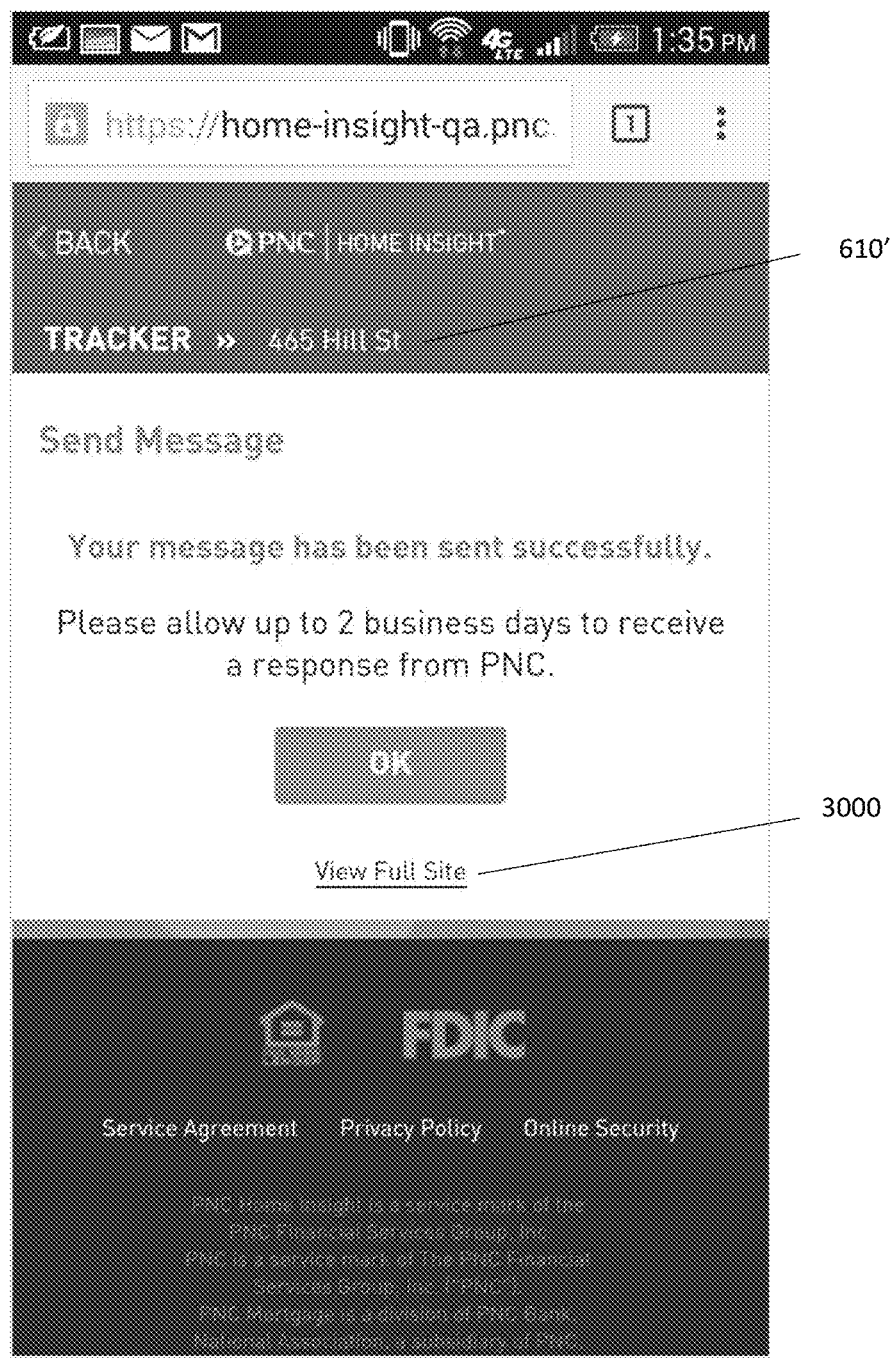

Referring now to FIGS. 20A-F, exemplary embodiments of a secure message panel display 800' configured as a mobile version, are disclosed. A user may have access to an "inbox message" bank 802' shown in FIG. 20A, which may include a refresher indicator 804'. The mobile version may be provided with a message detail screen display 810' with a reply indicator 811' and a delete indicator 812', as shown in FIG. 20B. A user may have access to a "sent message" bank 803' with a refresher indicator 811' and a delete indicator 812', as shown in FIGS. 20C and 20D. The mobile version may be provided with a compose message screen display 806', as shown in FIG. 20E. A confirmation sent screen display 809' may be displayed to confirm that a message has been sent, as shown in FIG. 20F.

Figure 21A:
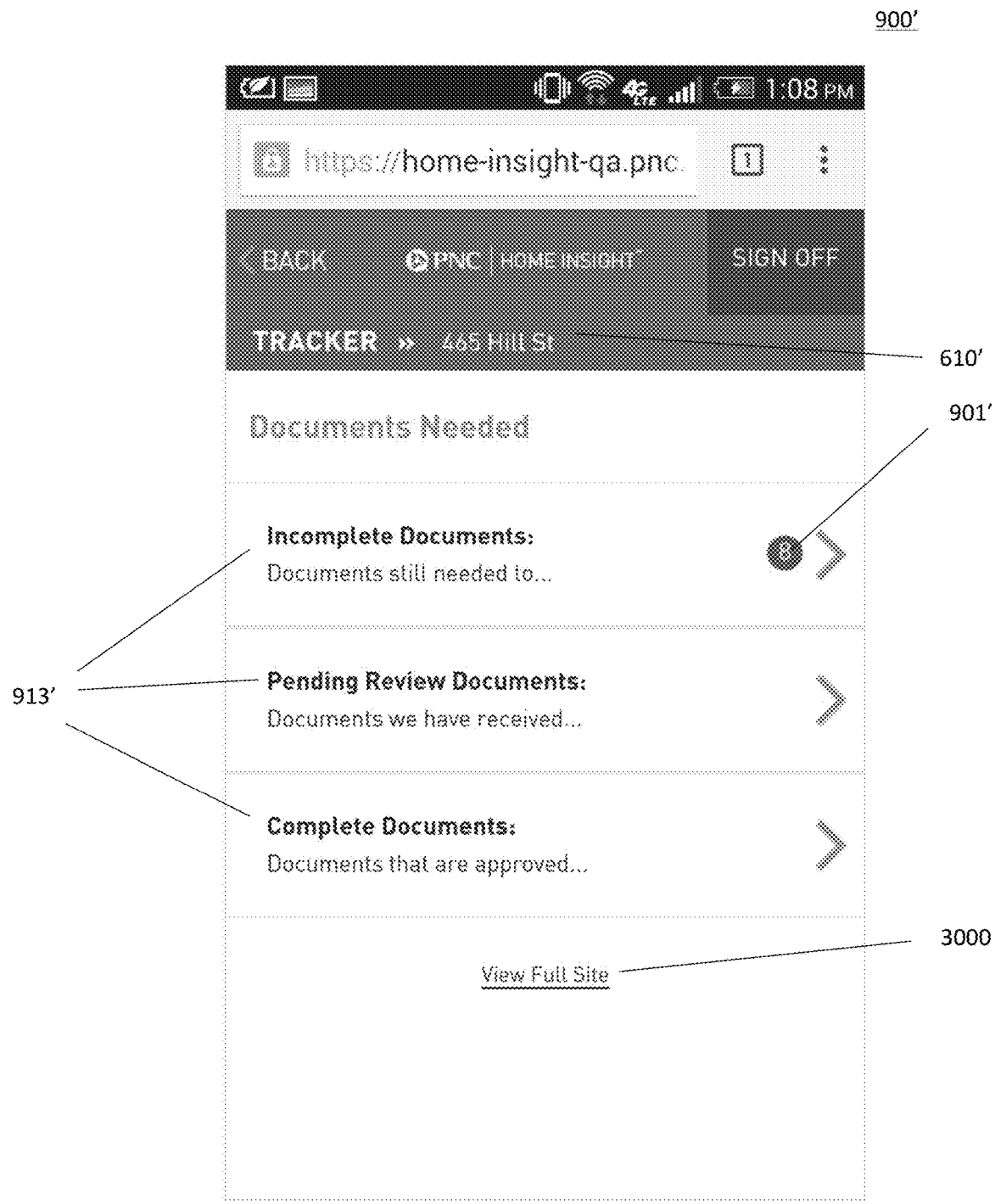
FIGS. 21A-D are exemplary embodiments of a documents panel display configured as a mobile version showing exemplary mobile versions of various documents status screen displays.
Figure 21B:
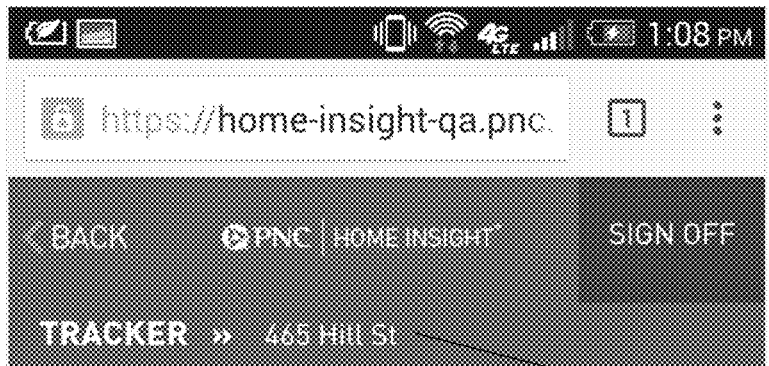
Figure 21C:
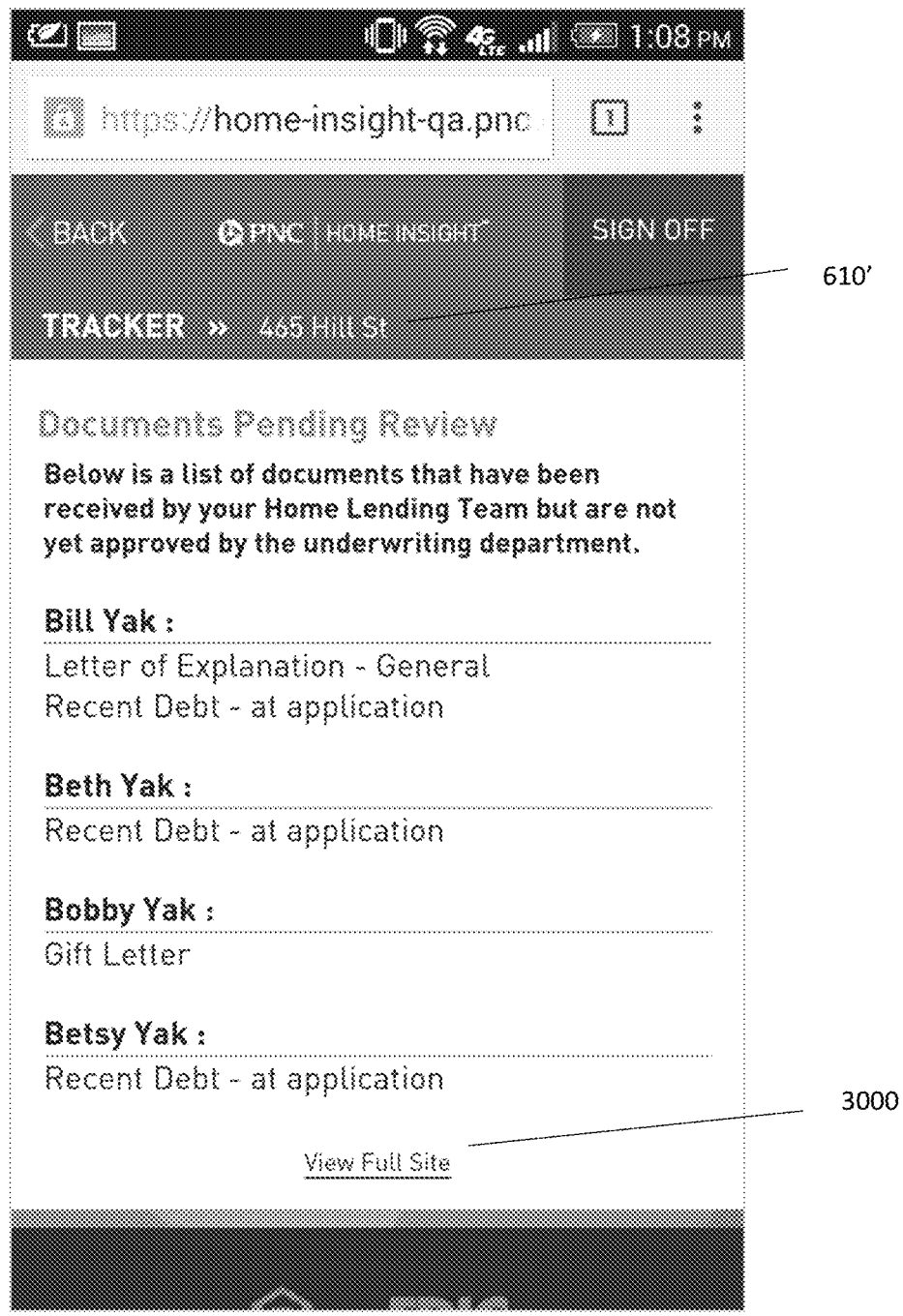
Figure 21D:
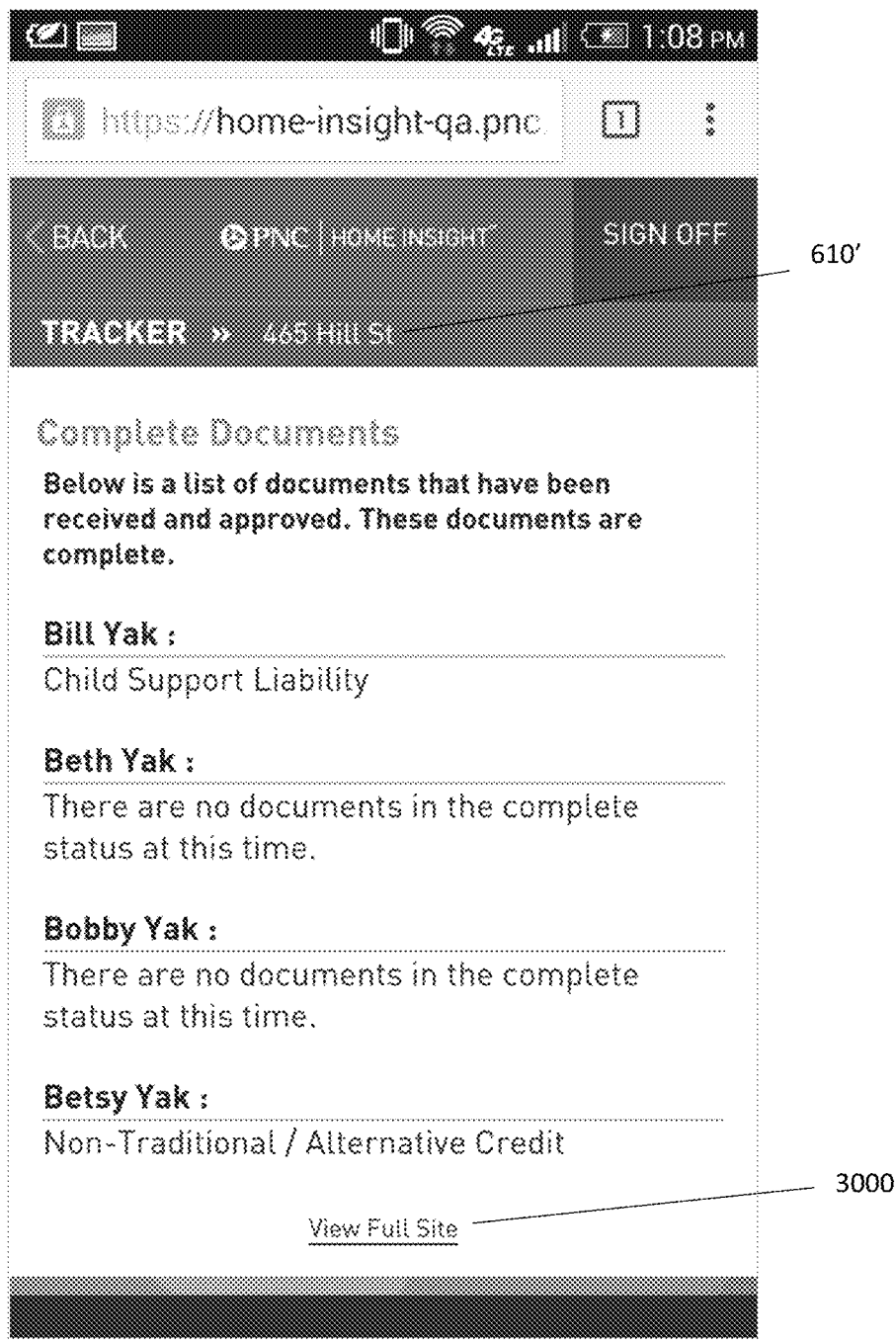

Referring now to FIGS. 21A-D, exemplary embodiments of a documents panel display 900' configured as a mobile version, are disclosed. FIG. 21A illustrates document statuses 913' with a documents number indicator 901' displayed in association with each document status 913'. Activating a documents status 913' (e.g., incomplete documents) displays a documents status screen display 912' showing buyers 201 with associated document text representing documents that should be submitted by those buyers 201, as shown in FIG. 21B. FIGS. 21C and 21D illustrate a documents status screen display 912' of pending documents and complete documents, respectively.

Figure 22:
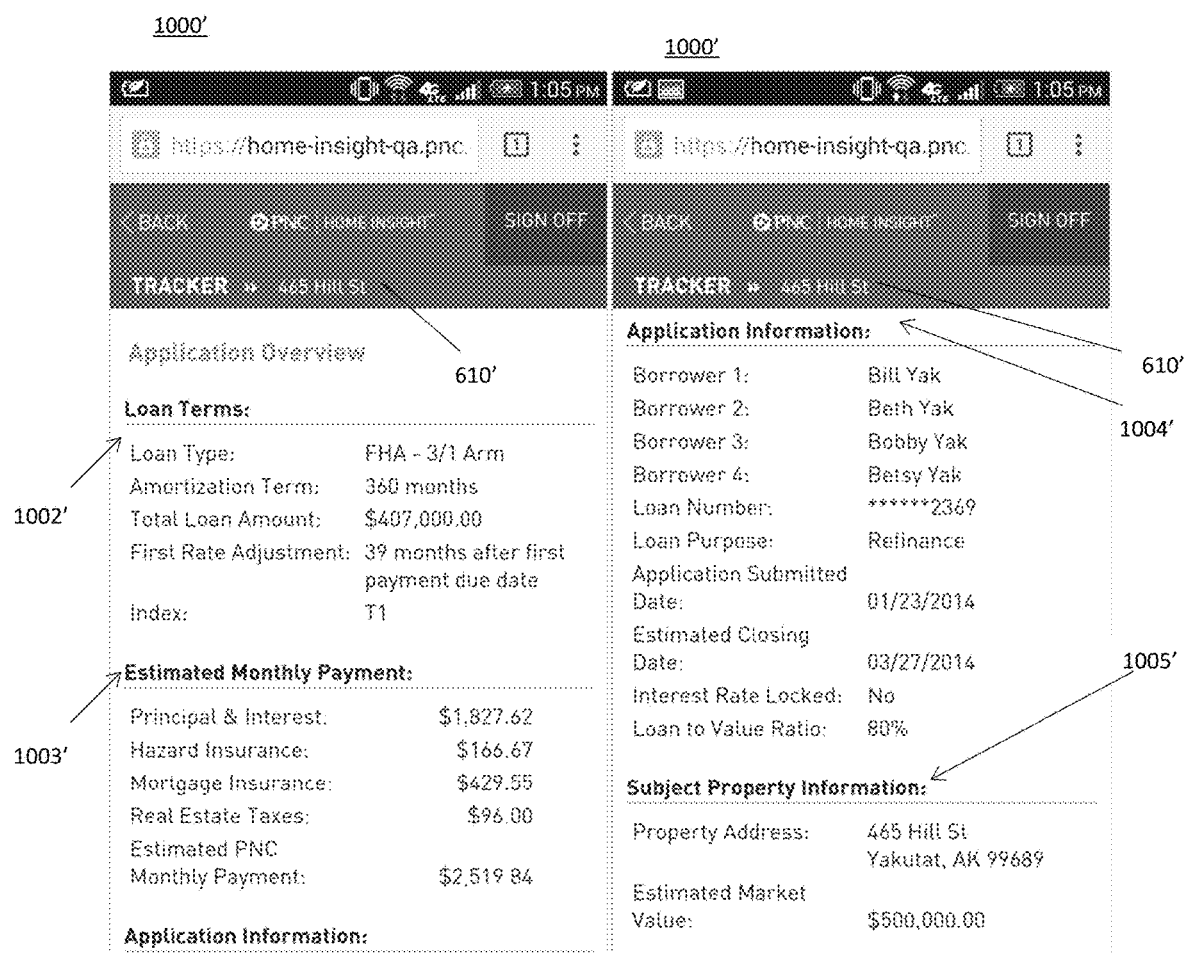
FIG. 22 is an exemplary embodiment of an application overview panel display configured as a mobile version.
Figure 23A:
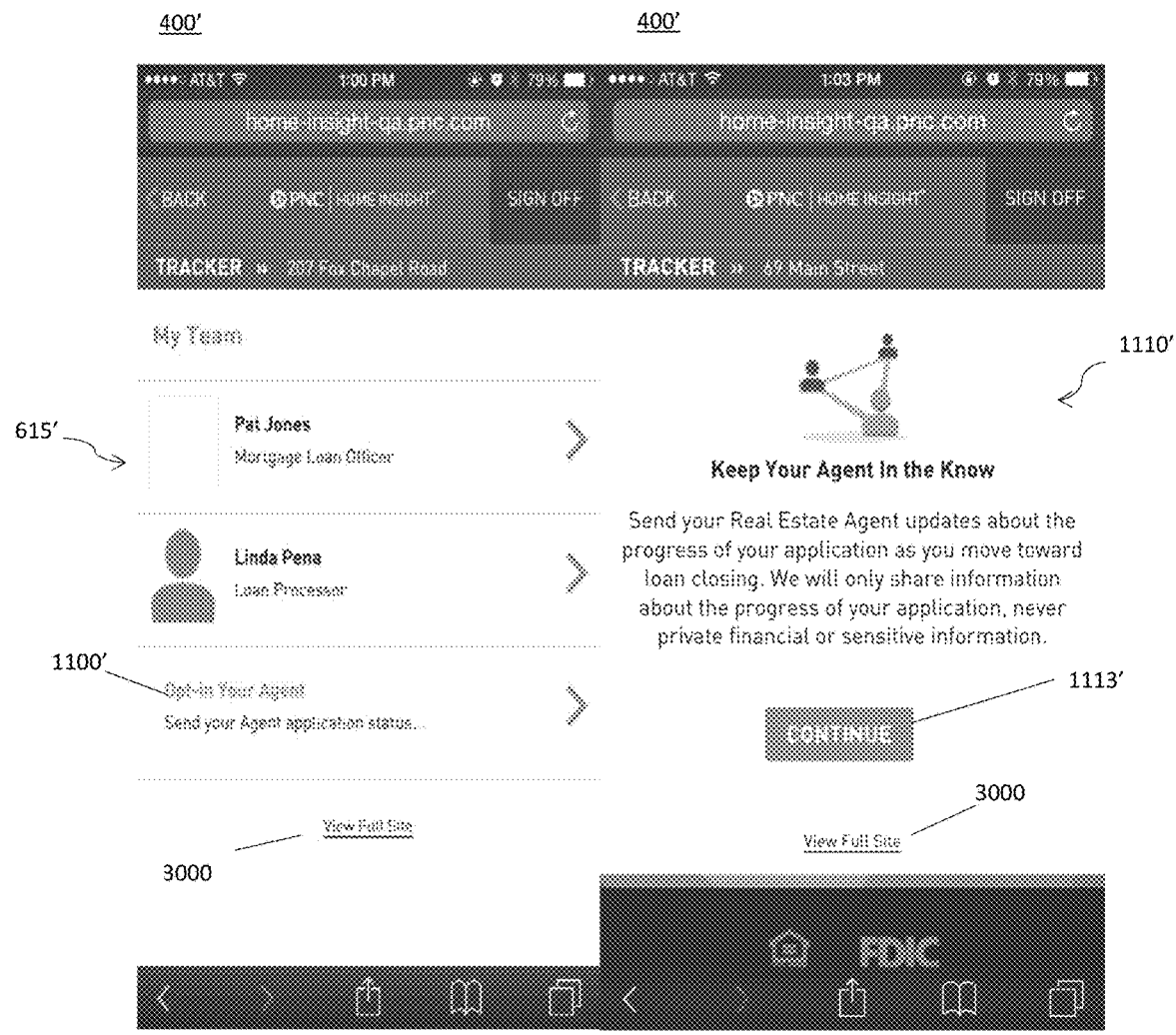
FIGS. 23A-G are exemplary mobile version embodiments of the opt in feature accessed via the opt in indicator.
Figure 23B:
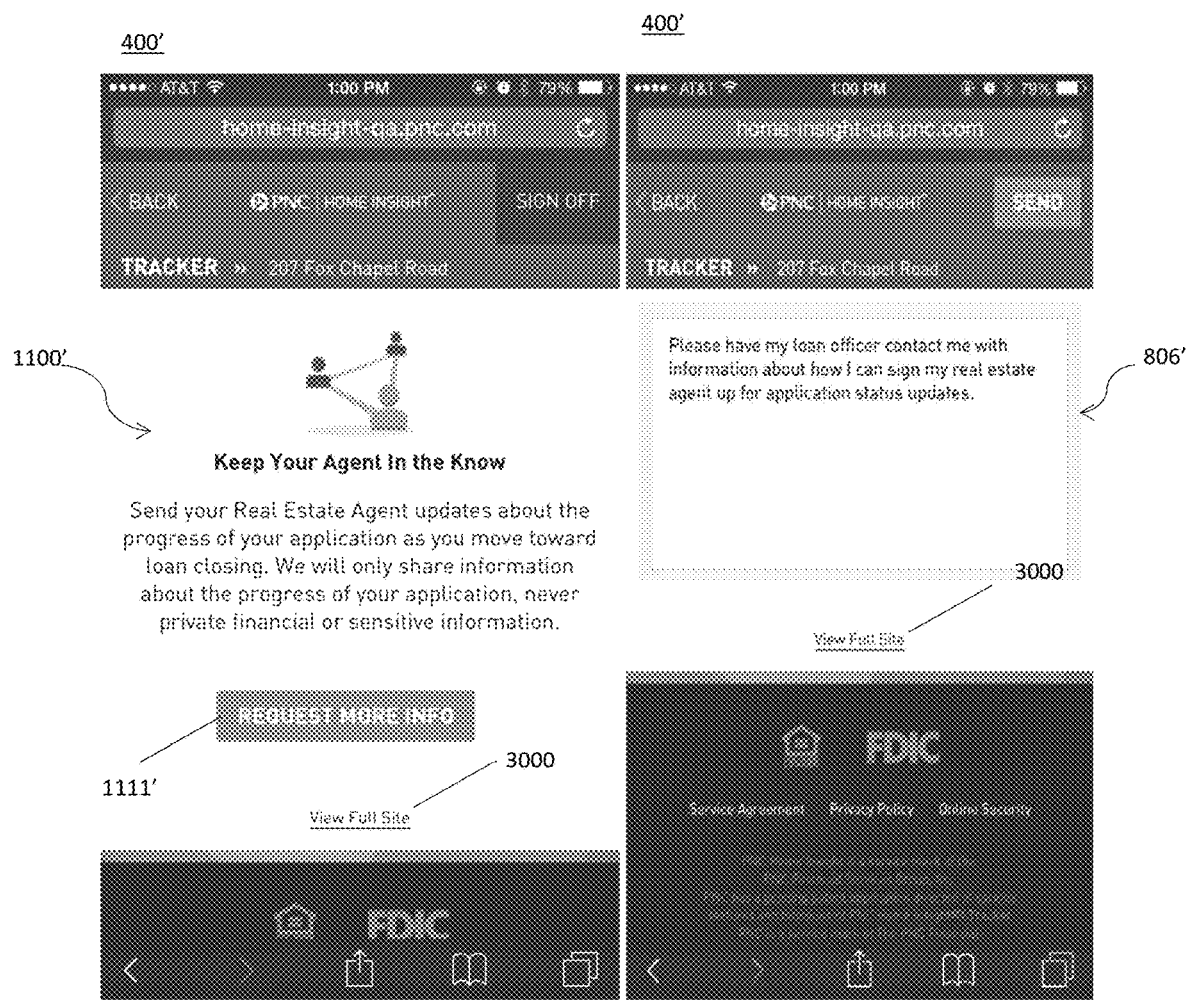
Figure 23C:
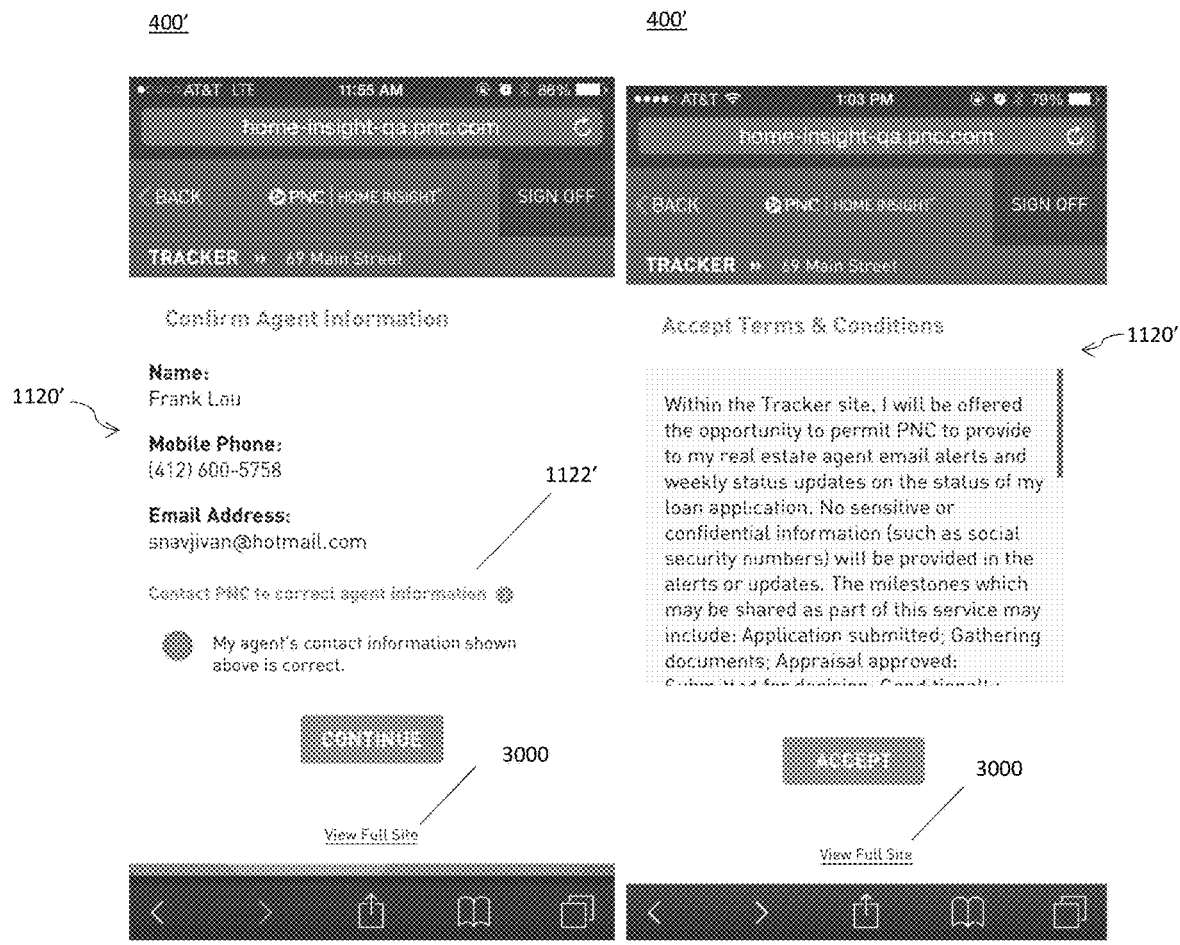
Figure 23D:
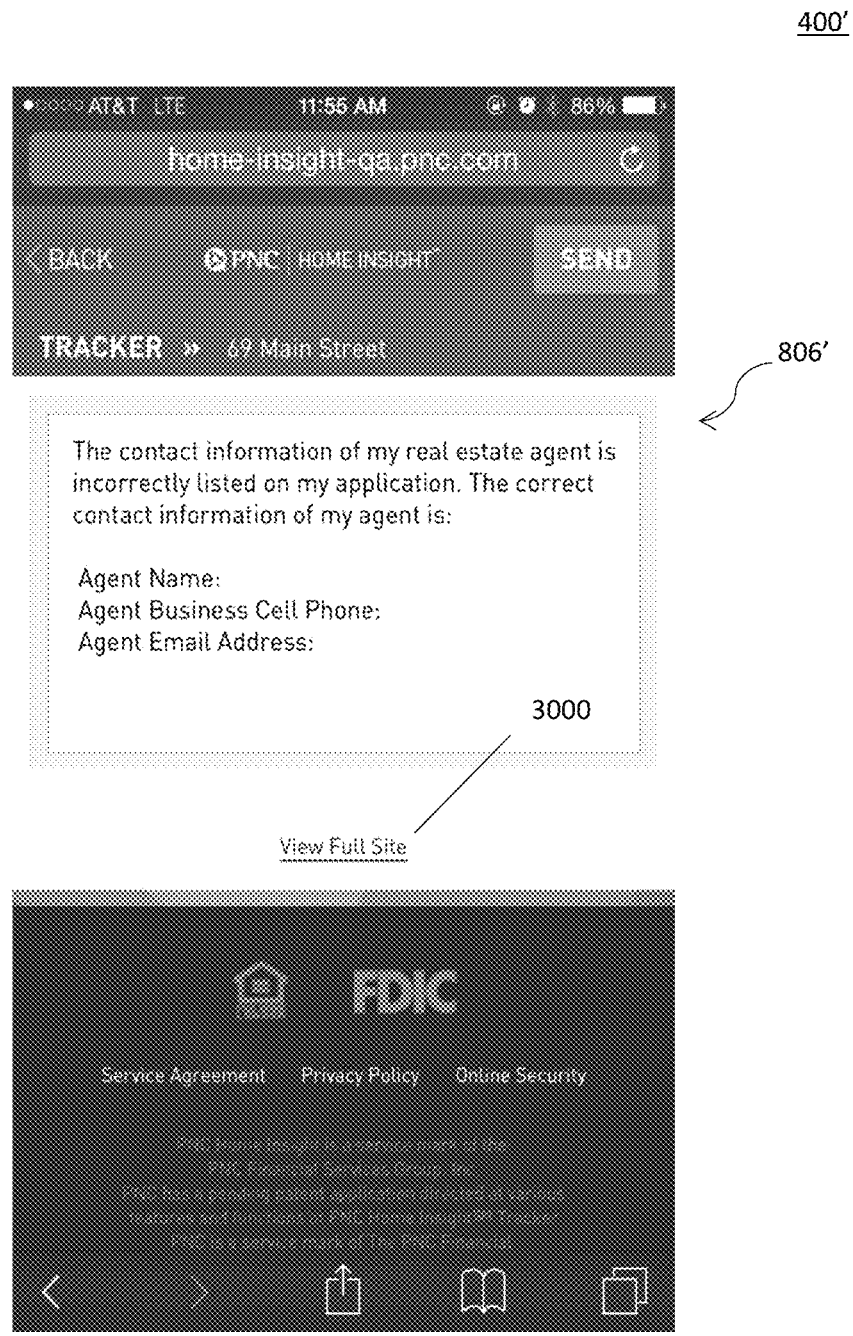
Figure 23E:
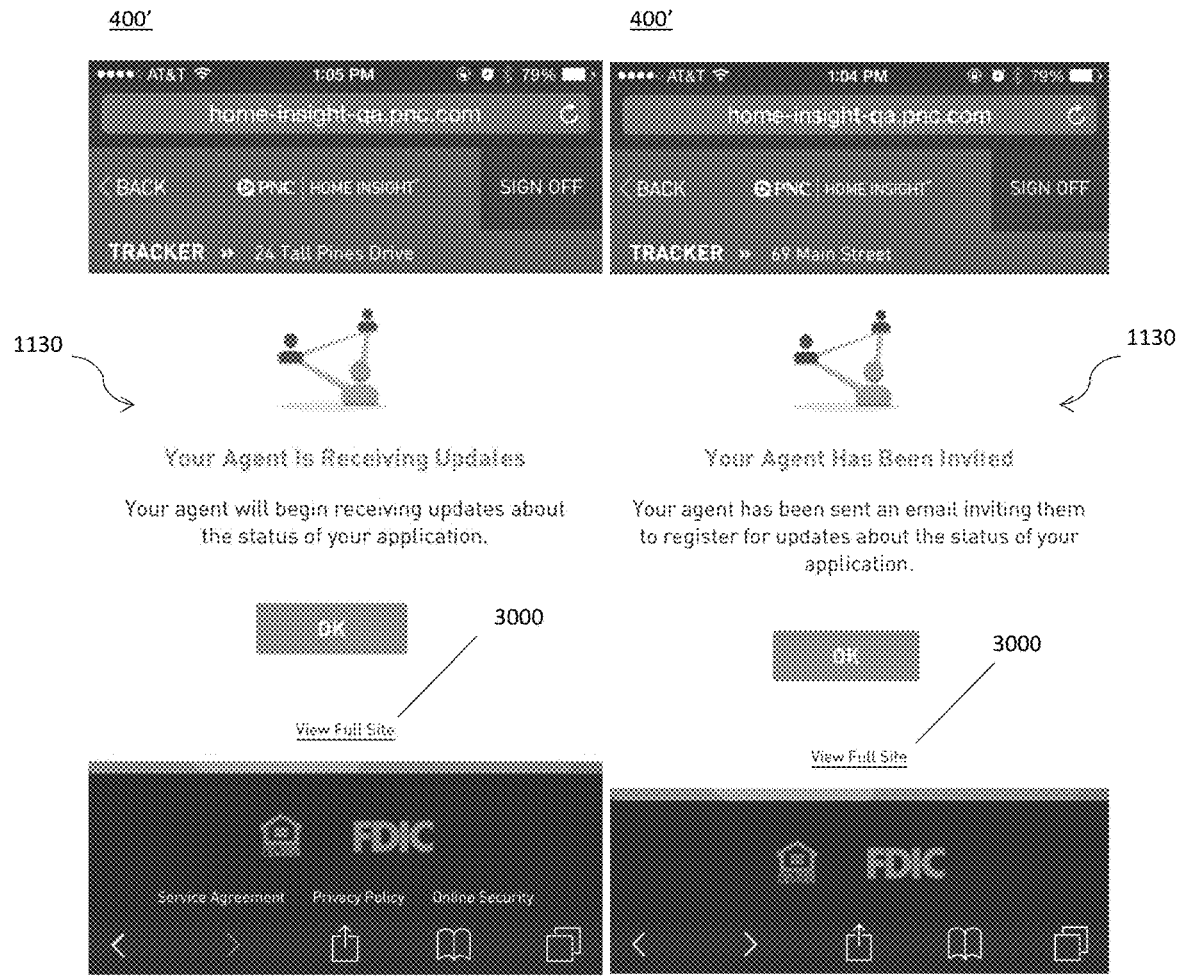
Figure 23F:
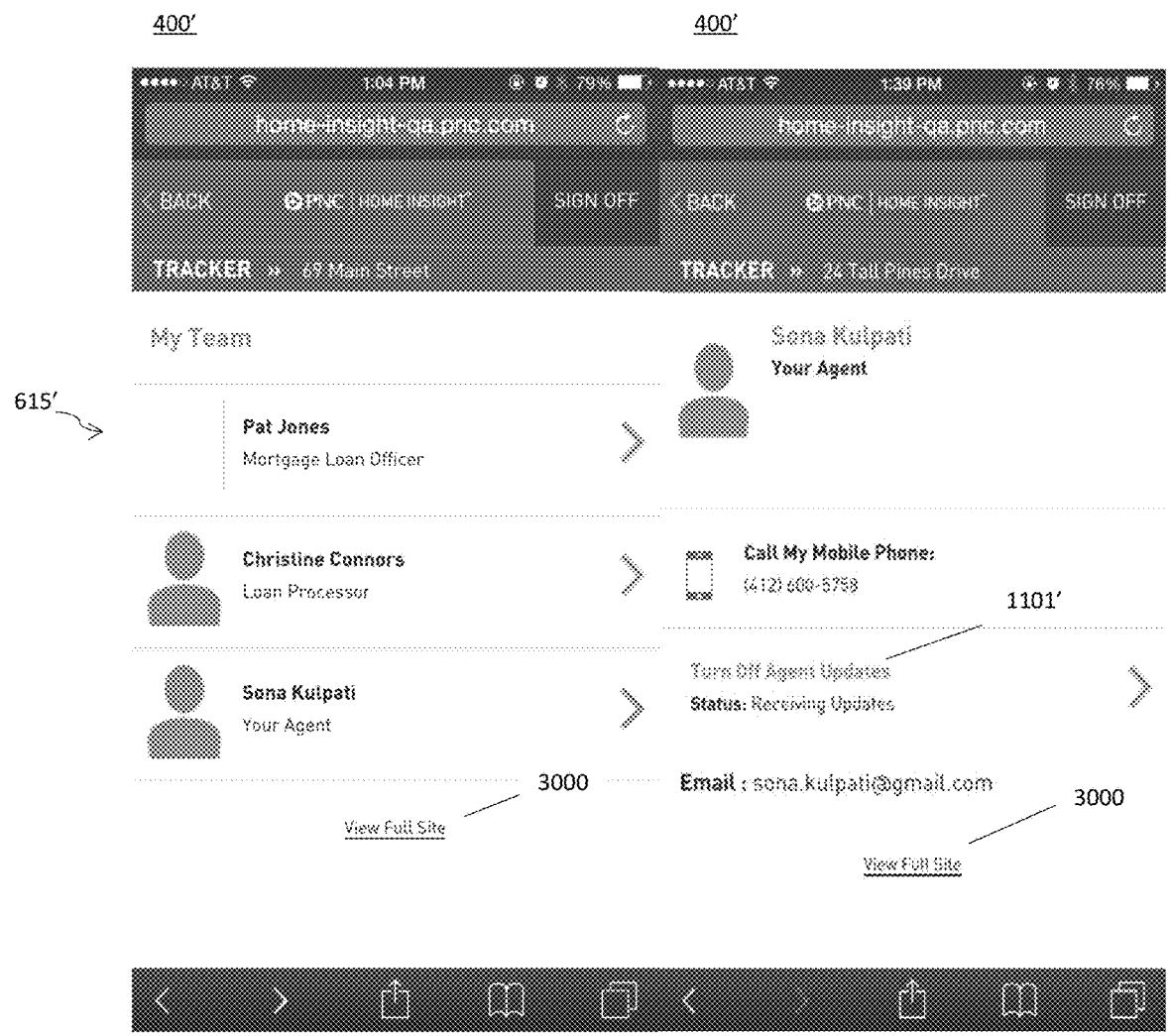
Figure 23G:
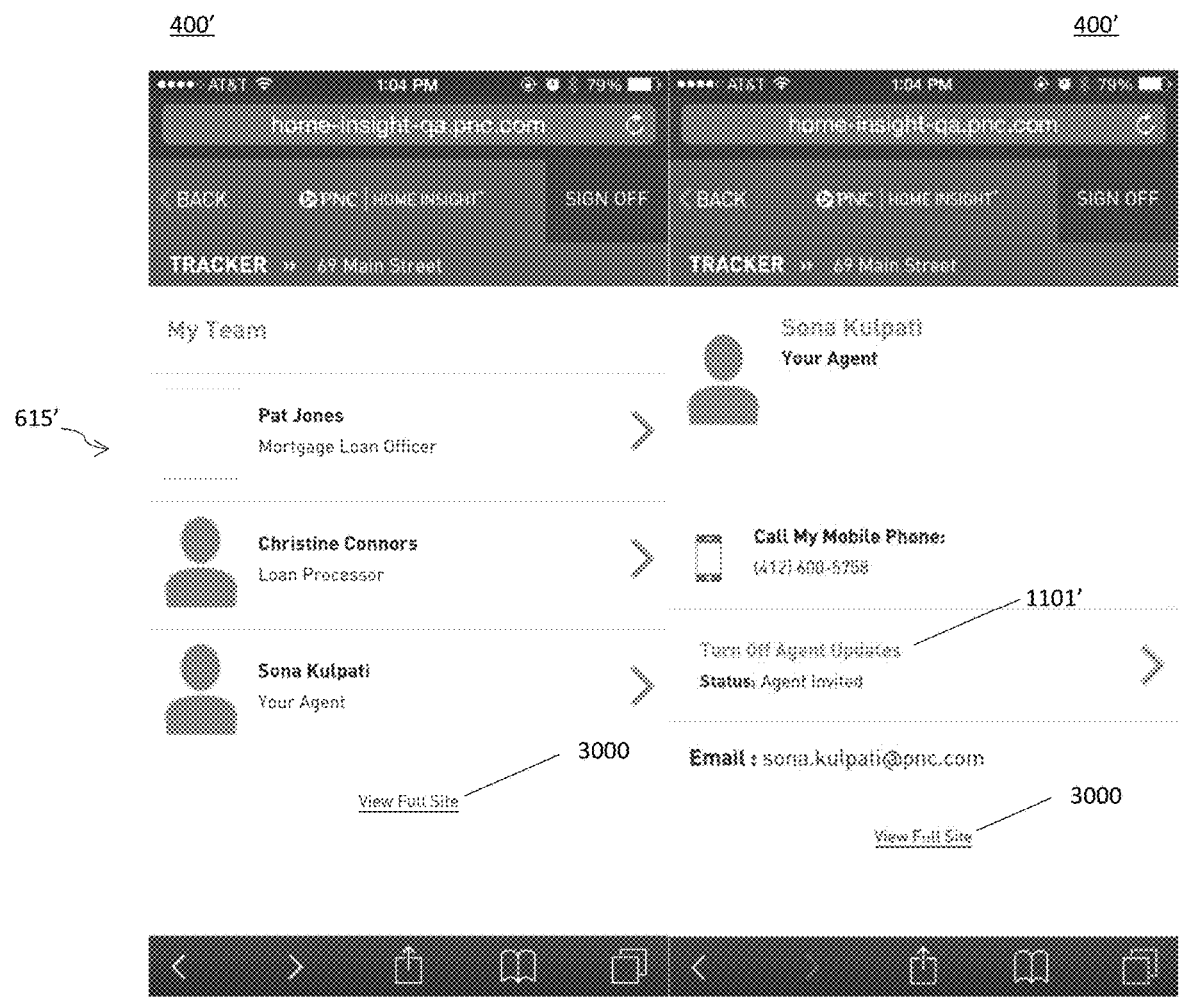

Referring now to FIG. 22, an exemplary embodiment of an application overview panel display 1000' configured as a mobile version, is disclosed. Note that FIG. 22 shows two screens in juxtaposition; however, this is done for ease of illustration because the contents of the application overview panel display 1000' of FIG. 22 are too long to illustrate in one screen shot. FIG. 22 illustrates a loan type segment 1002', an estimated monthly payment segment 1003', an application segment 1004', and a property segment 1005', each displaying the associated information, as described earlier for the full version.

Figure 25A:
Figure 25B:
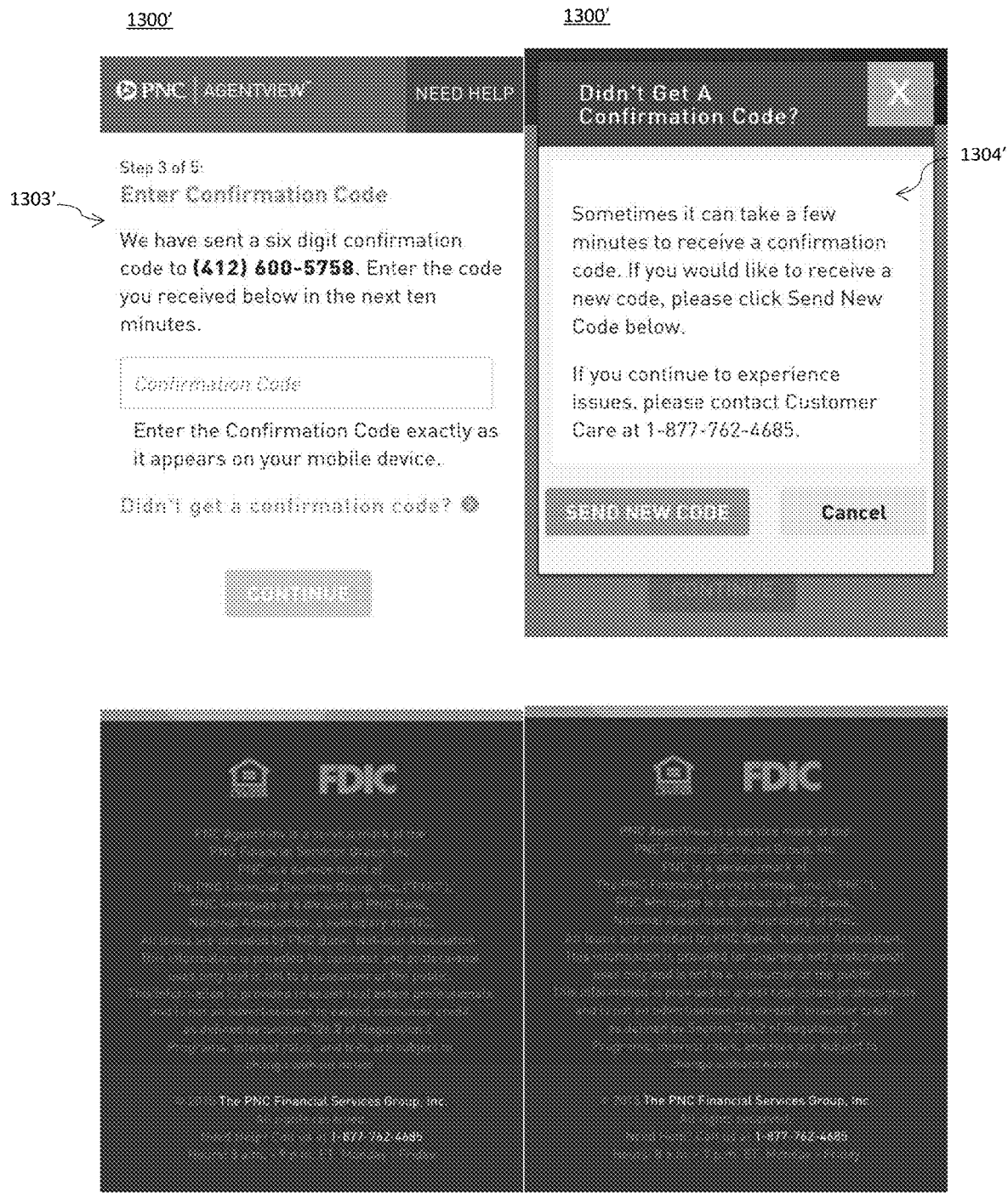
Figure 25C:
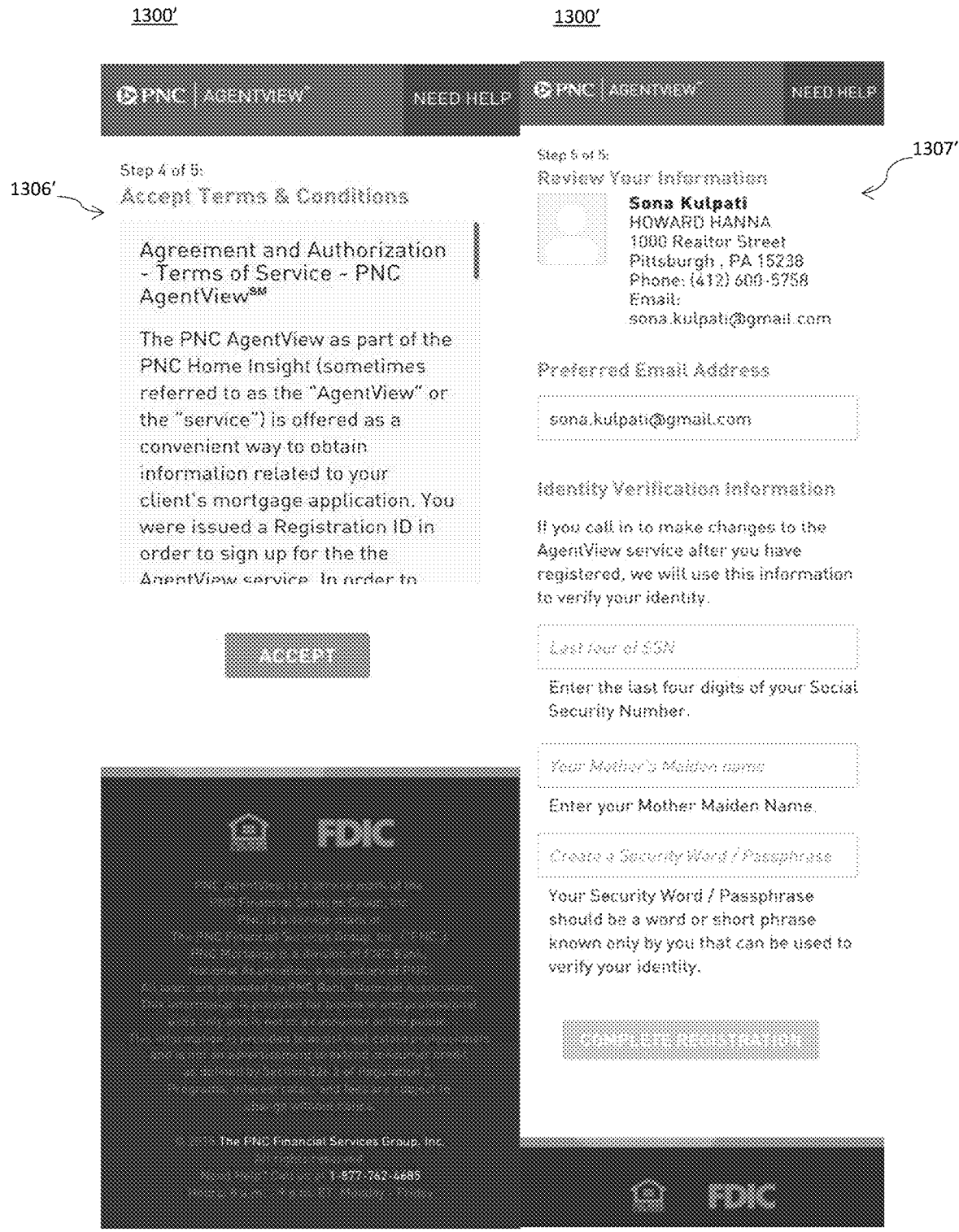

Referring now to FIGS. 23-25, exemplary embodiments of mobile versions of the third and fourth panels 1300', 1400', are disclosed. Similar third and fourth panel 1300', 1400' mobile versions, and their associated screen displays and communications and/or notifications, may be generated by the system 100. FIGS. 23A-G illustrate mobile versions of the opt in feature via the opt in indicator 1100' displayed on the my team panel display 615'. These features include the keep your agent in the know screen display 1110', the request more info indicator 1111', terms and conditions screen 1120', the correct agent information indicator 1122', compose massage screen display 806', the receiving updates screen display 1130', and the turn off updates indicator 1101'. FIG. 24 illustrates the mobile versions of the AgentView landing webpage 1210' and the registration indicator 1211'. Note that FIG. 24 shows two screens in juxtaposition; however, this is done for ease of illustration because the contents of the AgentView landing webpage 1210' of FIG. 23 are too long to illustrate in one screen shot. FIGS. 25A-C illustrate mobile versions of the registration screens 1301'-1308'.

While various exemplary embodiments of the disclosed systems 100 and methods 200 have been described above, it should be understood that they have been presented for purposes of example only, and are not to be viewed as limitations. The disclosed exampled and embodiments are presented for purposes of illustration only, and are not exhaustive and do not limit the disclosure to the precise form disclosed. It will be apparent to those skilled in the art that various modifications and variations are possible in light of the above teachings, or may be acquired from practicing of the disclosure, without departing from the breadth or scope. Other alternate embodiments may include some or all of the features disclosed herein. Therefore, it is the intent to cover all such modifications and alternate embodiments as may come within the true scope of this invention, which is to be given the full breadth thereof.

What is claimed is:

1. A system for managing a lending process in which a first user, such as a buyer, seeks to obtain a home mortgage loan from a second user, such as a loan officer or loan processor, to procure at least one asset, such as a home loan, the system comprising:
    a management system processor programmed for executing computer-readable instructions to generate at least one software module; and at least one data storage media comprising a non-transitory memory operatively associated with the management system processor, wherein:
        the at least one software module is configured to generate a user interface enabling the first user to issue commands and/or to access data stored on the at least one data storage media; and,
        the at least one software module is programmed to display at least one panel on the user interface, wherein the at least one panel is programmed to display information and grant access to data from a management system database via a first electronic communication device associated with the first user;
    a first module generated by the management system processor, the first module comprising:
        a first panel programmed for generating a first screen display communicated to the first electronic communication device and displayed thereon, wherein the generated first screen display is configured to establish at least one account associated with the first user, wherein the generated first screen display includes a first indicator programmed to cause the management system processor to transfer and receive purchasing/financing data to and from the management system database and the first electronic communication device for facilitating interaction between the first user and the system; and, a second panel programmed for generating a second screen display communicated to the first electronic communication device and displayed thereon, wherein the generated second screen display is configured to present the purchasing/financing data, wherein the generated second screen display includes a plurality of second indicators programmed to cause the management system processor to transfer and receive the purchasing/financing data to and from the management system database and the first electronic communication device for facilitating interaction between at least one of the first user, a second user, and the system, wherein a second electronic communication device is associated with the second user, wherein the second panel is programmed to display information related to managing financing processes and coordinating activities between users regarding the loan; and, wherein the plurality of second indicators generated on the second screen display comprises a progress indicator and a plurality of process step indicators generated along and in close association with the progress indicator, wherein the progress indicator comprises a segmented graphical progress bar to illustrate at which process step in the loan process the first user is in, wherein each of the process step indicators comprises a segment of the loan process which changes its graphical appearance upon activation;

wherein at least one of the process step indicators comprises a gathering documents process step indicator, wherein activation of the gathering documents process step indicator causes the management system processor to generate a documents panel display on the second screen display of the first electronic communication device, the documents panel display including data representing documents involved with purchasing the home, applications for financing, and/or management of debt associated therewith, wherein the documents panel display is provided with at least one upload indicator enabling the first user, the second user, and/or the system to upload the documents, via the first electronic communication device, to be transferred to the management system database via the management system processor; and, a second module generated by the management system processor, the second module, comprising:

a third panel programmed for generating a third screen display communicated to the first electronic communication device and displayed thereon, wherein the generated third screen display is configured to establish at least one account associated with a third user, wherein the generated third screen display includes a third indicator programmed to cause the management system processor to transfer and receive the purchasing/financing data to and from the management system database and the a third electronic communication device associated with the third user for facilitating interaction between the third user and the system; and, a fourth panel programmed for generating at least one of a progress alert and a summary progress report of the purchasing/financing data, wherein if the first user opts in the third user the fourth panel is programmed to cause the management system processor to transmit at least one of the generated progress alert and the generated summary report to the third user for display on the third electronic communication device;

wherein the generated second screen display is programmed to display an opt in indicator to enable the first user to opt in the third user;

wherein the generated second screen display is programmed to display a turn off updates indicator to opt out the third user; and wherein the second screen display includes a conditional approval screen display comprising information pertaining to statuses of pending issues, expected and estimated dates, and requests for supplemental information and a final approval screen display comprising information pertaining to whether final approval has been granted and/or a summary of events/activities.

2. The system recited in claim 1, wherein the management system processor is configured to generate communications, notifications, statuses, and updates of the first user's activity and/or the second user's activity.

3. The system recited in claim 2, wherein the generated second screen display is programmed to display the generated communications, notifications, statuses, and updates on the second electronic communication device.

4. The system recited in claim 3, wherein the generated second screen display is programmed to discriminatorily display the generated communications, notifications, statuses, and updates on the second electronic communication device based upon a type and/or status of the first user, the second user, and/or the third user.

5. The system recited in claim 1, wherein the second panel is configured to generate at least one documents indicator and/or at least one application overview indicator, wherein:

the at least one applications overview indicator is programmed to generate an application overview panel display on the first electronic communication device, the application overview panel display including data representing information related to approval/denial of obtaining financing.

6. A system for managing a lending process in which a first user, such as a buyer, seeks to obtain a home mortgage loan from a second user, such as a loan officer or loan processor, to procure at least one asset, such as a home, the system comprising:

a management system processor programmed for executing computer-readable instructions to generate at least one software module; and at least one data storage media comprising a non-transitory memory operatively associated with the management system processor, wherein:

the at least one software module is configured to generate a user interface enabling the first user to issue commands and/or to access data stored on the at least one data storage media; and, the at least one software module is programmed to display at least one panel on the user interface, wherein the at least one panel is programmed to display information and grant access to data from a management system database via a first electronic communication device, the first electronic communication device accessing the management system database via a modular wiring system, wherein data transfer between the first electronic communication device and the management system database occurs through at least one proxy server and an application server;

a first module generated by the management system processor, the first module comprising:
  a first panel programmed for generating a first screen display communicated to the first electronic communication device and displayed thereon, wherein the generated first screen display is configured to establish at least one account associated with the first user, wherein the generated first screen display includes a first indicator programmed to cause the management system processor to transfer and receive purchasing/financing data to and from the management system database and the first electronic communication device for facilitating interaction between the first user and the system; and,
  a second panel programmed for generating a second screen display communicated to the first electronic communication device and displayed thereon, wherein the generated second screen display is configured to present the purchasing/financing data, wherein the generated second screen display includes a plurality of second indicators programmed to cause the management system processor to transfer and receive the purchasing/financing data to and from the management system database and the first electronic communication device for facilitating interaction between at least one of the first user, a second user, and the system, wherein a second electronic communication device is associated with the second user, wherein the second panel is programmed to display information related to managing financing processes and coordinating activities between users regarding the loan;
  wherein the plurality of second indicators generated on the second screen display comprises a progress indicator and a plurality of process step indicators generated along and in close association with the progress indicator, wherein the progress indicator comprises a segmented graphical progress bar to illustrate at which process step in the loan process the first user is in, wherein each of the process step indicators comprises a segment of the loan process which changes its graphical appearance upon activation;
  wherein at least one of the process step indicators comprises a gathering documents process step indicator, wherein activation of the gathering documents process step indicator causes the management system processor to generate a documents panel display on the second screen display of the first electronic communication device, the documents panel display including data representing documents involved with purchasing the home, applications for financing, and/or management of debt associated therewith, wherein the documents panel display is provided with at least one upload indicator enabling the first user, the second user, and/or the system to upload the documents, via the first electronic communication device, to be transferred to the management system database via the management system processor;
  wherein the second panel is provided with a my team indicator programmed to cause the second electronic communication device to display data representing information related to the second user transferred from the management system processor;
  wherein the at least one second panel is configured to generate at least one documents indicator, wherein the at least one documents indicator is programmed to generate a documents panel display on first electronic communication device, the documents panel display including data representing documents involved with purchasing the asset, applications for financing, and/or management of debt associated therewith, wherein the documents panel display is provided with at least one upload indicator enabling the first user, the second user, and/or the system to upload the documents, via the first electronic communication device, to be transferred to the management system database via the management system processor; and,
a second module generated by the management system processor, the second module, comprising:
  a third panel programmed for generating a third screen display communicated to the first electronic communication device and displayed thereon, wherein the generated third screen display is configured to establish at least one account associated with a third user, wherein the generated third screen display includes a third indicator programmed to cause the management system processor to transfer and receive the purchasing/financing data to and from the management system database and a third electronic communication device for facilitating interaction between the third user and the system; and,
  a fourth panel programmed for generating at least one of a progress alert and a summary progress report of the purchasing/financing data, wherein if the first user opts in the third user the fourth panel is programmed to cause the management system processor to transmit at least one of the generated progress alert and the generated summary report to the third user for display on the third electronic communication device;
  wherein the generated second screen display is programmed to display an opt in indicator to enable the first user to opt in the third user;
  wherein the generated second screen display is programmed to display a turn off updates indicator to opt out the third user;
  wherein the second screen display includes a conditional approval screen display comprising information pertaining to statuses of pending issues, expected and estimated dates, and requests for supplemental information and a final approval screen display comprising information pertaining to whether final approval has been granted and/or a summary of events/activities; and
  wherein data representing information related to the third user is displayed via the my team indicator when the third user establishes the at least one account via the third panel and/or the first user opts in the third user.

7. The system recited in claim 6, wherein the management system processor is configured to generate communications, notifications, statuses, and updates of the first user's activity and/or the second user's activity.

8. The system recited in claim 7, wherein the generated second screen display is programmed to display the generated communications, notifications, statuses, and updates on the second electronic communication device.

9. The system recited in claim 8, wherein the generated second screen display is programmed to discriminatorily display the generated communications, notifications, statuses, and updates on the second electronic communication device based upon a type and/or status of the at user, the second user, and/or the third user.

10. The system recited in claim 6, wherein the second panel is configured to generate at least one application overview indicator, wherein:

the at least one applications overview indicator is programmed to present an application overview panel display on the first electronic communication device, the application overview panel display including data representing information related to approval/denial of obtaining financing.

11. A method for managing a lending process in which a first user, such as a buyer, seeks to obtain a home mortgage loan from a second user, such as a loan officer or loan processor, to procure at least one asset, such as a home, the method comprising:

displaying on a first electronic communication device at least one software module operatively associated with a management system processor, wherein:
the at least one software module is configured to generate a user interface enabling the first user to issue commands and/or to access data stored on a management system database operatively associated with the management system processor; and,
the at least one software module is programmed to display at least one panel on the user interface, wherein the at least one panel is programmed to display information and grant access to data from the management system database via the first electronic communication device;

displaying on the first electronic communication device via a first module generated by the management system processor:
a first panel programmed for generating a first screen display, wherein the generated first screen display is configured to establish at least one account associated with the first user, wherein the generated first screen display includes a first indicator programmed to cause the management system processor to transfer and receive purchasing/financing data to and from the management system database and the first electronic communication device for facilitating interaction between the first user and the system; and,
a second panel programmed for generating a second screen display, wherein the generated second screen display is configured to present the purchasing/financing data, wherein the generated second screen display includes a plurality of second indicators programmed to cause the management system processor to transfer and receive the purchasing/financing data to and from the management system database and the first electronic communication device for facilitating interaction between at least one of the first user, a second user, and the system, wherein a second electronic communication device is associated with the second user, wherein the second panel is programmed to display information related to managing financing processes and coordinating activities between users regarding the loan;
wherein the plurality of second indicators generated on the second screen display comprises a progress indicator and a plurality of process step indicators generated along and in close association with the progress indicator, wherein the progress indicator comprises a segmented graphical progress bar to illustrate at which process step in the loan process the first user is in, wherein each of the process step indicators comprises a segment of the loan process which changes its graphical appearance upon activation;
wherein at least one of the process step indicators comprises a gathering documents process step indicator, wherein activation of the gathering documents process step indicator causes the management system processor to generate a documents panel display on the second screen display of the first electronic communication device, the documents panel display including data representing documents involved with purchasing the home, applications for financing, and/or management of debt associated therewith, wherein the documents panel display is provided with at least one upload indicator enabling the first user, the second user, and/or the system to upload the documents, via the first electronic communication device, to be transferred to the management system database via the management system processor;
wherein presenting the information related to purchasing and financing the at last one asset further comprises displaying at least one documents indicator, generating a documents panel display, via the at least one documents indicator, the documents panel display including data representing documents involved with purchasing the asset, applications for financing, and/or management of debt associated therewith, wherein generating the documents panel display comprises displaying at least one upload indicator enabling the first user, the second user, and/or the system to upload the documents, via the first communication device, to be transferred to the management system database via the management system processor; and, displaying on the first electronic communication device via a second module generated by the management system processor:
a third panel programmed for generating a third screen display, wherein the generated third screen display is configured to establish at least one account associated with a third user, wherein the generated third screen display includes a third indicator programmed to cause the management system processor to transfer and receive the purchasing/financing data to and from the management system database and the third electronic communication device associated with the third user for facilitating interaction between the third user and the system; and,
a fourth panel programmed for generating at least one of a progress alert and a summary progress report of the purchasing/financing data, wherein if the first user opts in the third user the fourth panel is programmed to cause the management system processor to transmit at least one of the generated progress alert and the generated summary report to the third user for display on the third electronic communication device;
wherein generating the second screen display includes displaying an opt in indicator to enable the first user to opt in the third user; and,
wherein generating the second screen display includes displaying a turn off updates indicator to opt out the third user; and
wherein the second screen display includes a conditional approval screen display comprising information pertaining to statuses of pending issues, expected and estimated dates, and requests for supplemental information and a final approval screen display comprising information pertaining to whether final approval has been granted and/or a summary of events/activities.

12. The method recited in claim 11, further comprising:
generating, by the management system processor, communications, notifications, statuses, and updates of the first user's activity and/or the second user's activity; and,
transmitting the communications, notifications, statuses, and updates to the first electronic communication device.

13. The method recited in claim 12, further comprising displaying, by the generated second screen display, the generated communications, notifications, statuses, and updates.

14. The method recited in claim 13, further comprising discriminatorily displaying, by the generated second screen display, the communications, notifications, statuses, and updates based upon a type and/or status of the first user, the second user, and/or the third user.

15. The method recited in claim 11, wherein presenting the information related to purchasing and financing the at last one asset further comprises:

displaying least one application overview indicator;

generating an application overview panel display, via the at least one applications overview indicator, the application overview panel display including data representing information related to approval/denial of obtaining financing.

16. The method recited in claim 11, further comprising generating a progress indicator, via the second panel, the progress indicator having at least one process step indicator on the generated second screen display.

17. The method recited in claim 11, further comprising generating a my team indicator, via the second panel, the my team indicator programmed to display data representing information related to the second user.

* * * * *